United States Patent [19]
Irie

[11] Patent Number: 5,271,727
[45] Date of Patent: Dec. 21, 1993

[54] MOLD CHANGING APPARATUS FOR USE IN TIRE VULCANIZER

[75] Inventor: Nobuhiko Irie, Nagasaki, Japan

[73] Assignee: Mitsubishi Jukogyo Kabushiki Kaisha, Tokyo, Japan

[21] Appl. No.: 871,985

[22] Filed: Apr. 22, 1992

[30] Foreign Application Priority Data

Apr. 23, 1991 [JP] Japan ................... 3-092165

[51] Int. Cl.$^5$ ............................................. B29C 35/00
[52] U.S. Cl. ................................ 425/34.1; 425/36; 425/38; 425/40; 425/DIG. 201
[58] Field of Search ............ 425/DIG. 201, 453, 34.1, 425/28.1, 36, 38, 40

[56] References Cited

U.S. PATENT DOCUMENTS

| | | | |
|---|---|---|---|
| 3,550,196 | 12/1970 | Gazuit | 425/DIG. 201 |
| 3,783,241 | 1/1974 | Cimprich | 425/28.1 |
| 3,918,861 | 11/1975 | Klose | 425/47 |
| 3,932,079 | 1/1976 | Legostaev et al. | 425/34.1 |
| 4,880,792 | 11/1989 | Yoshioka et al. | 425/190 |

FOREIGN PATENT DOCUMENTS

| | | |
|---|---|---|
| 0170109 | 2/1986 | European Pat. Off. . |
| 0270021 | 6/1988 | European Pat. Off. . |
| 1554992 | 1/1969 | France . |
| 2330529 | 6/1977 | France . |
| 70535 | 4/1984 | Japan ................... 425/28.1 |
| 59-70536 | 4/1984 | Japan . |

Primary Examiner—Jay H. Woo
Assistant Examiner—James P. Mackey
Attorney, Agent, or Firm—Wenderoth, Lind & Ponack

[57] ABSTRACT

A mold changing apparatus for use in a tire vulcanizer includes a mold stations having tire molds disposed in a row, a movable mold open-close manipulator, and a mold preparing station provided at a proper position in the row of tire molds for centering and preheating a tire mold. A mold that has been centered and preheated completely in the mold preparing station is automatically received by the mold open-close manipulator, and it is then automatically transferred to and installed in the mold station where vulcanization is executed. A mold which is to be removed is automatically received from the mold station by the manipulator, and it is automatically transferred to the mold preparing station and separated from the manipulator. Subsequently, the manipulator automatically receives a new mold which has already been heated. Thus, a fully-automatic mold change is realized.

9 Claims, 50 Drawing Sheets

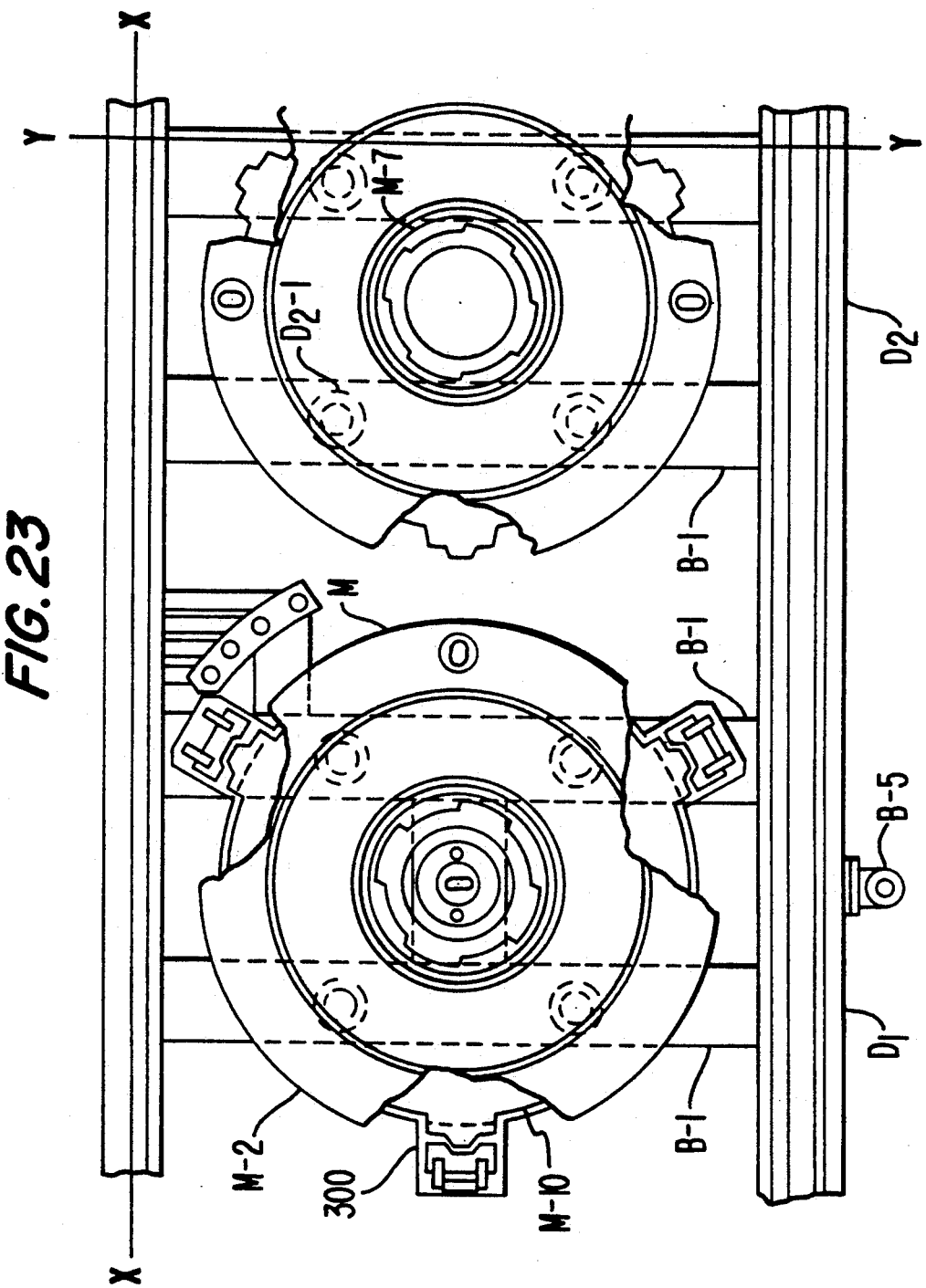

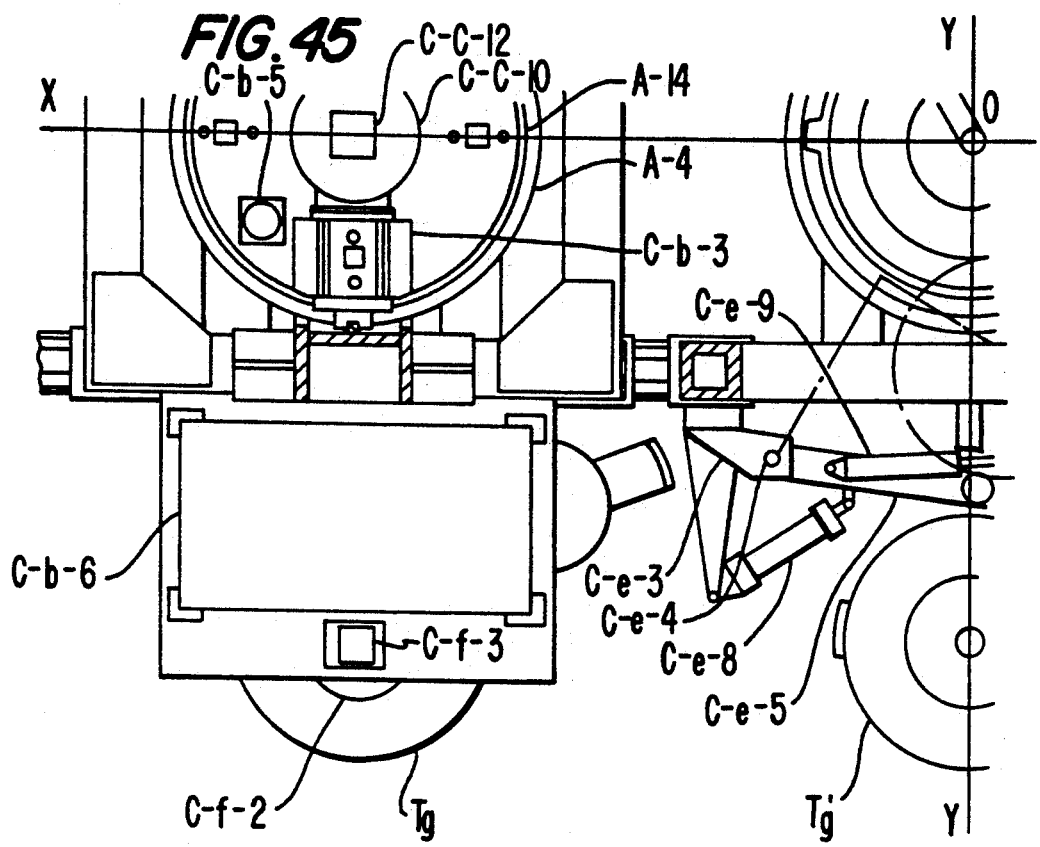
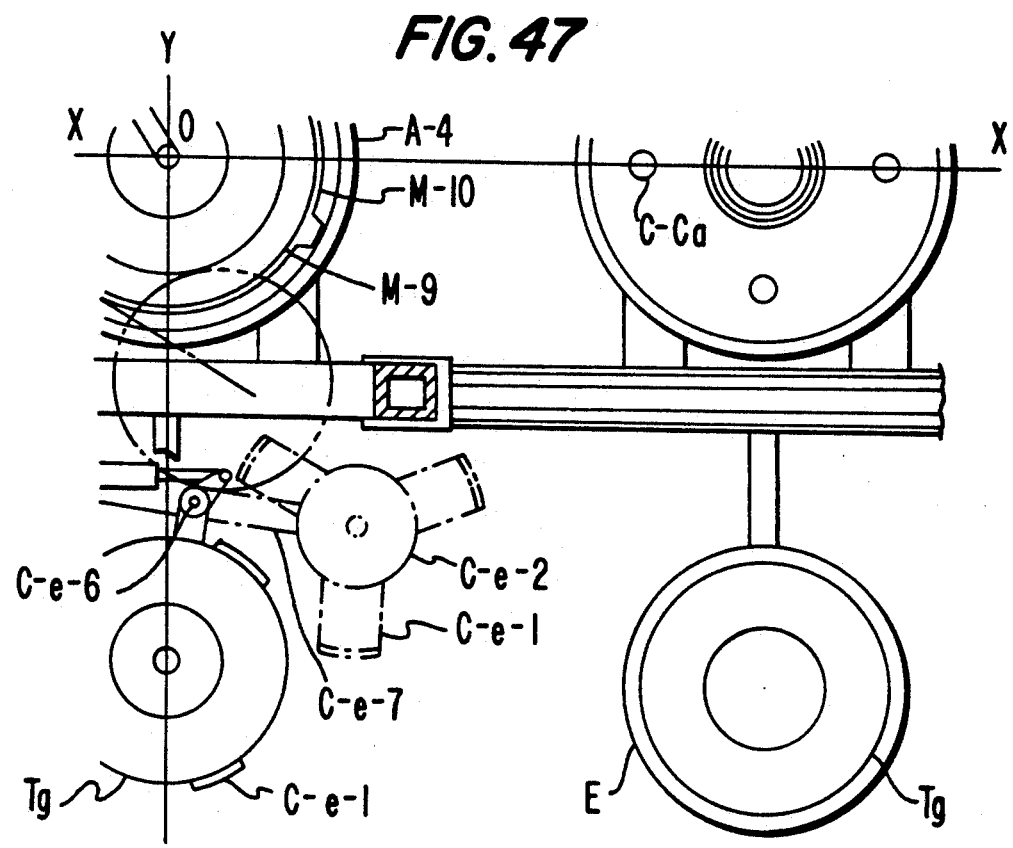

MOLD CHANGING APPARATUS FOR USE IN TIRE VULCANIZER

BACKGROUND OF THE INVENTION

1. Field of the Invention

The present invention relates to a mold changing apparatus for use in a tire vulcanizer having a plurality of mold stations.

2. Description of the Prior Art

A typical conventional tire vulcanizing press is equipped with a tire mold that accommodates tires to be produced. The tire mold requires the inner surface thereof to be washed periodically, and it also needs to be replaced in the middle of production to change the size of tires to be produced or the pattern formed on the tire surface. The tire mold, which is contaminated during production, is removed from the tire vulcanizing press for washing and remounted thereto after washing. The replacement is performed by releasing the top press-heating plate on the press side from the top half of the mold and the bottom press-heating plate on the press side from the bottom half of the mold (in many cases clamping is effected by using bolts), and taking the mold out of the press by use of a forklift truck or an overhead traveling crane, and then mounting a new mold by executing a procedure reverse to the above.

The above-described prior art involves problems stated below:

(1) Since mold clamping is effected by bolting, the operator is obliged to perform an inefficient operation in a bad environment.

(2) At the time of mounting the mold, it needs to be installed with high accuracy with respect to the press, and it is therefore necessary to fit the mold to a projecting ring portion, known as "register ring", which is provided on the press. Since the gap between the projecting ring and the mold is 0.5 mm or less, the mold mounting process involves an inefficient operation in which an assistant to the operator of the forklift or the crane lowers the suspended mold while swinging it for engagement with the projecting ring.

(3) It is an ideal practice for the mold replacement to remove the mold immediately after the vulcanization of the final tire produced by this mold and to start production with a new mold immediately after it has replaced the old one. In actuality, however, the arrival of a new tire which is to be mounted may cause delay, or the disposition of an assistant operator may cause delay, resulting in a loss of time. In addition, a mold which is to be mounted is in a cooled state, or even if it has been preheated, in many cases the press is remote from the mold yard. Therefore, when mounted, the new tire mold has not yet been heated to such an extent that the production can be started immediately. Accordingly, it is necessary to perform a preheating operation in the press after the replacement, resulting in a lowering of the productivity.

The prior art further suffers from the following problem.

The conventional tire vulcanizing press comprises various constituent devices, such as devices that function only during the vulcanizing cycle, devices that function only during the loading and unloading cycle, and devices that function during both the cycles.

In the case of small-sized tires for automobiles, for example, the vulcanizing cycle is about 10 minutes, while the loading and unloading cycle is about 1 minute.

In other words, the loading and unloading process accounts for only about 10% of the production cycle, whereas the percentage of the total installation cost that is taken up by the loading and unloading equipment exceeds this level by a large margin. In the case of producing recent high-accuracy tires, the cost proportion of the loading and unloading equipment is higher than that in the case of production of conventional tires. In particular, the shaping method (part of the loading process) disclosed in Japanese Patent Laid-Open (KOKAI) No. 02-200405 (1990) needs a complicated mechanism, which is not provided in the conventional press, so that the proportion taken up by the loading and unloading cost is high, although this method has been proved by an actual machine to be suitable for production of tires of higher accuracy.

SUMMARY OF THE INVENTION

Under these circumstances, it is an object of the present invention to provide a mold changing apparatus for use in a tire vulcanizer which is free from the above-described problems of the prior art.

In the present invention, a mold preparing station is provided in the middle or at the end of a row of stationary tire molds so that it is possible to complete in this mold preparing station an automatic centering of a new mold which is to replace an old one and a preheating of the new mold to the same temperature as that in the production process.

With the above-described arrangement, a mold can be installed in the mold preparing station only by an operator of a forklift or a crane, whereas an assistant to the operator has heretofore been needed in the prior art.

A mold which is to be removed is automatically received from the mold station, transferred to the vicinity of the new mold in the mold preparing station and separated from the manipulator. Subsequently, the manipulator automatically receives the new mold which has already been heated, thereby enabling a fully-automatic mold change.

The manipulator is equipped with devices that are used for various operations carried out at each individual mold station. Such as the opening and closing of a press, the loading of a green tire and removing of the completed tire, and the manipulator is used for all the mold stations in common.

Heating fluid supply and discharge systems can be automatically connected and disconnected at the time of the operation of opening and closing the press at each mold station. In addition, heating fluid supply and discharge systems for splittable molds can be automatically connected and disconnected at the time of replacement of a mold.

A mold that has been centered and preheated completely in the mold preparing station is received by the mold open-close manipulator, and it is then transferred to and installed in a mold station where vulcanization is executed. These operations are all automatically carried out. A mold which is to be removed is automatically received from the mold station by the manipulator, and it is automatically transferred to the vicinity of the new mold in the mold preparing station and separated from the manipulator. Subsequently, the manipulator automatically receives the new mold which has already been heated. Thus, a fully-automatic mold change is realized.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 23 shows the bottom left quarter of the arrangement shown in FIG. 21;

FIG. 45 shows the bottom left quarter of the arrangement shown in FIG. 43;

FIG. 47 shows the bottom right quarter of the arrangement shown in FIG. 43;

DETAILED DESCRIPTION OF THE PREFERRED EMBODIMENTS

The present invention will be described below in detail with reference to the accompanying drawings.

Figure 1:
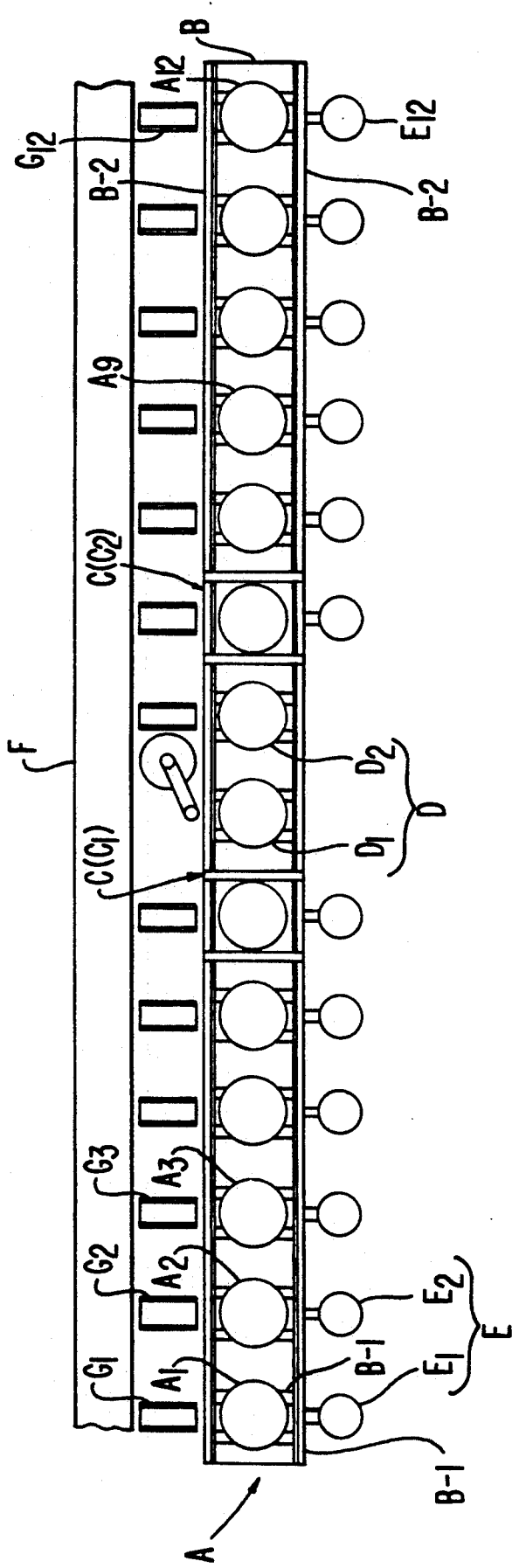
FIG. 1 is a plan view showing the general arrangement of one embodiment of the present invention.

Referring first to FIG. 1, which shows the general arrangement of one embodiment of the present invention, mold stations $A_1$ to $A_{12}$ have tire molds installed therein, respectively. Green tire preparing stations $E_1$ to $E_{12}$ are disposed in front of the mold stations $A_1$ to $A_{12}$, and discharge conveyors $G_1$ to $G_{12}$ and a belt conveyor F are disposed to the rear of the mold stations $A_1$ to $A_{12}$. The mold stations $A_1$ to $A_{12}$ are disposed at proper spacings on a common base frame B. A track is installed on the common base frame B for guiding a movable mold open-close manipulator C, which is moved and stopped in position at the request of each mold station A to execute operations of opening and closing a mold, loading a green tire, and unloading the completed tire.

The system is provided with one or two manipulators C, which are denoted by reference numerals $C_1$ and $C_2$. The number of manipulators is preferably two from the viewpoint of maintenance and the possibility that two mold stations will make a request at the same time. The number of mold stations is determined by considering the time required for the manipulator C to move and the time consumed in operations of opening and closing the mold, loading a green tire and unloading the completed tire at each station, together with the vulcanizing time (i.e., the period of time during which the mold is closed) at each mold station. Although in the illustrated arrangement 12 mold stations are provided, the number of mold stations can be increased in the case of production of tires which are larger in size and therefore need a relatively long vulcanizing time. For the sake of the description, the left-hand end of the system will be hereinafter referred to as $A_1$, and the right-hand end as $A_{12}$. A mold preparing station D is disposed at a proper position in the row of mold stations $A_1$ to $A_{12}$. Although in FIG. 1 the mold preparing station D is disposed in the center of the row of mold stations $A_1$ to $A_{12}$, it may be disposed at either of the ends of the row of mold stations $A_1$ to $A_{12}$. The mold preparing station D comprises a first station $D_1$ and a second station $D_2$. The first station $D_1$ comprises a centering device and a heating device for a new mold which is to be used subsequently. The second station $D_2$ is a station where a mold removed from a mold station A is allowed to stand. Unlike the first station $D_1$, the second station $D_2$ has neither a centering device nor a heating device. Although not shown in FIG. 1, the second station $D_2$ may be equipped with a washing device so that a tire washed in the second station $D_2$ is moved to the first station $D_1$ for preheating. By virtue of the above-described arrangement, while a production process is being executed at each of the mold stations $A_1$ to $A_{12}$, a new mold can be carried into the first station $D_1$ by a forklift or a crane so as to be centered and preheated before being moved to a mold station A to replace an old mold.

Upon completion of the release of the final tire produced at a mold station which should replace the mold with a new one, the manipulator C transfers the old mold to the second mold preparing station $D_2$ where the mold is allowed to stand, and the manipulator C subsequently receives a new mold which has already been heated and moves it to the mold station concerned. Thus, the new mold can be automatically installed in the mold station. When two manipulators are provided, situation judging control is effected to decide which manipulator is suitable for use in a particular mold change operation. The following is a detailed description of the main constituent devices, that is, the mold stations A, the common base frame B, the mold open-close manipulator C, the mold preparing station D, and the green tire preparing station E.

Figure 2:
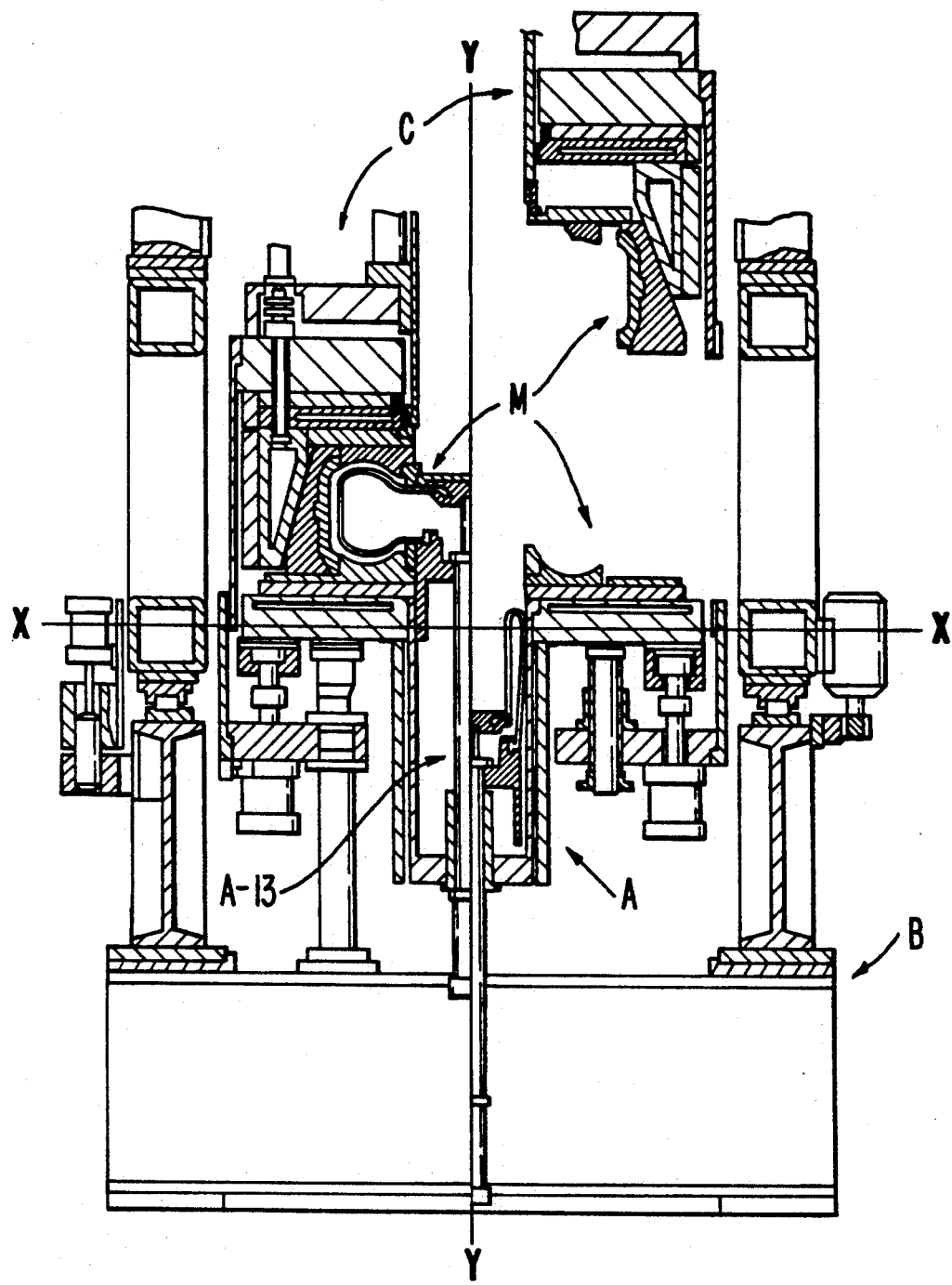
FIG. 2 is a sectional view of one mold station shown in FIG. 1.

DETAILS OF MOLD STATIONS A (1) FIGS. 2 to 6 are sectional views of one mold station. FIG. 2 is a view seen from the right-hand end $A_{12}$ of the row of mold stations. In FIG. 2, the common base frame B and the mold open-close manipulator C are also shown. The left-hand half (also shown in FIGS. 3 and 4) of FIG. 2 shows the mold station which is in a state where the mold is closed, and the manipulator C is about to begin or finish an operation at the mold station. The right-hand half (also shown in FIGS. 5 and 6) of FIG. 2 shows the mold station which is in a state where the mold is opened by the manipulator C before a green tire is supplied.

(2) The mold station is installed on cross beams B-1 (FIG. 6) of the common base frame B. A support A-1 (FIG. 4) is installed upright on a cross beam B-1. A base plate A-2 is secured to the head portion of the support A-1. A plurality of rollers A-3 are disposed at the outer periphery of the base plate A-2 to support a lower breach lock tube A-4 rotatably. The lower breach lock tube A-4 is driven to rotate by a cylinder or a motor (not shown).

The lower breach lock tube A-4 is rotatable but immovable vertically because it is engaged with a projection provided along the outer periphery of the base plate A-2, as illustrated. The inner peripheral wall of the upper end portion of the lower breach lock tube A-4 is provided with known intermittent teeth through which the lower breach lock tube A-4 is removably engaged with an upper breach lock tube A-14 (shown in FIG. 3 and described later). The lower breach lock tube A-4 can be connected to and disconnected from the upper breach lock tube A-14 by rotating the former through an angle corresponding to one of the intermittent teeth by a driving device (not shown).

Figure 5:
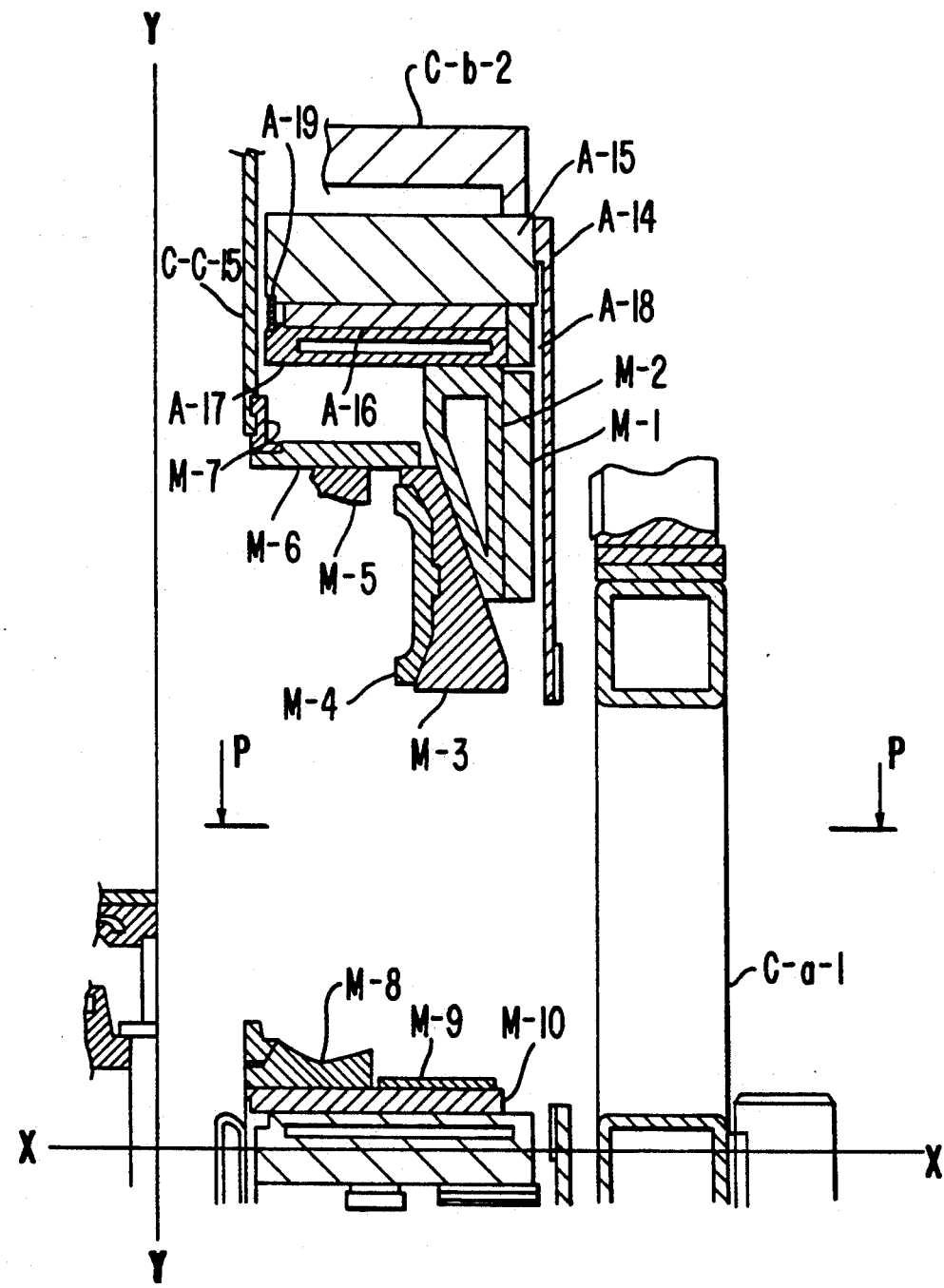
FIG. 5 shows the top right quarter of the arrangement shown in FIG. 2.
Figure 6:
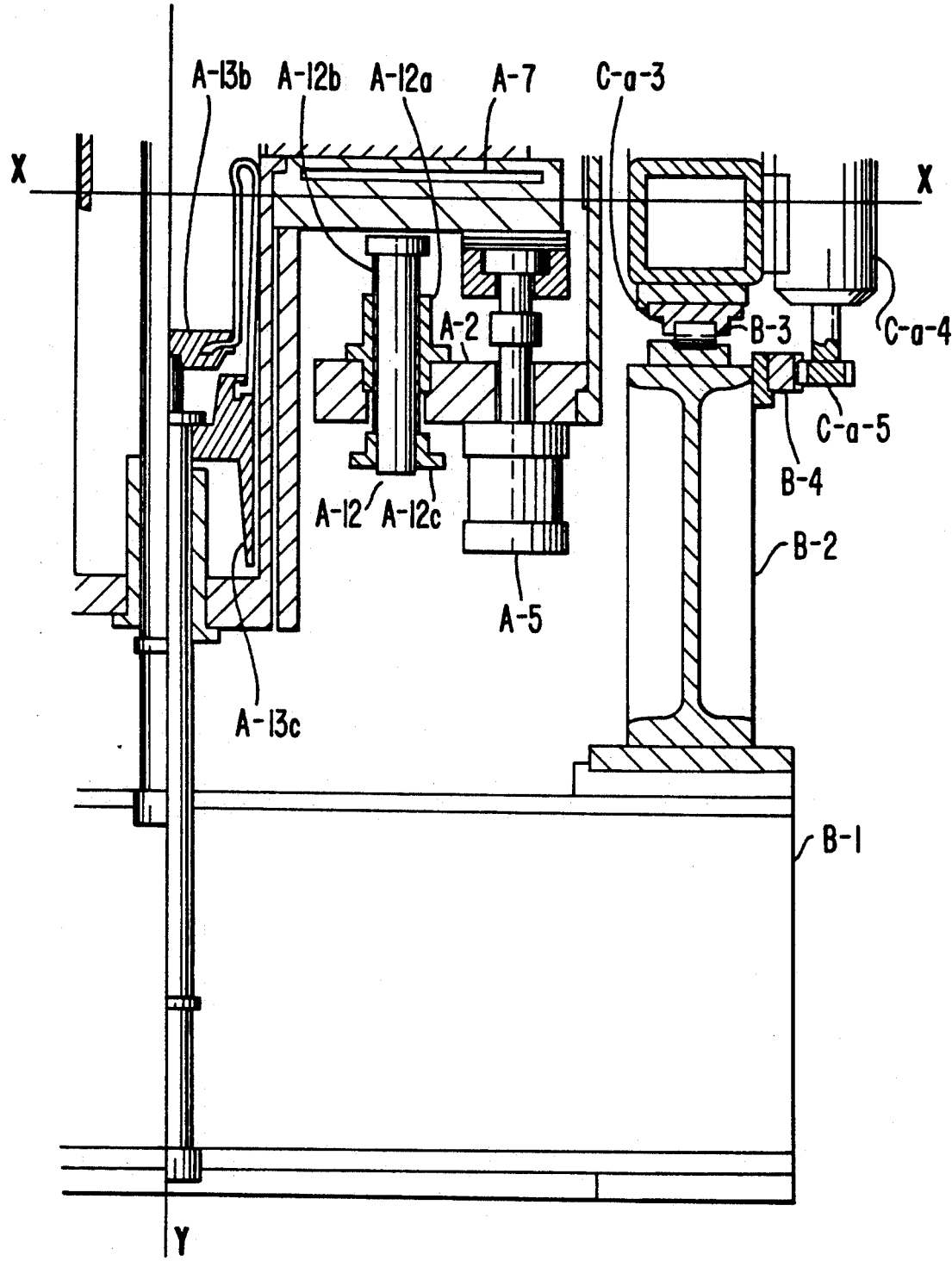
FIG. 6 shows the bottom right quarter of the arrangement shown in FIG. 2.

(3) The base plate A-2 is provided with a plurality of pressure cylinders A-5 (FIGS. 5 and 6). A T-shaped coupler A-6 is attached to the rod end of each cylinder A-5. The coupler A-6 is fitted to a coupler A-9 that is attached to a lower bolster plate A-7 through a heat insulating material A-8. For the couplers A-6 and A-9, a known means for absorbing a change in the longitudinal dimension is adopted so that no undesired force will act on the pressure cylinder A-5 when the lower bolster plate A-7 thermally expands.

Figure 7:
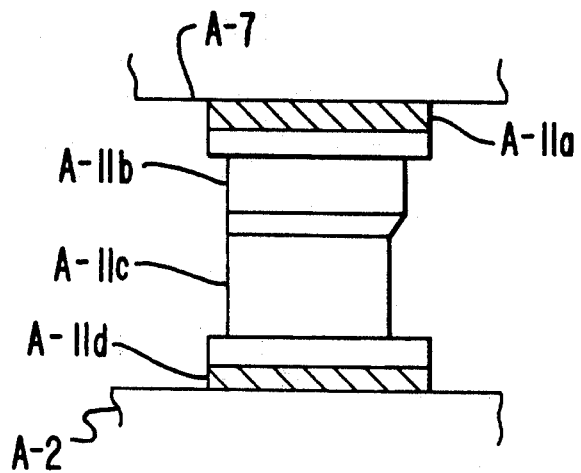
FIG. 7 is a front view of a guide device shown in FIG. 4.
Figure 8:
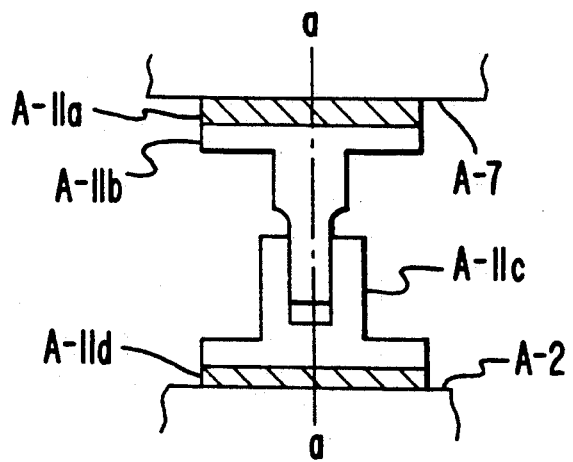
FIG. 8 is a side view of the guide device shown in FIG. 7 as viewed from the left-hand side thereof.

(4) The lower bolster plate A-7 has a steam passage A-10 (FIGS. 3 and 5) for heating which is provided in the upper region thereof. The steam passage A-10 is supplied with a heating fluid that circulates through a supply port (not shown). Between the lower bolster plate A-7 and the base plate A-2 are installed three or four guide devices A-11, which are equally spaced at respective positions equidistant from the center of the lower bolster plate A-7. The details of one guide device A-11 are shown in FIGS. 7 and 8. The guide device A-11 comprises an upper guide A-11b that is attached to the lower side of the lower bolster plate A-7 through a heat insulating material A-11a, and a lower guide A-11c that is fitted to a projecting portion of the upper guide A-11b, the lower guide A-11c being attached to the base plate A-2 through a heat insulating material A-11d. The projecting portion of the upper guide A-11b and the surface defining the accommodating recess of the lower guide A-11c are formed by precision machining.

The center line a—a in FIG. 8 is disposed to coincide with a radiating line of the base plate A-2. By virtue of the above-described structure, even if the upper guide A-11b moves in the direction of the radiating line due to thermal expansion of the lower bolster plate A-7, it is possible to support the lower bolster plate A-7 such that the center position thereof will not be displaced. In addition, when the lower bolster plate A-7 is moved vertically by the pressure cylinders A-5, it is also possible to support the lower bolster plate A-7 such that the center position thereof will not be displaced.

(5) A plurality of mold thickness adjusting devices A-12 (FIG. 6) are disposed between the lower bolster plate A-7 and the base plate A-2. The mold thickness adjusting devices A-12 are used to adjust the lower-limit position of the lower bolster plate A-7 to a proper level during the mold closing operation by the lower breach lock tube A-4 and the upper breach lock tube A-14 when there is a change in the height of the tire mold received in the mold station A.

The mold thickness adjusting devices A-12 are equally spaced at respective positions equidistant from the center of the base plate A-2. Each mold thickness adjusting device A-12, which is disposed between a pair of adjacent guide devices A-11, comprises a nut A-12a that is rigidly secured to the base plate A-2, a rod A-12b that is screwed into the nut A-12a, a gear A-12c provided on the end of the rod A-12b, a chain or a toothed belt (not shown) which is stretched to pass over the gears A-12c of all the adjusting devices A-12, and a rotational driving device (not shown). The top of the rod A-12b abuts against the lower side of the lower bolster plate A-7.

In the right-hand half of FIG. 2 (i.e., FIGS. 5 and 6), the pressure cylinders A-5 contract to allow the lower bolster plate A-7 to abut on the rod A-12b, thereby retaining the lower bolster plate A-7 horizontally. To activate the mold thickness adjusting devices A-12, the lower bolster plate A-7 is raised by the pressure cylinders A-5 in the mold release state shown in the right-hand half of FIG. 2, thereby creating a space between the top of each rod A-12b and the lower bolster plate A-7, and in this state all the rods A-12b are simultaneously driven by the driving device, thus enabling the height of the top of each rod to be changed precisely.

(6) A known bladder actuating mechanism A-13 is provided in the center of the lower bolster plate A-7. Since many bladder actuating mechanisms have been proposed by the present applicant and also by other applicants and are hence known, a detailed description of the bladder actuating mechanism A-13 is omitted, but it will be explained briefly. The bladder actuating mechanism A-13 comprises a bladder A-13a, a bladder top clamp member A-13b, a bladder bottom clamp member A-13c, an accommodating tube A-13d that guides the bottom clamp member A-13c and accommodates the bladder A-13a, and a heat insulating material A-13e provided on the outer wall of the accommodating tube A-13d. The accommodating tube A-13d is secured to the central portion of the bottom bolster plate A-7.

The left-hand half of FIG. 2 (i.e., FIGS. 3 and 4) shows the bladder actuating mechanism A-13 during vulcanization. The top clamp member A-13b is fitted to a pressure receiving plate M-12 in the center of the upper half of the tire mold, and the bottom clamp member A-13c is held in the position shown in the figure by a known means against the pressure inside the tire.

Figure 3:
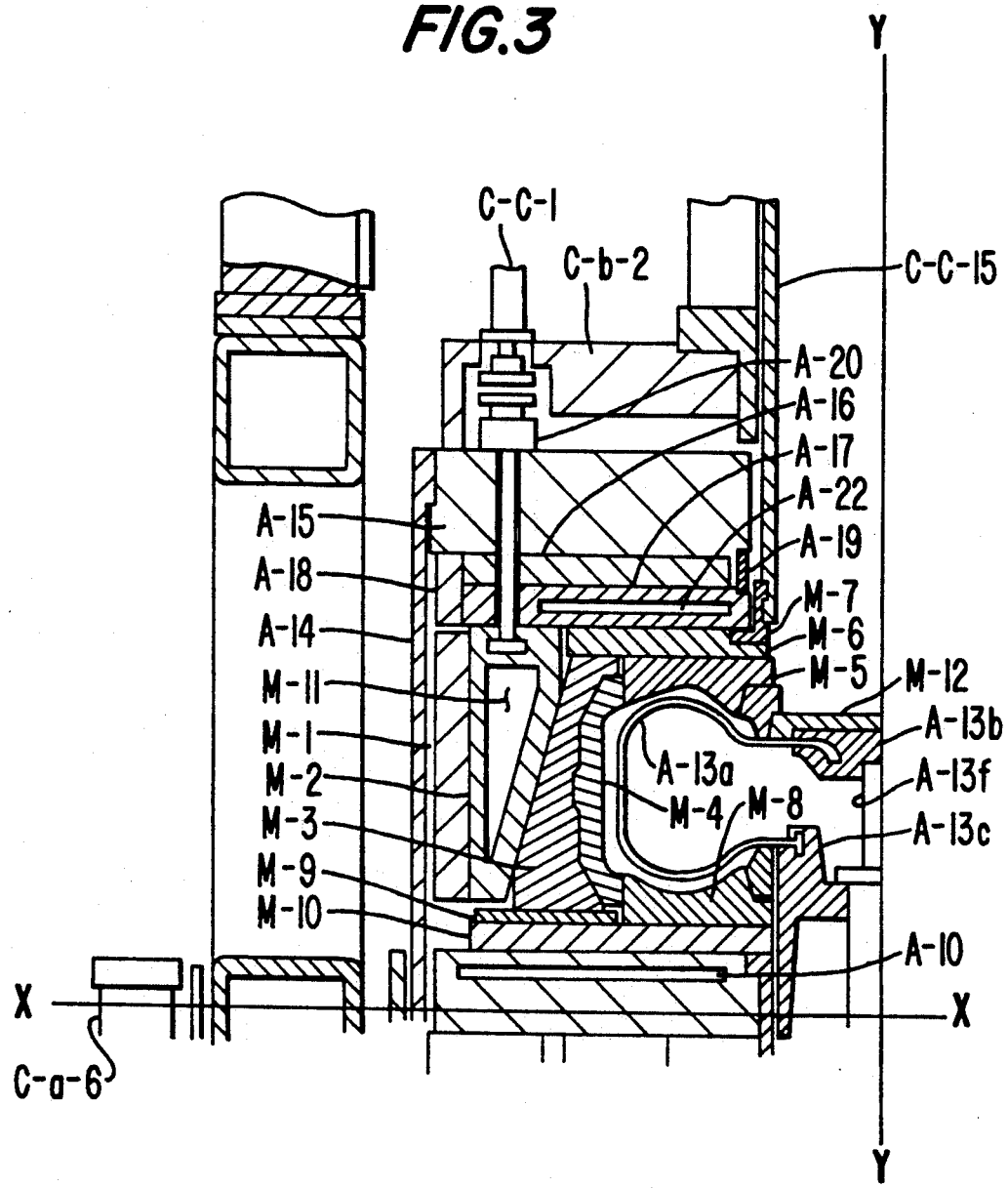
FIG. 3 shows the top left quarter of the arrangement shown in FIG. 2.

FIGS. 5 and 6 show a state where the bladder A-13a is accommodated. The top clamp member A-13b is placed closer to the bottom clamp member A-13c, so that both the top clamp member A-13b and the bottom clamp member A-13c Thus, the bladder A-13a, which is expanded in the position shown in FIG. 3, is folded and, in this state, it is accommodated in the accommodating tube A-13d. The bottom clamp member A-13c is provided at proper positions thereof with a supply port and a discharge port for a heating pressure fluid supplied into and discharged from the bladder A-13a, together with pipes leading to these ports, although these elements are not illustrated.

(7) The upper breach lock tube A-14, which has intermittent teeth engaged with the intermittent teeth of the lower breach lock tube A-4, is secured to an upper bolster plate A-15. The upper bolster plate A-15 has a heating plate A-17 secured to the lower side thereof through a heat insulating material A-16, the heating plate A-17 having a heating fluid circulating passage A-22. The heating plate A-17 is covered with a heat insulating material A-18. The respective central portions of the heating plate A-17 and the upper bolster plate A-15 are fitted with a ring A-19 to prevent these plates from becoming eccentric.

(8) A tire mold M is mounted between the upper heating plate A-17 and the lower bolster plate A-7. As the mold M, a known split mold or an improved split mold proposed by the present applicant is used. The split mold comprises: a known outer ring M-2 covered with a heat insulating material M-1 and having a heating fluid circulating passage M-11 formed therein; circumferentially arranged segments M-3 slidably provided on the inner peripheral inclined surface of the outer ring M-2 and fitted to guide keys (not shown) extending in the direction of the inclination; thread mold members M-4 assembled to the inner periphery of the segments M-3 and provided in the same number as that of segments M-3; an upper side mold member M-5 for forming an upper side wall portion and upper bead portion of a tire; a top plate M-6 having the mold member M-5 attached thereto, the top plate M-6 being fitted at the outer peripheral portion thereof to the segments M-3 and having guide grooves that enable the segments M-3 to slide in the radial direction; a ring M-7 attached to the central portion of the top plate M-6 and having intermittent teeth (female engagement member) engaged with intermittent teeth (male engagement member) provided on a connecting tube C-c-15 disposed in the center of the mold open-close manipulator C in such a manner as to be movable vertically and rotatable; a lower side mold member M-8 for forming a lower side wall portion and lower bead portion of a tire; and a bottom plate M-10 having the lower side mold member M-8 attached thereto and further having a slide member M-9 attached to the outer peripheral portion thereof, the slide member M-9 abutting against the lower side of the segments M-3 to facilitate sliding of the segments M-3.

Figure 12:
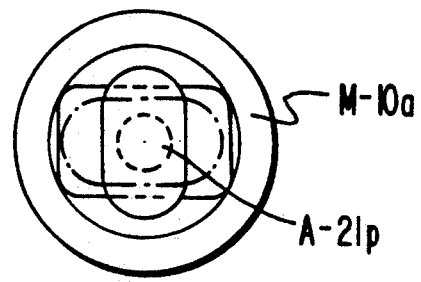
FIG. 12 is a top plan view of a clamp rod portion of the mold clamping device shown in FIG. 11.
Figure 11:
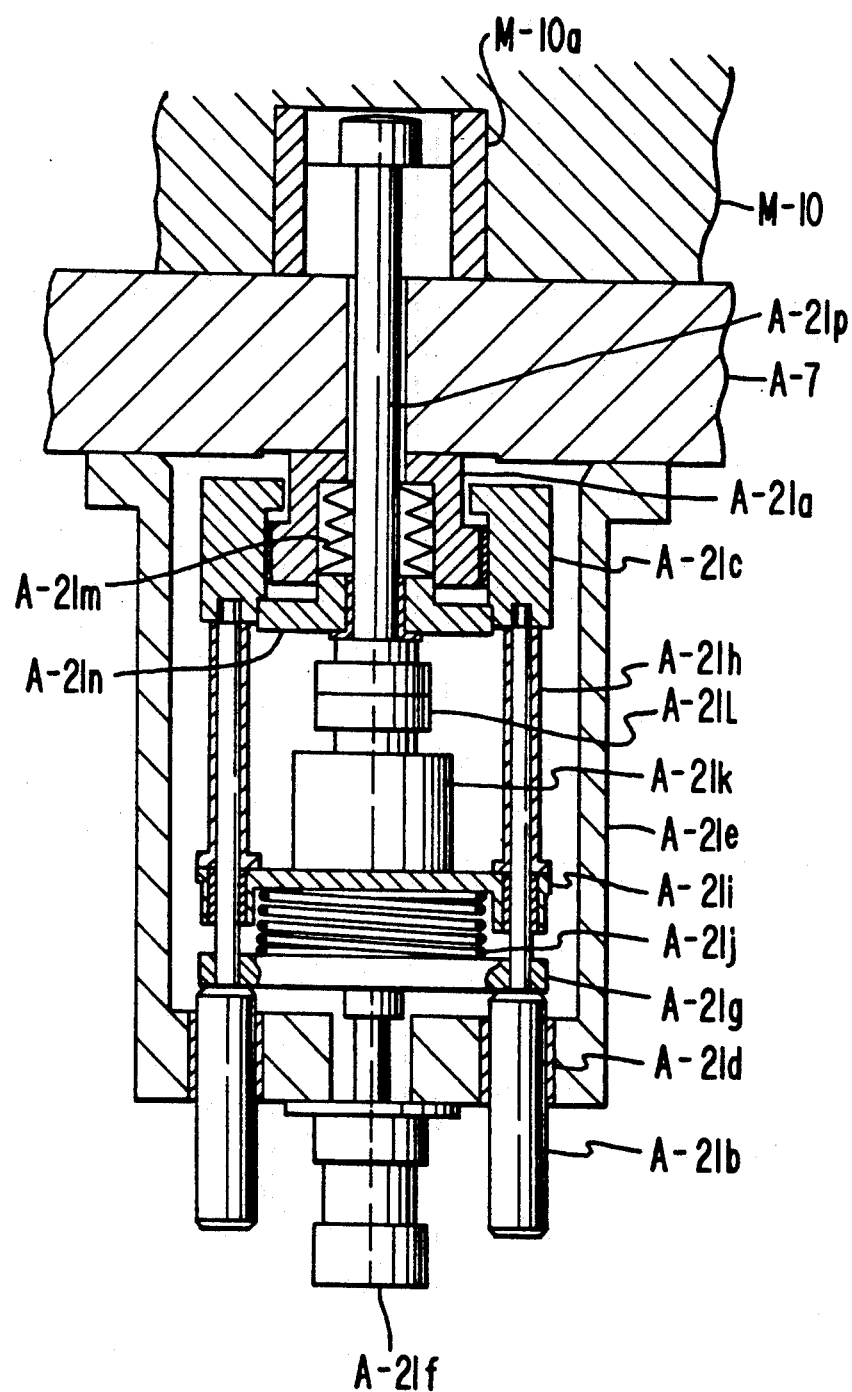
FIG. 11 is a detailed sectional view of a mold clamping device installed at the lower side of a bottom bolster plate in the mold station.

(9) The outer ring M-2 is secured to the upper bolster plate A-15 by mold clamping devices A-20 (FIG. 3). The mold clamping devices A-20 are capable of being actuated by driving devices elements C-c-1 to C-c-9) mounted on a bolster plate C-b-2 of the mold open-close manipulator C. The clamping devices A-20 and the driving devices C-c-1 to C-c-9 will be described later in detail. The upper bolster plate A-15 is capable of being connected and disconnected to the mold outer ring M-2 by the clamping devices A-20 and the driving devices C-c mounted on the bolster plate C-b-2 of the mold open-close manipulator C. The bottom plate M-10 is capable of being connected to and disconnected from the lower bolster plate A-7 by mold clamping devices A-21, described later with reference to FIGS. 11 and 12, which are mounted on the lower bolster plate A-7.

(10) The details of the mold clamping devices A-20 and the driving devices C-c-1 to C-c-9 (see FIGS. 9 and 10):

A plurality of mold clamping devices A-20 are mounted on the upper side of the upper bolster plate A-15 in each mold station, and driving devices C-c-1 to C-c-9 are mounted on the bolster plate C-b-2 of the mold open-close manipulator C at respective positions which face the clamping devices A-20. Each mold clamping device A-20 comprises a spring box A-20a, a housing A-20c slidably fitted on the spring box A-20a through a plurality of rods A-20b provided vertically on the bolster plate A-15 to extend through bores provided at proper positions in the outer peripheral portion of the housing A-20c, a plate A-20f threaded into the housing A-20c and having in its center a slide member A-20e for guiding a clamp rod A-20d, and a plurality of coned disc springs A-20g accommodated inbetween the plate A-20f and the spring box A-20a.

The clamp rod A-20d is vertically movable by being guided through the slide member A-20e of the plate A-20f and a slide member A-20h provided in the spring box A-20a. The upper end portion of the rod A-20d has a larger diameter than that of the sliding portion thereof, and a friction plate A-20i is secured to the top surface of the rod A-20d. The other end portion of the rod A-20d extends through the bolster plate A-15, the heat insulating material A-16 and the heating plate A-17 and is fitted to a block M-2a that is buried in a proper portion of the outer ring M-2 of the tire mold M through a threaded engagement therewith.

Figure 10:
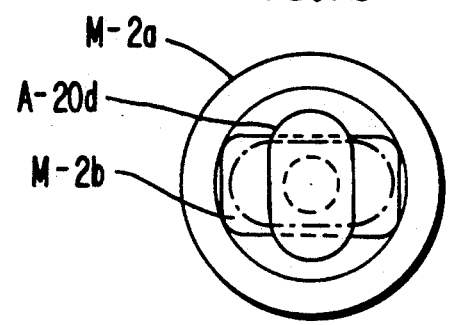
FIG. 10 is a bottom view of a clamp rod portion of the mold clamping device shown in FIG. 9.

FIG. 10 shows the clamp rod A-20d and the block M-2a as seen from the lower end side of the rod A-20d. The lower end of the rod A-20d has an oval projection with such a shape that it can pass through a groove M-2b provided in the block M-2a, as shown by the one-dot chain line in the figure, and it can also be placed to intersect the groove M-2b, as shown by the solid line.

In addition, the lower end face of the rod A-20d has a conical portion whose vertex is coincident with the axis. With the clamp device having the described structure, the oval projection at the end of the rod A-20d is brought to abut against the edge portions of the groove M-2b in the block M-2a by the resilient force from the coned disc springs A-20g, thus enabling the outer ring M-2 to be firmly secured to the heating plate A-17, as illustrated. On the other hand, if the coned disc springs A-20g are deflected by pressing the housing A-20c through the plate A-20f so as to cancel the force with which the upper end portion of the rod A-20d and the plate A-20f abut against each other and, in this state, the rod A-20d is rotated through 90°, the state shown by the one-dot chain line in FIG. 10 is reached, so that the outer ring M-2 can be disconnected. If an operation reverse to the above is conducted, the outer ring M-2 can be connected by the engagement as shown by the solid line in FIG. 10.

The driving devices C-c-1 to C-c-9 for the above-described connection and disconnection are mounted on the bolster plate C-b-2 of the mold open-close manipulator C. Since the manipulator C is used for a plurality of mold stations in common, the clamp driving devices C-c-1 to C-c-9 are provided on the manipulator C so as to be usable in common for the clamping devices A-20 of each mold station. The driving devices C-c-1 to C-c-9 are disposed on the bolster plate C-b-2 in such a manner as to face the clamping devices A-20, respectively. In other words, the number of driving devices C-c-1 to C-c-9 is the same as that of mold clamping devices A-20.

A hydraulic cylinder C-c-1 is rigidly secured to the bolster plate C-b-2, and a plate C-c-2 is secured to the rod end of the cylinder C-c-1. The plate C-c-2 has a plurality of guide rods C-c-3, which are guided by respective slide members C-c-4 provided in the bolster plate C-b-2. Below the rods C-c-3 are provided a slidable plate C-c-5 and spacers C-c-6 that limit the downward movement of the plate C-c-5. A spring C-c-7 is disposed between the plate C-c-2 and the plate C-c-5. In addition, a known rotational driving device C-c-8 such as a "rotary cylinder" is secured to the lower side of the plate C-c-5. A friction plate C-c-9 is attached to the end of the output shaft of the driving device C-c-8 in such a manner as to face the friction plate A-20i of the clamping device A-20.

When the cylinder C-c-1 retracts, the two friction plates C-c-9 and A-20i face each other across a gap, and the distal ends of the rods C-c-3 also face the housing A-20c of the clamping device A-20 across a gap without being in contact with it, as illustrated. With the described structure, when the cylinder C-c-1 is extended, the rods C-c-3 come into contact with the housing A-20c to deflect the springs A-20g, thereby releasing the clamp rod A-20d from the resilient force for abutment. At the same time, the friction plate C-c-9 is brought into contact with the friction plate A-20i, so that the clamp rod A-20d can be rotated by the driving device C-c-8 through friction between the two friction plates that is maintained by the spring C-c-7.

(11) The details of the mold clamping devices A-21 (see FIGS. 11 and 12):

A plurality of mold clamping devices A-21 are mounted on the lower side of the lower bolster plate A-7 of each mold station. Each mold clamping device A-21 comprises: a spring box A-21a; guide rods A-21b provided vertically on a housing A-21c slidably fitted on the spring box A-21a; a housing A-21e rigidly secured to the bolster plate A-7 and having in the bottom thereof slide members A-21d for guiding the guide rods A-21b; a hydraulic cylinder A-21f secured to the lower end of the housing A-21e; a plate A-21g secured to the rod end of the cylinder A-21f and threaded to the rods A-21b; a plate A-21i slidably fitted on the guide rods A-21b and limited in sliding movement by spacers A-21h; a spring A-21j disposed between the plate A-21i and the plate A-21g; a rotational driving device A-21k secured to the plate A-21i; a flange A-21l secured to the end of the output shaft of the driving device A-21k; a plate A-21m threaded to the housing A-21c; a plurality of coned disc springs A-21n disposed between the spring box A-21a and the plate A-21m; and a clamp rod A-21p formed to be integral with a flange A-21o that is coupled to the flange A-21l, the clamp rod A-21p being guided by the respective central portions of the plate A-21m and the spring box A-21a. The upper end portion of the clamp rod A-21p is arranged in the same way as in the case of the clamp rod A-20d of the clamping device A-20, while a block M-10a that is buried in the bottom plate M-10 is arranged in the same way as in the case of the block M-2a in the clamping device A-20.

With the above-described structure, the housing A-21c is raised through the rods A-21b by a pushing-up operation of the hydraulic cylinder A-21f, causing the springs A-21n to be deflected. In this state, the clamp rod A-21p is rotated by the driving device A-21k, thereby allowing the oval projection at the distal end of the rod A-21p to engage with or disengage from the block M-10a.

Figure 14:
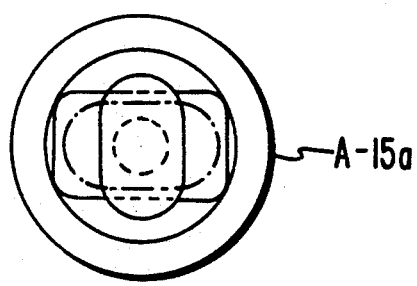
FIG. 14 is a bottom view of a clamp rod portion of the clamping device shown in FIG. 13.
Figure 13:
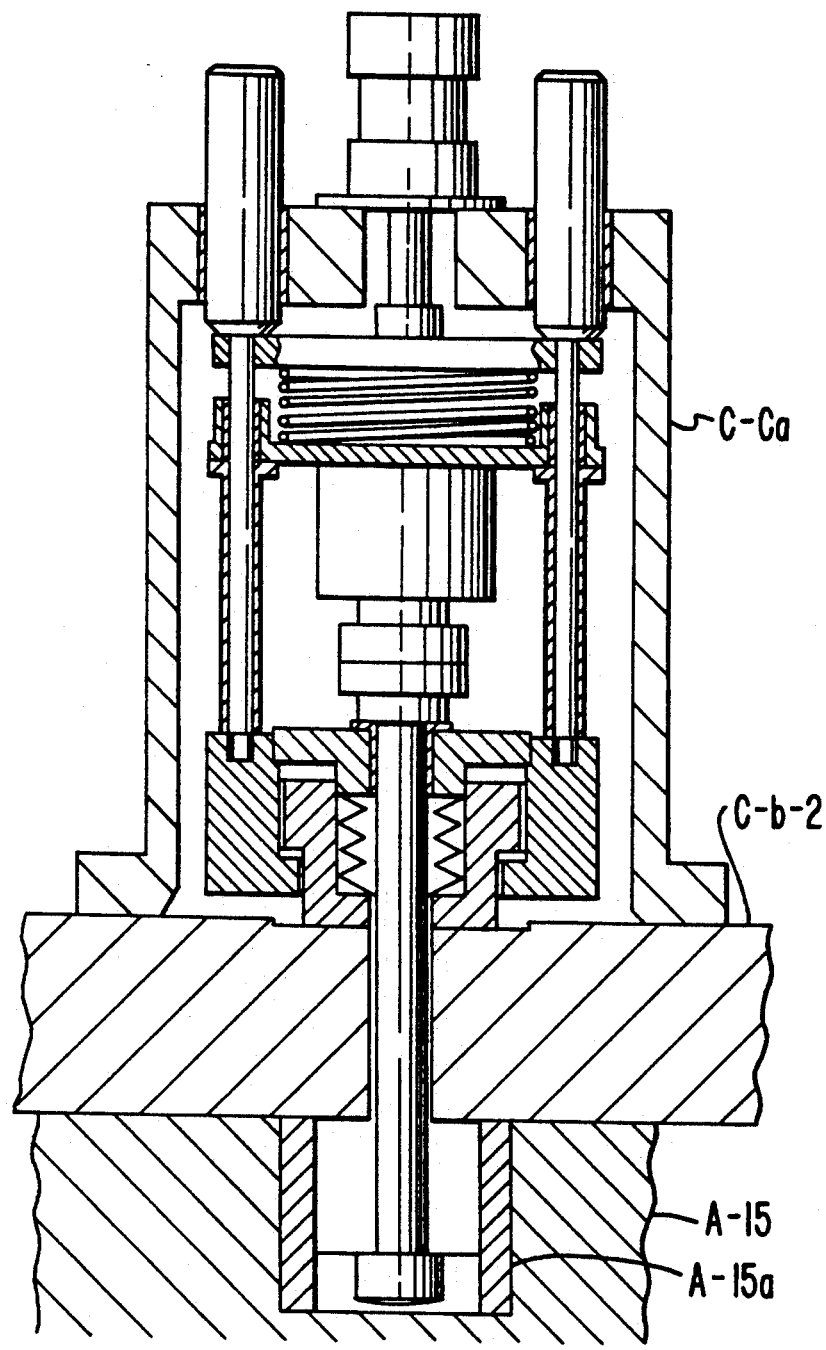
FIG. 13 is a detailed sectional view of a clamping device attached to a bolster plate of a mold open-close manipulator.

(12) The details of clamping devices C-ca:

The clamping devices C-ca are mounted on the bolster plate C-b-2 of the mold open-close manipulator C. The arrangement of each clamping device C-ca is the same as that of the clamping device A-21 except that these devices are in an upside-down relation to each other and that a housing which is the counterpart of the housing A-21e of the clamping device A-21 is mounted on the bolster plate C-b-2 of the mold open-close manipulator C and a block A-15a that is engaged with a clamp rod is buried in the upper bolster plate A-15 in threaded engagement herewith, as shown in FIGS. 13 and 14 in detail. Since the arrangement of the clamping device C-ca will readily be understood from FIGS. 13 and 14 by those skilled in the art a detailed description thereof is omitted.

(13) The above-described clamping devices function as follows:

(a) When the system is in operation for vulcanization during which a mold change is not needed, the clamping devices A-20 constantly hold the outer ring M-2 of the tire mold M in connection with the upper bolster plate A-15 of each mold station. In other words, the driving devices C-c-1 to C-c-9 of the manipulator C are in an inoperative state. Only when the manipulator C is placed in position at the first or second mold preparing station D₁ or D₂ are the driving devices C-c-1 to C-c-9 are moved and joined to the clamping devices A-20 to connect and disconnect the outer ring M-2 and the bolster plate A-15.

(b) The clamping devices A-21, which are mounted on the lower bolster plate A-7 of each mold station, constantly hold the bottom plate M-10 of the tire mold M in connection with the lower bolster plate A-7 of the mold station during the vulcanization operation. The clamping devices A-21 disconnect the bottom plate M-10 from the lower bolster plate A-7 when the tire mold M is to be moved to the second mold preparing station D₂ for replacement by the manipulator C.

After a new mold has been carried from the first mold preparing station D₁ and installed on the lower bolster plate A-7 by the manipulator C, the mold clamping devices A-21 are used to connect together the bottom plate M-10 and the lower bolster plate A-7 for a production operation.

(c) The clamping devices C-ca, which are mounted on the manipulator C that moves between the mold stations, effect connection and disconnection each time a mold in each mold station is closed and opened.

The clamping devices C-ca are held in a connected state while the manipulator C is moving between a mold station and a mold preparing station to receive and deliver a mold at the time of mold change.

(14) Devices for supplying and discharging a heating fluid at each mold station:

Constituent elements of each mold station which are to be movable slidably for opening and closing a mold are as follows: the upper bolster plate A-15, the upper breach lock tube A-14, the heat insulating materials A-16 and A-18, the ring A-19, the heating plate A-17, and constituent elements of the mold M, i.e., the outer ring M-2, the heat insulating material M-1, the segments M-3, the tread mold members M-4, the upper side mold member M-5, the ring M-7, and the top plate M-6.

The heating plate A-17 and the outer ring M-2 individually need pipes for supplying and discharging a heating fluid that is circulated. In the conventional press, since the above-described movable elements are movable only vertically and only horizontally a little, each movable element is allowed to connect flexibly with a proper position of a stationary part of the press through a hose or a steel pipe through a swivel joint. However, the system herein proposed needs not only vertical movement for a production operation at each mold station but also movement from each mold station to a mold preparing station installed a long way from it for a mold changing operation and hence cannot attain the object of realizing automatic mold change with the conventional heating fluid supply and discharge method (using hoses or the like). Accordingly, the present applicant proposes arrangements described below in regard to:

(a) devices for supplying and discharging a heating fluid to and from the heating plate A-17 in each mold station; and (b) devices for supplying and discharging a heating fluid to and from the outer ring M-2 of the mold M in each mold station.

Figure 15:
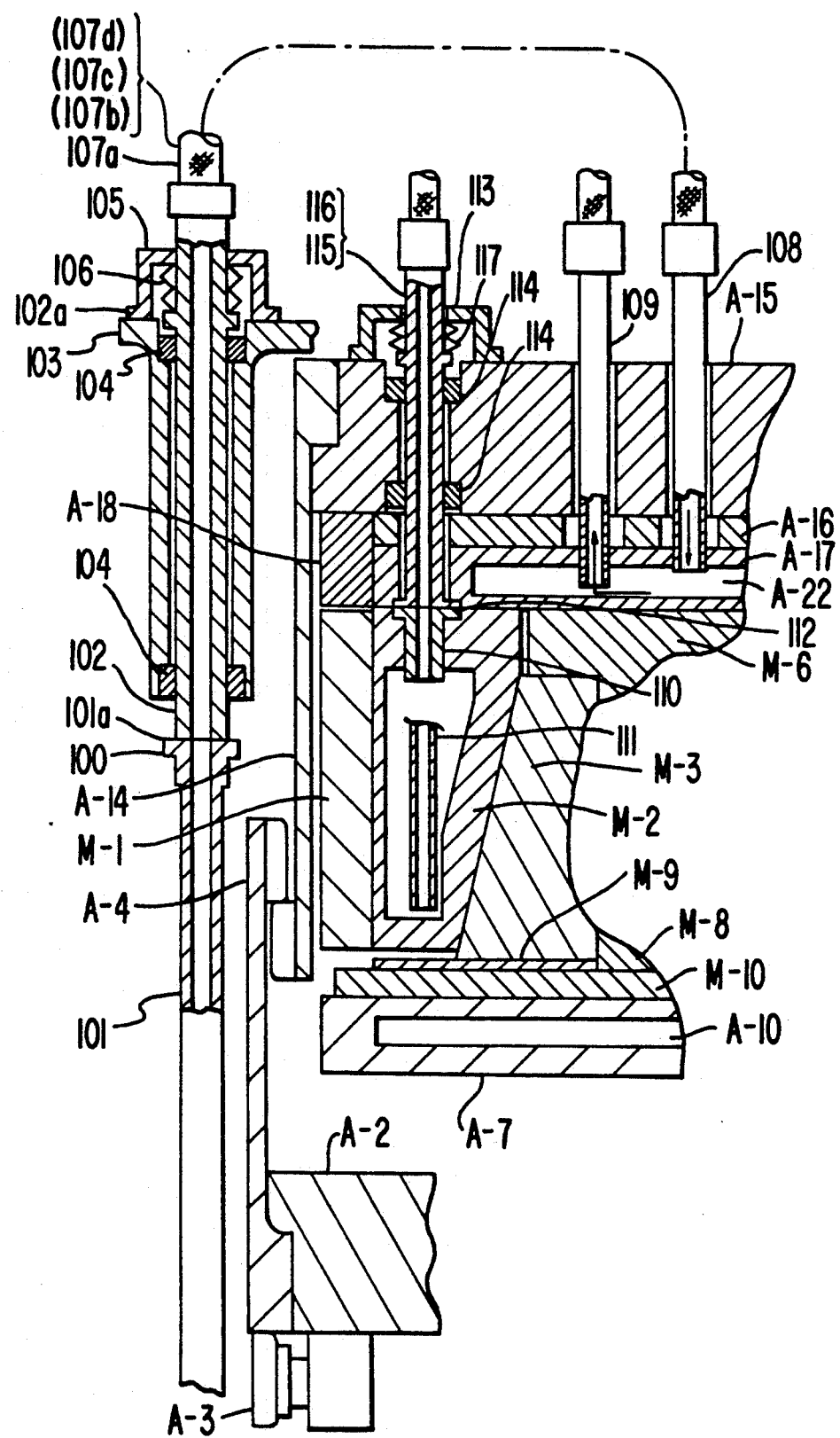
FIG. 15 is a fragmentary sectional view of heating fluid supply and discharge devices in the mold station.
Figure 16:
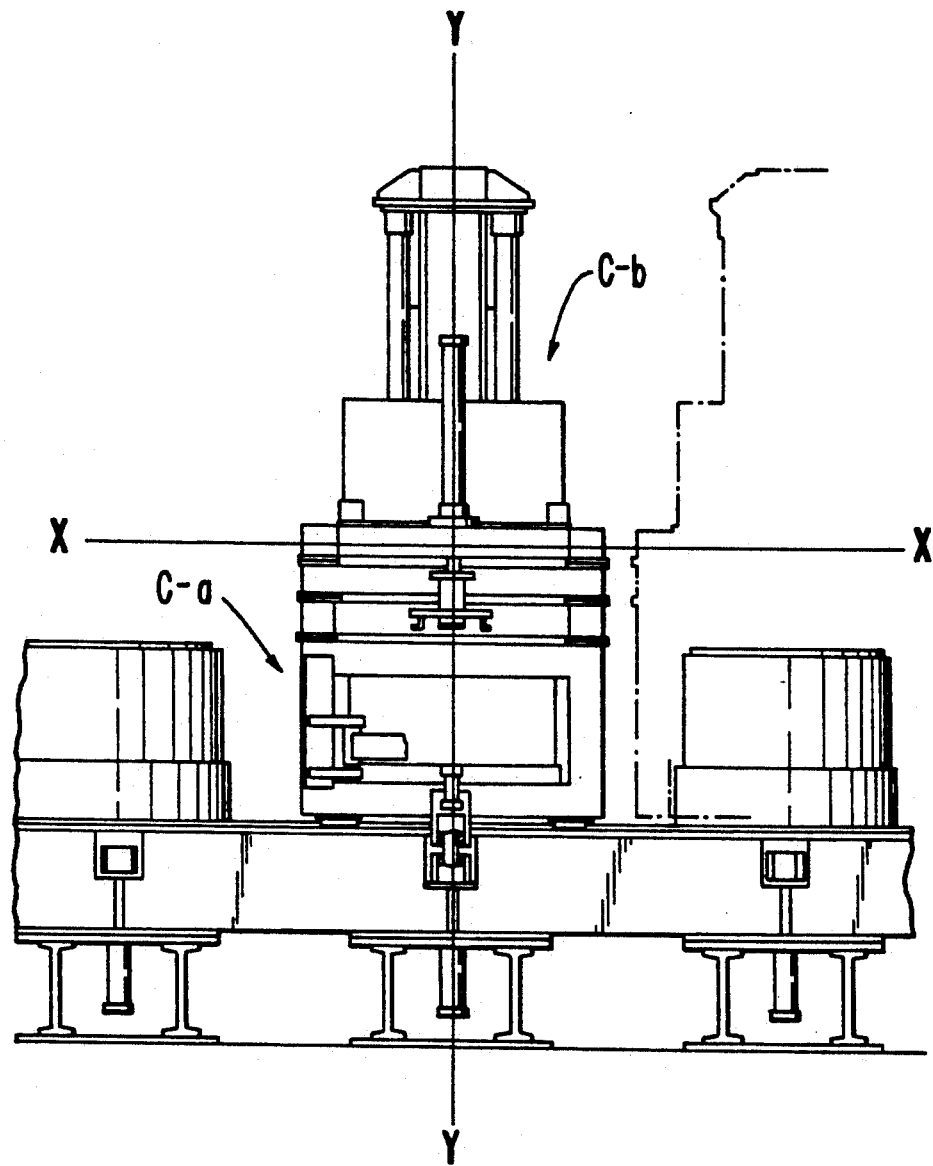
FIG. 16 is a front view showing the mold open-close manipulator and a pair of left and right mold stations.
Figure 17:
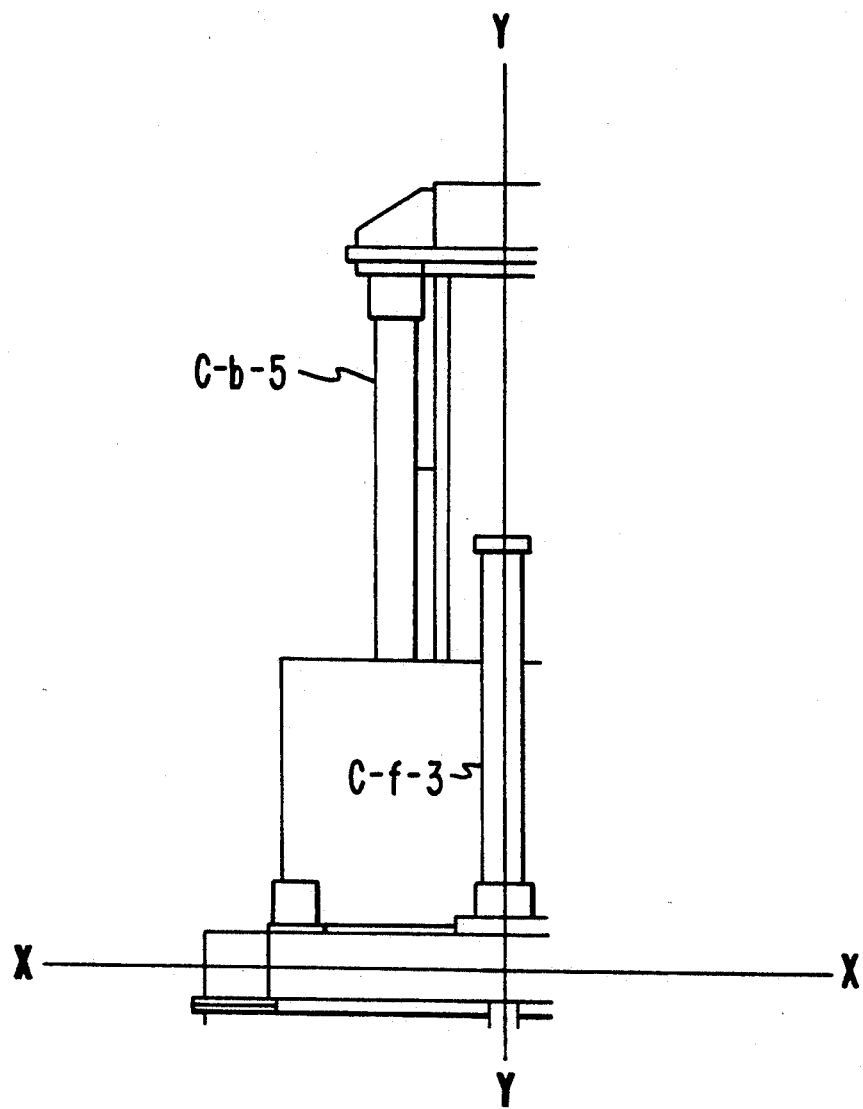
FIG. 17 shows the top left quarter of the arrangement shown in FIG. 16.
Figure 18:
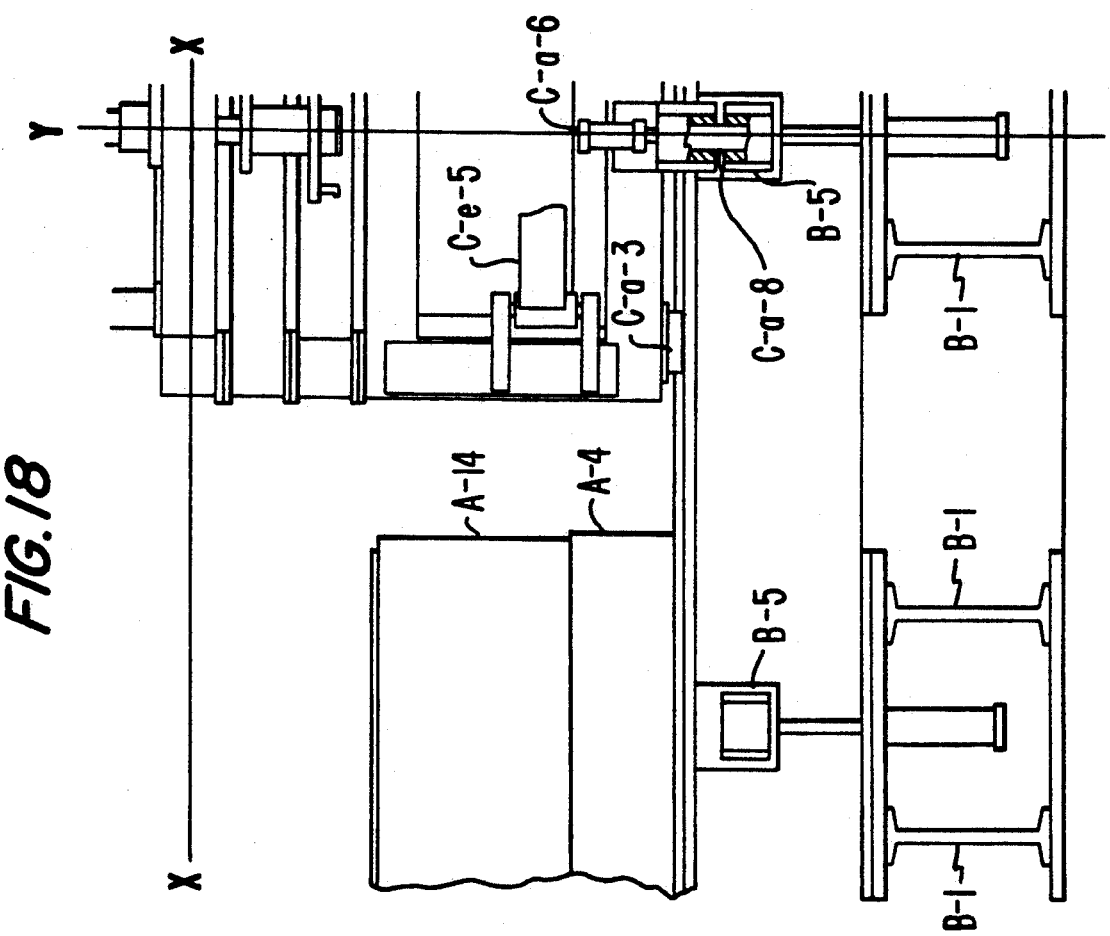
FIG. 18 shows the bottom left quarter of the arrangement shown in FIG. 16.
Figure 19:
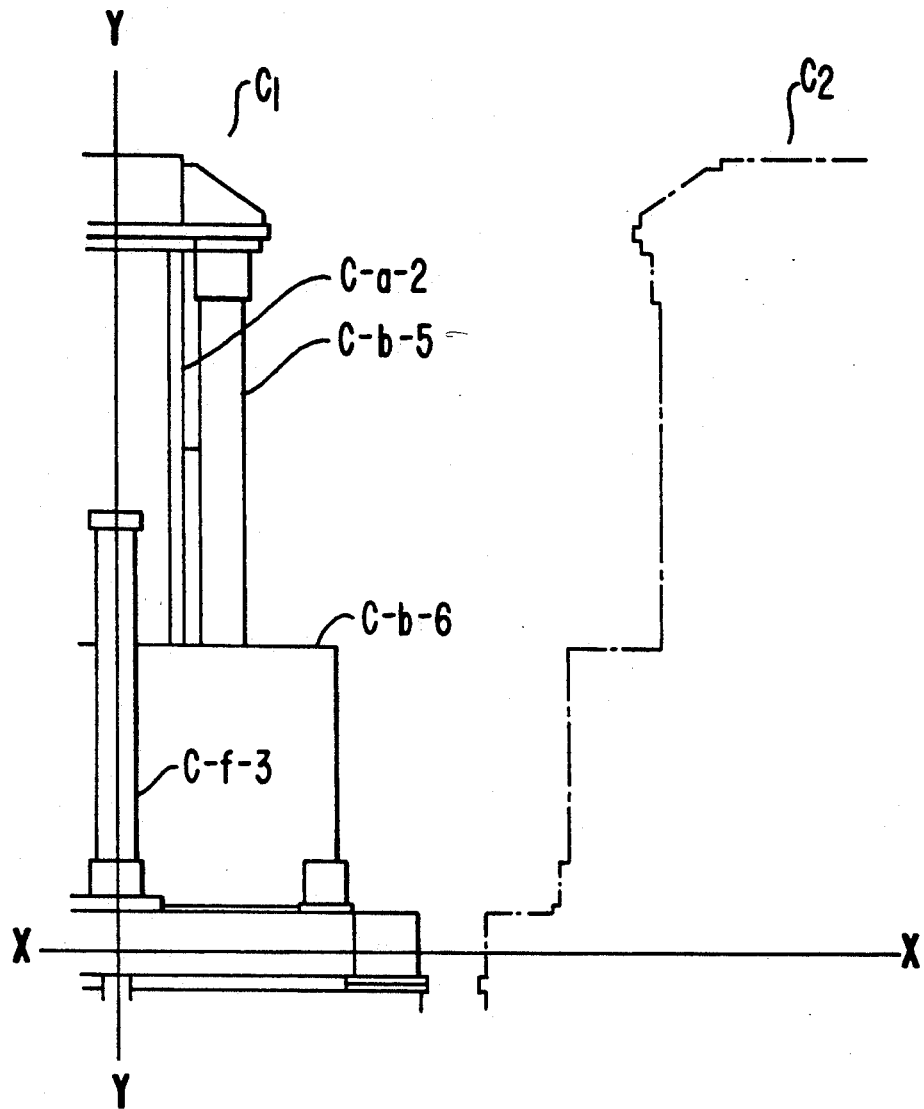
FIG. 19 shows the top right quarter of the arrangement shown in FIG. 16.

FIG. 15 is a fragmentary sectional view showing a mold and a mold station within a range adequate for illustration and description of the heating fluid supply and discharge devices. Each mold station has a bottom pipe 101 secured to the stationary side of the mold station in such a manner as to extend vertically, the bottom pipe 101 having a flange portion 101a with a seal member 100 buried in the upper end face thereof. A top pipe 102 is supported and guided by slide members 104, made of a heat insulating material, provided in a bracket 103 that is rigidly secured to a proper portion of the upper bolster plate A-15 of the mold station such that the end face of the top pipe 102 may be moved into and out of contact with the seal member 100.

A projection 102a is provided on the upper portion of the top pipe 102, and a plurality of coned disc springs 106 are incorporated inbetween the projection 102a and a spring box 105 that is rigidly secured to the bracket 103, thereby enabling the seal member 100 and the end face of the pipe 102 to abut against each other with a satisfactorily high holding force during the vulcanizing operation carried out with the mold closed.

In addition, a hose 107a having a known joint is connected to the upper portion of the top pipe 102 that is above the spring box 105, the hose 107a being connected through a joint to a pipe 108 that is secured to the heating plate A-17 in such a manner as to extend therefrom vertically.

Although in FIG. 15 only one set of constituent elements 100 to 107a is shown, a total of four sets of such elements are provided per mold station. The hose 107a in the first set is connected to the pipe 108 for supplying a heating fluid to the heating plate A-17. The hose 107b in the second set is connected to a pipe 109 that is secured to the heating plate A-17 in such a manner that it extends therefrom vertically and the inner end of the pipe 109 extends as far as the bottom of the heating plate A-17, whereby the pipe 109 is used for discharging the fluid from the circulating passage A-22 in the heating plate A-17. The hose 107c in the third set is connected to a pipe 115 that communicates with an inlet port 110 for supplying the fluid to a circulating passage provided in the outer ring M-2 of the mold M. The hose 107d in the fourth set is connected to a pipe 116 that communicates with an outlet port 111 for discharging the fluid from the bottom of the outer ring M-2 of the mold M.

By virtue of the above-described structure, when the mold is closed, the lower end of the top pipe 102 is held in close contact with the seal member 100 that is rigidly secured to the flange portion 101a of the bottom pipe 101, thus enabling the heating pressure fluid to be supplied and discharged. Piping passages for supplying and discharging the heating fluid can also be automatically formed when the top movable members of the mold station move upwardly at the time of opening the mold, and when the manipulator C moves to the first or second mold preparing station $D_1$ or $D_2$ for mold change, and also when the vulcanizing operation at the mold station is resumed after a new mold has been carried thereto by the manipulator C. It should be noted that before the top pipe 102 is separated from the seal member 100, the circulation of the fluid in the passages is stopped and the pressure inside the passages is controlled by known valves (not shown) disposed at proper positions on the bottom pipe side, and after the completion of the contact between the lower end of the top pipe 102 and the seal member 100, the supply of the heating fluid is resumed by the above-described valves, as a matter of course. Since a control circuit comprising valves can readily be arranged by combining known valves, a detailed description thereof is omitted.

At the time of a mold change, it is necessary to effect an automatic disconnection of the supply and discharge devices at the outer ring M-2 of the mold M at the second mold preparing station $D_2$, an automatic disconnection of a new mold when received from the first mold preparing station $D_1$, and an automatic connection of the supply and discharge passages for the outer ring M-2 and the heating plate A-17 of the mold station to which the new mold is transferred. Supply and discharge devices designed for the automatic connection are similarly shown in FIG. 15. The outer ring M-2 of the mold M is equipped with a supply port 110 provided with a seal member 112 and a discharge port 111, which has a structure similar to that of the supply port 110 provided with the seal member 112 but is disposed at a proper position that is separated from the supply port 110. The lower end of the discharge port 111 extends as far as the bottom of the circulating passage in the outer ring M-2.

Since the supply device and the discharge device are substantially structurally the same, the following description will be made as to only the supply device. A top supply pipe 115 is slidably supported by a spring box 113 rigidly secured to the upper bolster plate A-15 and slide members 114, made of a heat insulating material, which are fixedly buried in the upper bolster plate A-15, and it is biased by a plurality of coned disc springs 117 so that the inner end of the top supply pipe 115 abuts against the seal member 112 attached to the supply port 110, thus enabling the seal member 112 and the top pipe 115 to come into contact with each other firmly when the outer ring M-2 of the mold M is tightly secured to the heating plate A-17 by the mold clamping devices A-20 (see FIGS. 9 and 10). The upper end of the top pipe 115 is connected to the above-described third device by the hose 107c through a joint 116.

With the above-described arrangement, when the connection that is made by the mold clamping devices A-20 is released at the second mold preparing station $D_2$, the supply and discharge devices at the outer ring M-2 of the mold M are automatically disconnected. Then, the manipulator C receives a new mold at the first mold preparing station $D_1$. When the connection is made by the mold clamping devices A-20, the supply and discharge devices are also automatically connected. Further, when the mold is closed after being moved to the mold station concerned, the movable parts of the mold are automatically connected to the corresponding parts on the stationary side of the mold station.

COMMON BASE FRAME B

Figure 24:
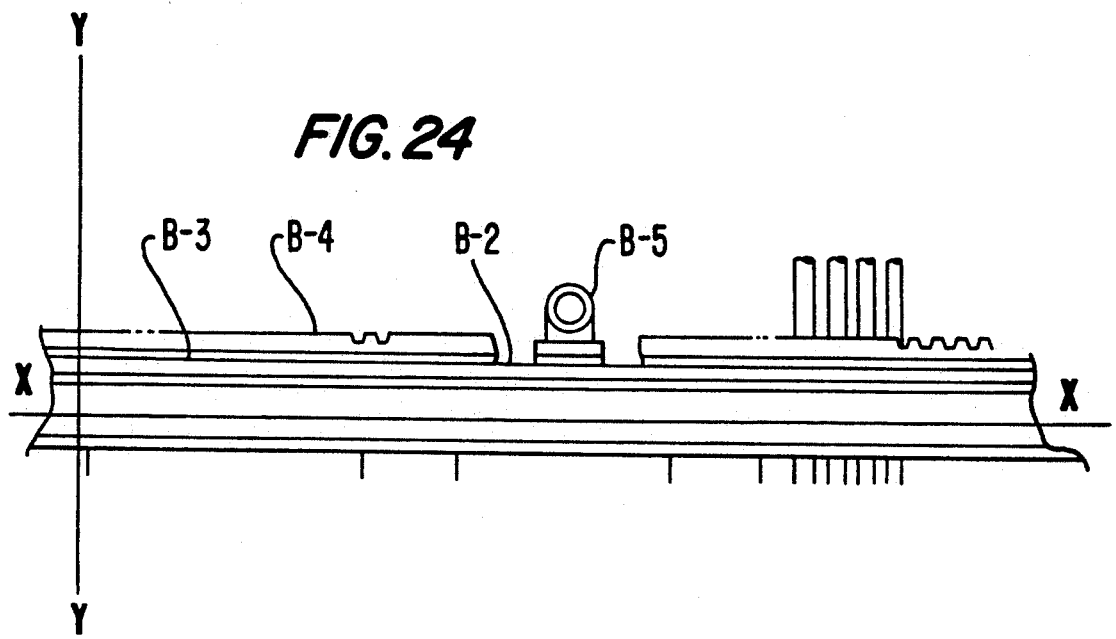
FIG. 24 shows the top right quarter of the arrangement shown in FIG. 21.
Figure 20:
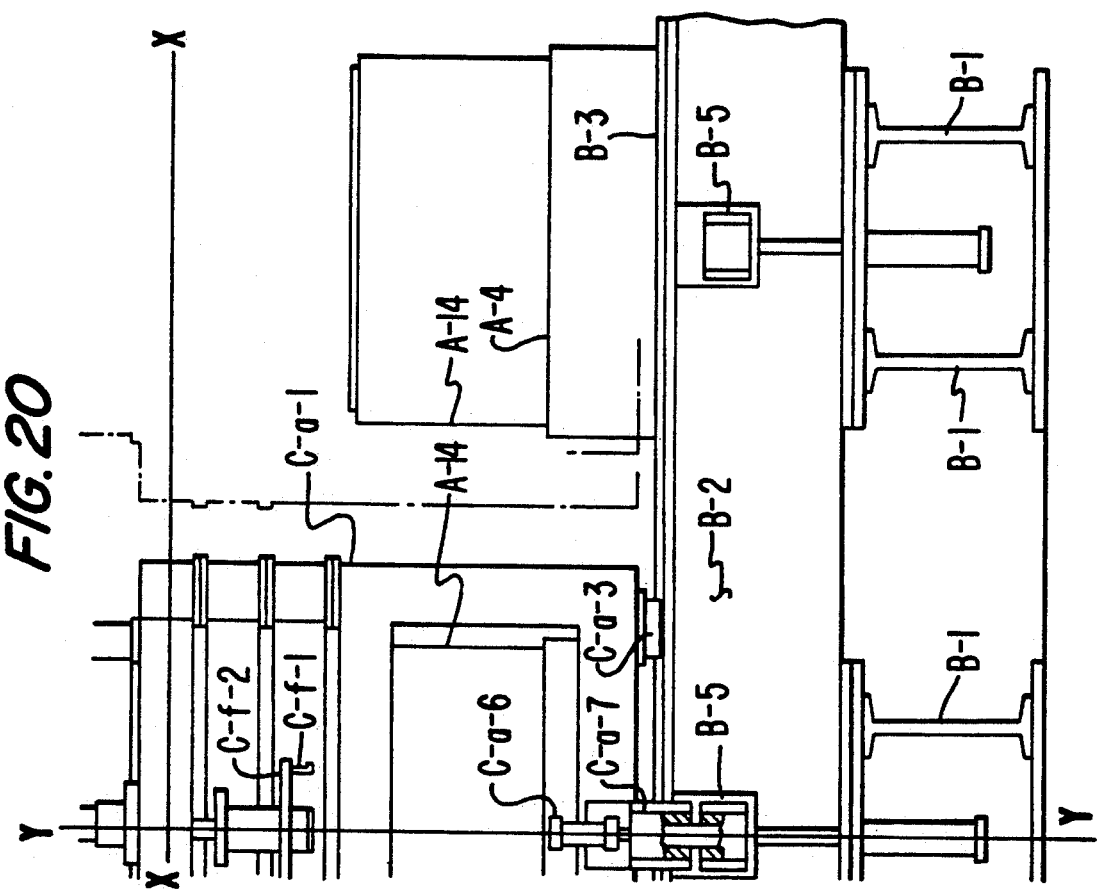
FIG. 20 shows the bottom right quarter of the arrangement shown in FIG. 16.
Figure 41:
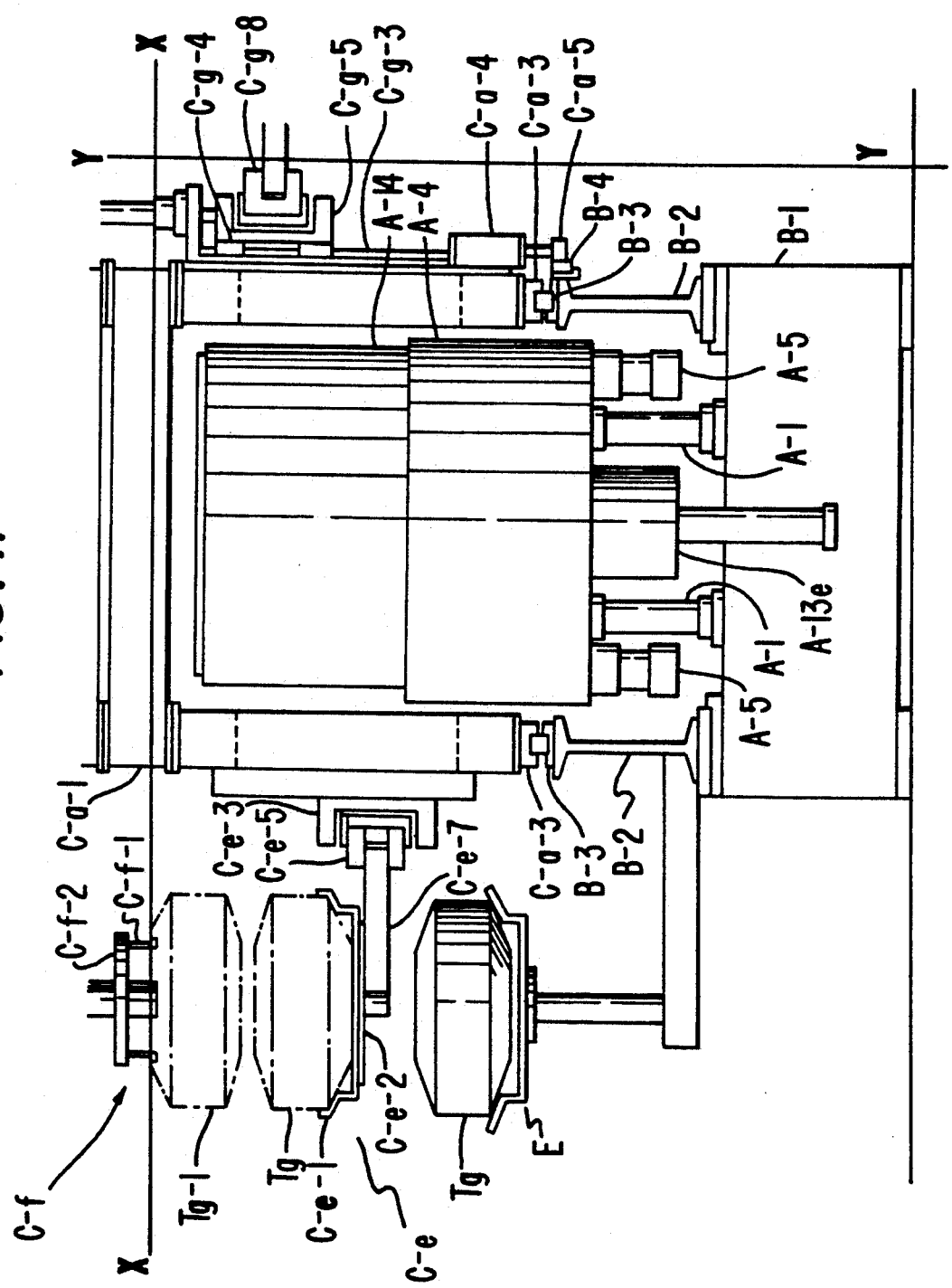
FIG. 41 shows the bottom left quarter of the arrangement shown in FIG. 39.
Figure 43:
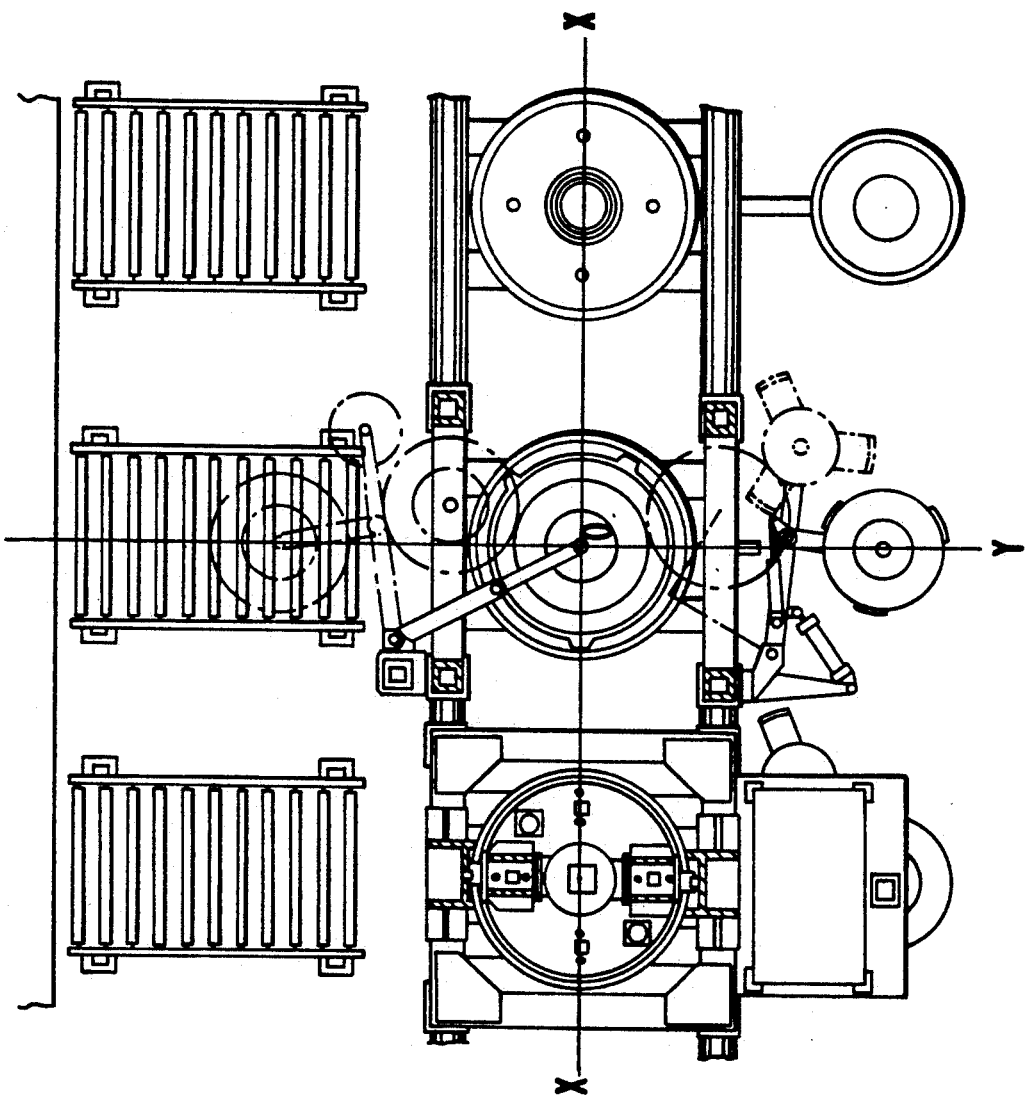
FIG. 43 is a plan view of mold stations and manipulators, the first manipulator being shown in a sectional view seen from the arrow Q—Q in FIG. 40, and the second manipulator being shown in a sectional view seen from the arrow P—P in FIG. 5.
Figure 44:
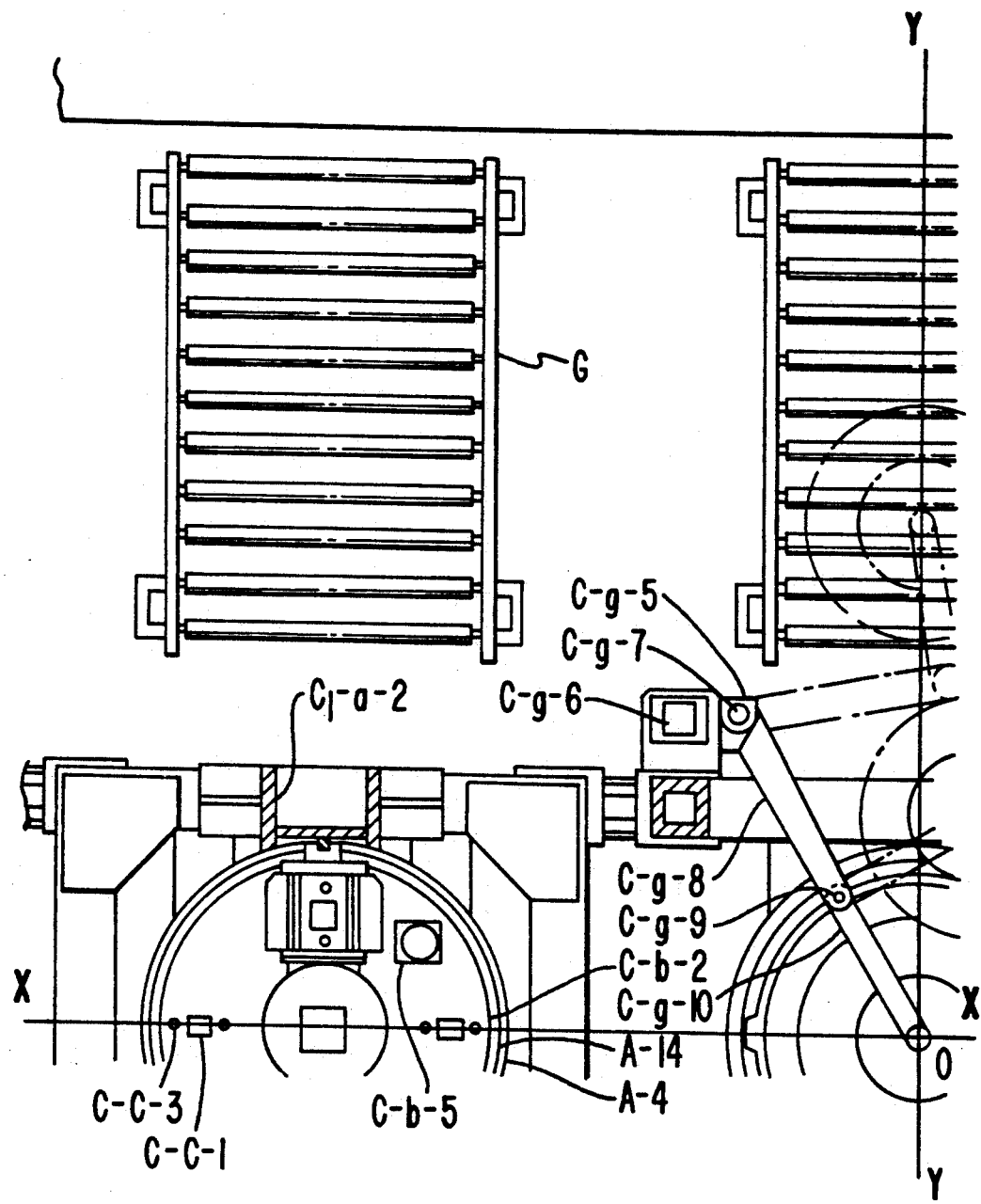
FIG. 44 shows the top left quarter of the arrangement shown in FIG. 44.
Figure 46:
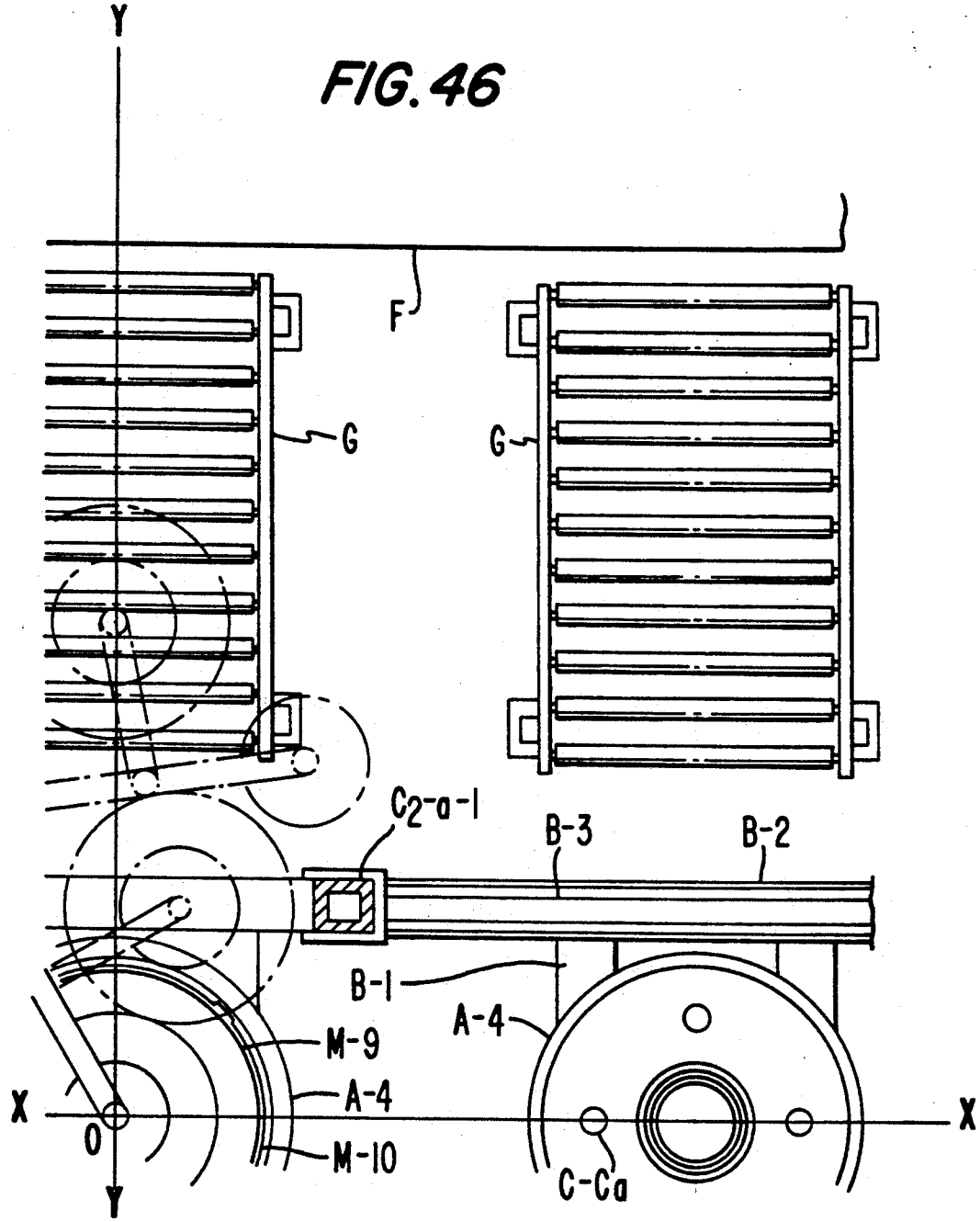
FIG. 46 shows the top right quarter of the arrangement shown in FIG. 43.

As shown in FIGS. 1 to 6, beams B-2 extend over the entire length of a plurality of mold stations. On the beams B-2, cross beams B-1 are disposed at proper positions in each mold station, and the mold stations $A_1$ to $A_{12}$ and the first and second mold preparing stations $D_1$ and $D_2$ are each provided upright on the cross beams B-1. Each beam B-2 has a precision track member (generally known as an "LM guide") B-3 (see FIG. 20) rigidly secured to the top thereof. The track member B-3 is engaged with a bearing nut C-a-3 attached to a frame C-a-1 of the mold open-close manipulator C (described later). A rack B-4 (see FIG. 24) is disposed on a proper portion of the beam B-2 over the entire distance through which the mold open-close manipulator C moves. The rack B-4 is in mesh with a pinion C-a-5 attached to the end of the output shaft of a rotational driving device C-a-4 rigidly provided on a truck constituting the manipulator C (see FIG. 41).

FIGS. 2 to 6 and FIGS. 16 to 20 show a positioning device which is designed so that the mold open-close manipulator C is positioned accurately at each of the mold stations and the first mold preparing station $D_1$. The positioning device comprises a pin C-a-8 that is vertically movable by a cylinder C-a-6 mounted on the truck of the mold open-close manipulator C, a guide bracket C-a-7 for the pin C-a-8, and pin guides B-5 that are secured to the common base frame B so as to be fitted with the pin C-a-8. The positioning device is provided on each of the front and rear ends of the truck. The arrangement of the positioning device is shown in FIGS. 17 to 20.

MOLD PREPARING STATION D

FIGS. 21 to 25 are plan views of the mold preparing station (comprising a pair of first and second stations $D_1$ and $D_2$), a mold station which is adjacent to the mold preparing stations, and the common base frame B.

Figure 26:
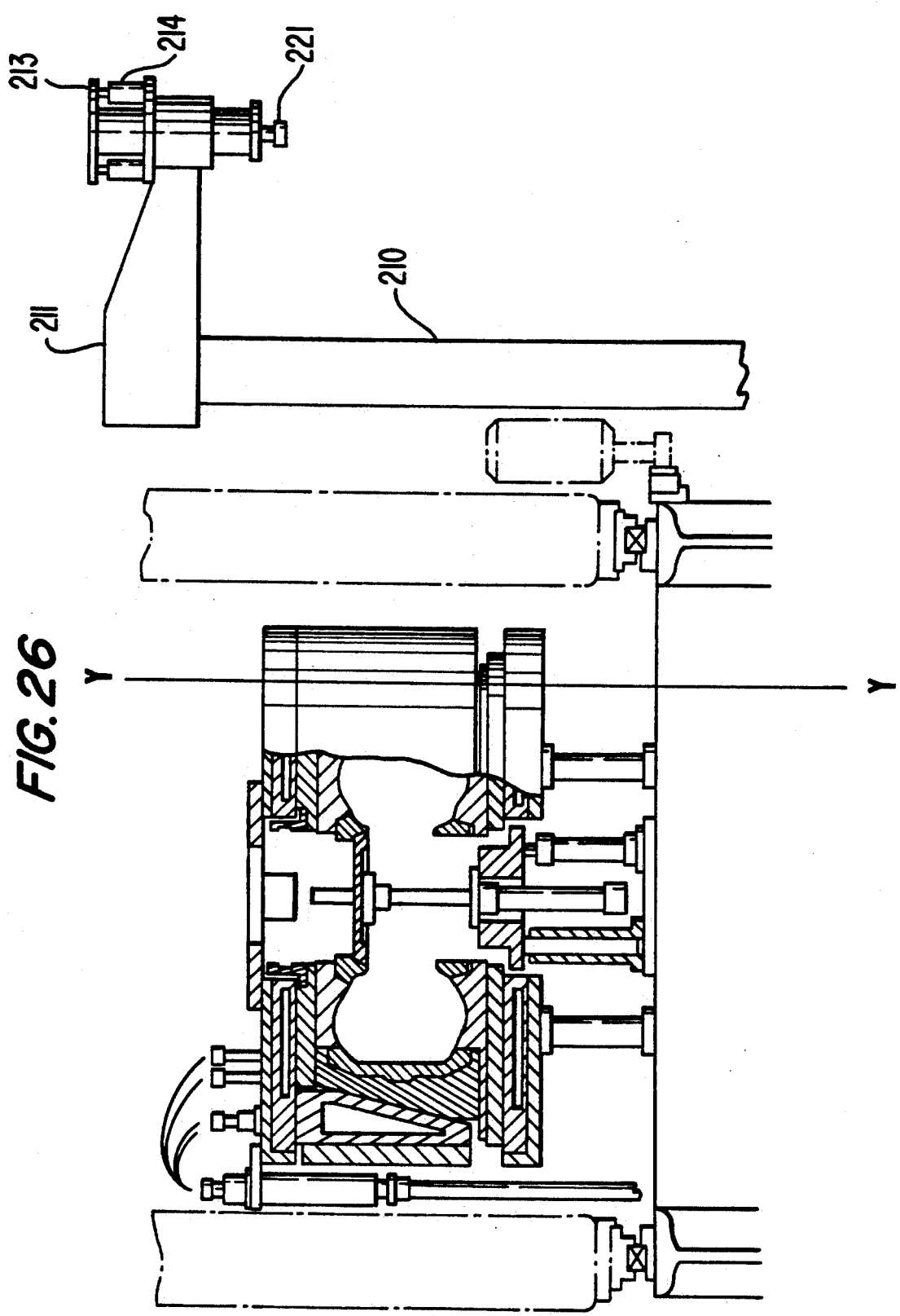
FIG. 26 is a side view, partially in section, of the mold preparing station which is in a state where a new mold is being heated therein.
Figure 27:
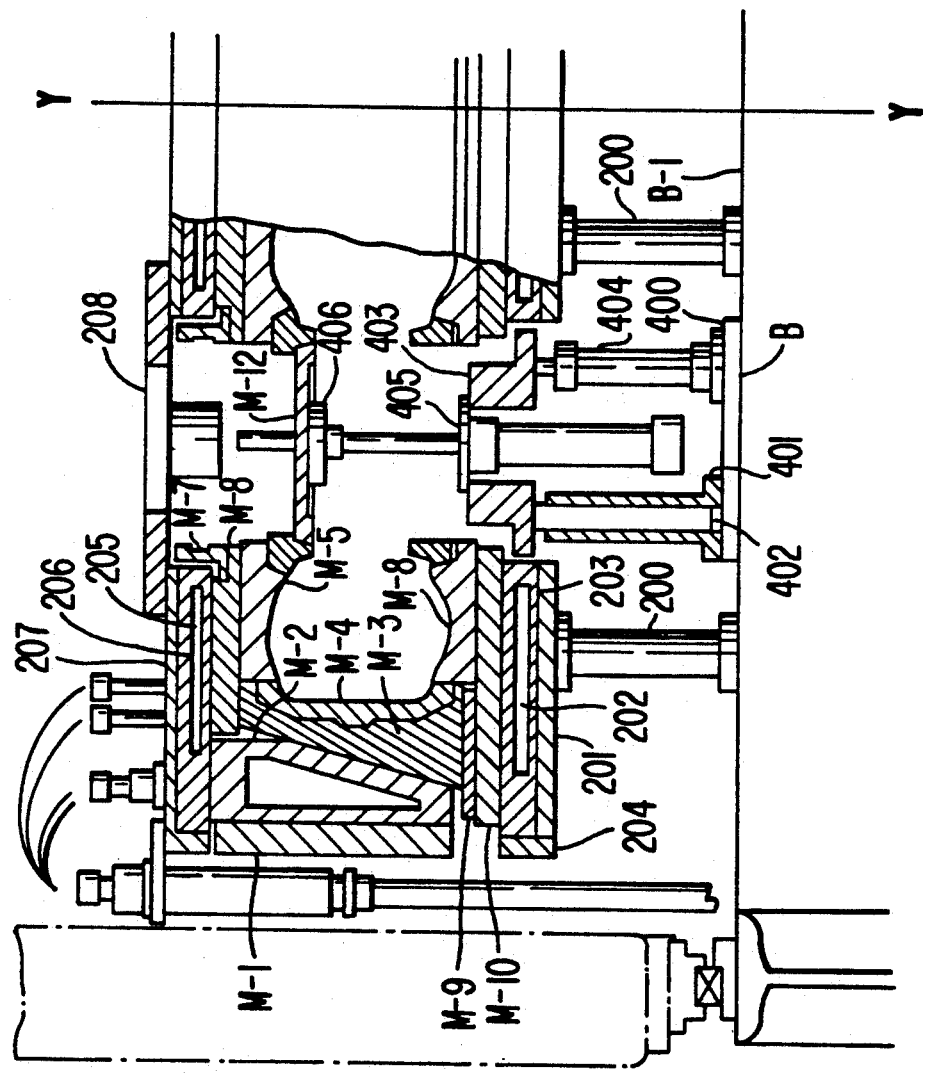
FIG. 27 shows the left-hand half of the arrangement shown in FIG. 26.

FIGS. 26 and 27 show the first mold preparing station $D_1$ which is in a state where a new mold is being heated.

Figure 28:
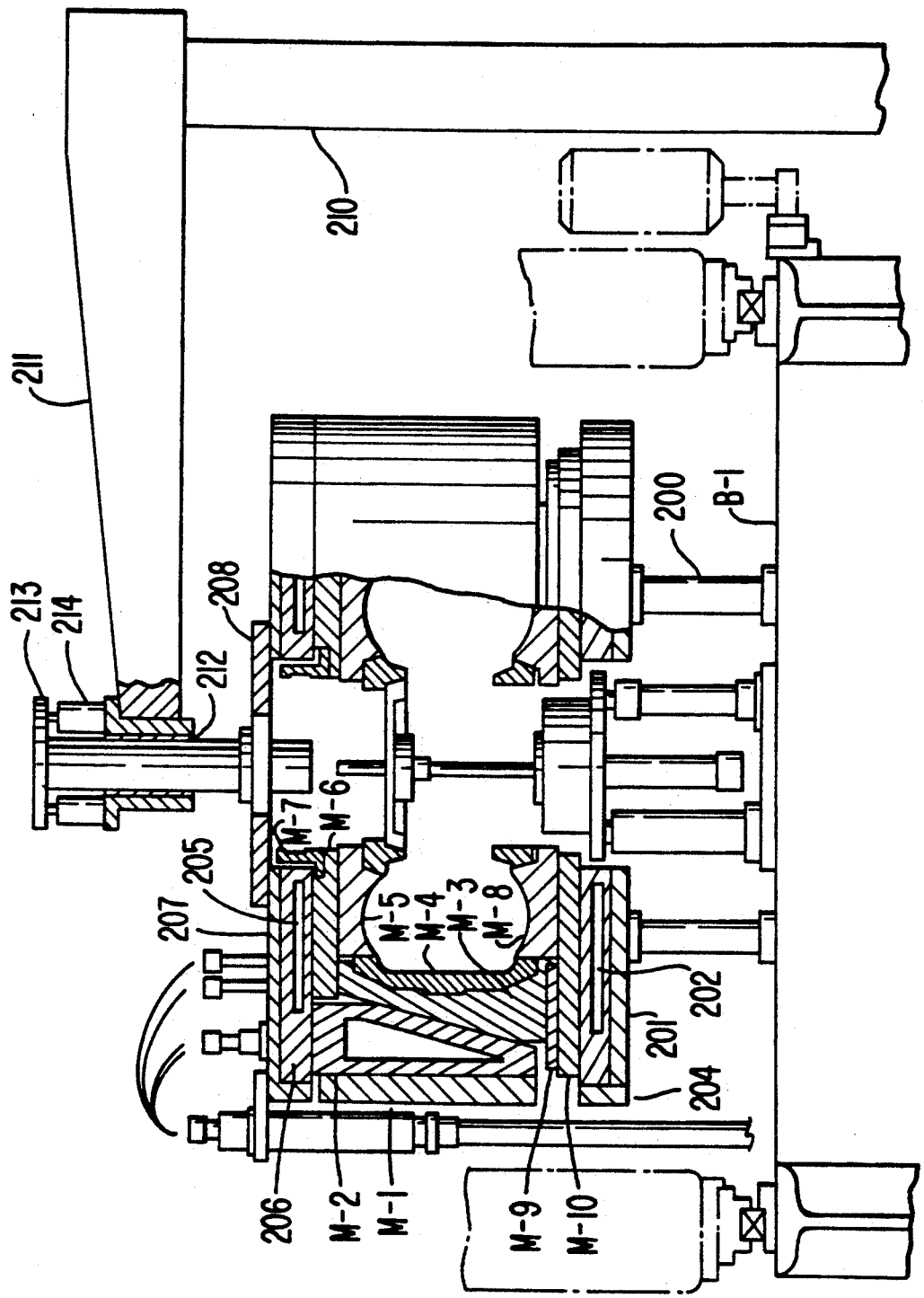
FIG. 28 is a view similar to FIG. 26, showing the mold preparing station which is in a state where a loader grips a top heating device.

FIG. 28 shows the first mold preparing station $D_1$ which is in a state where a top heating plate 206 is about to be provided on or moved away from the mold.

FIGS. 29 to 32 show a joint portion of a top heating plate loading device, a support device for the pressure receiving plate M-12, and a mold lifting device, which are placed in the center of the first mold preparing station $D_1$.

FIGS. 33 to 36 show a centering device provided in the first mold preparing station $D_1$.

Figure 37:
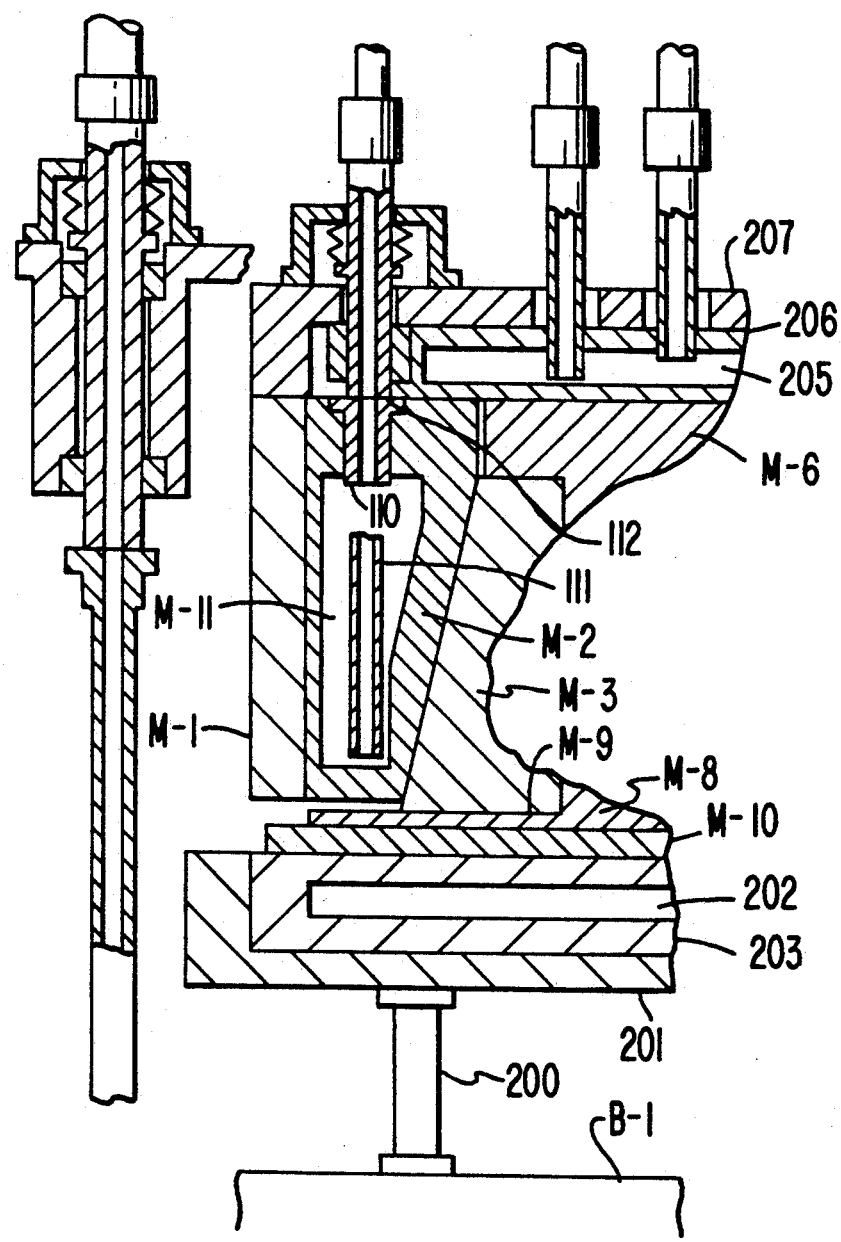
FIG. 37 is a fragmentary sectional view of a heating fluid supply device in the mold preparing station.
Figure 38:
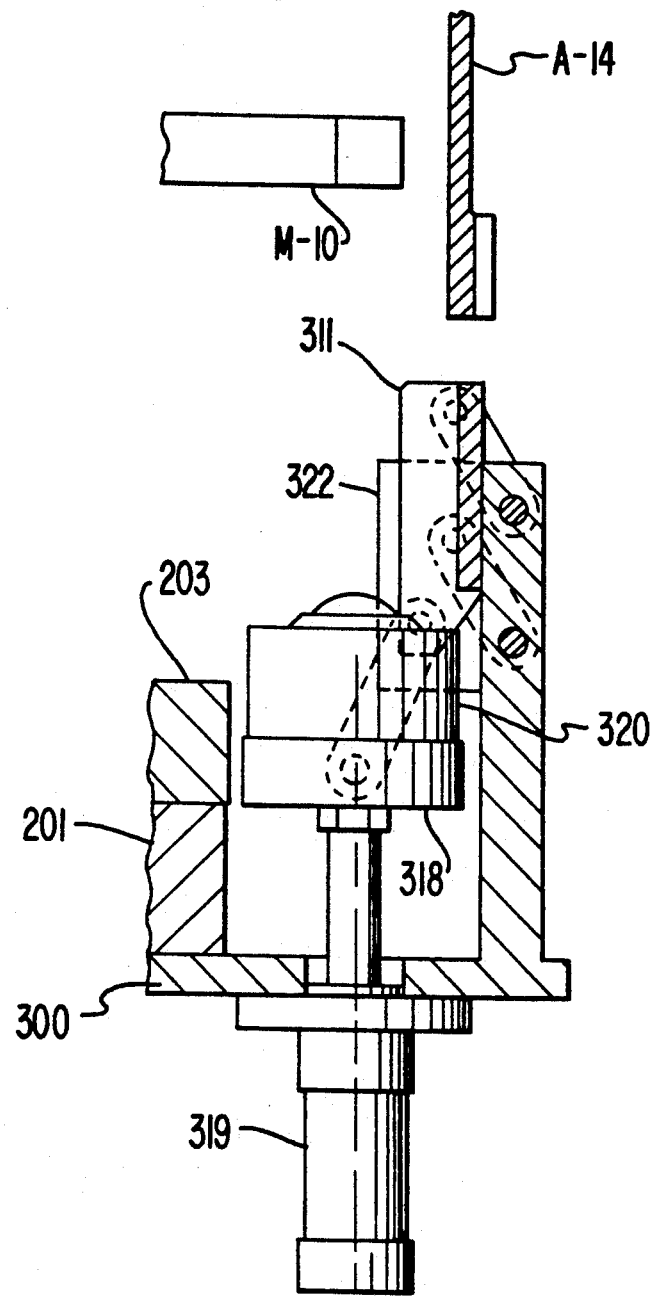
FIG. 38 illustrates the operation of the centering device.
Figure 39:
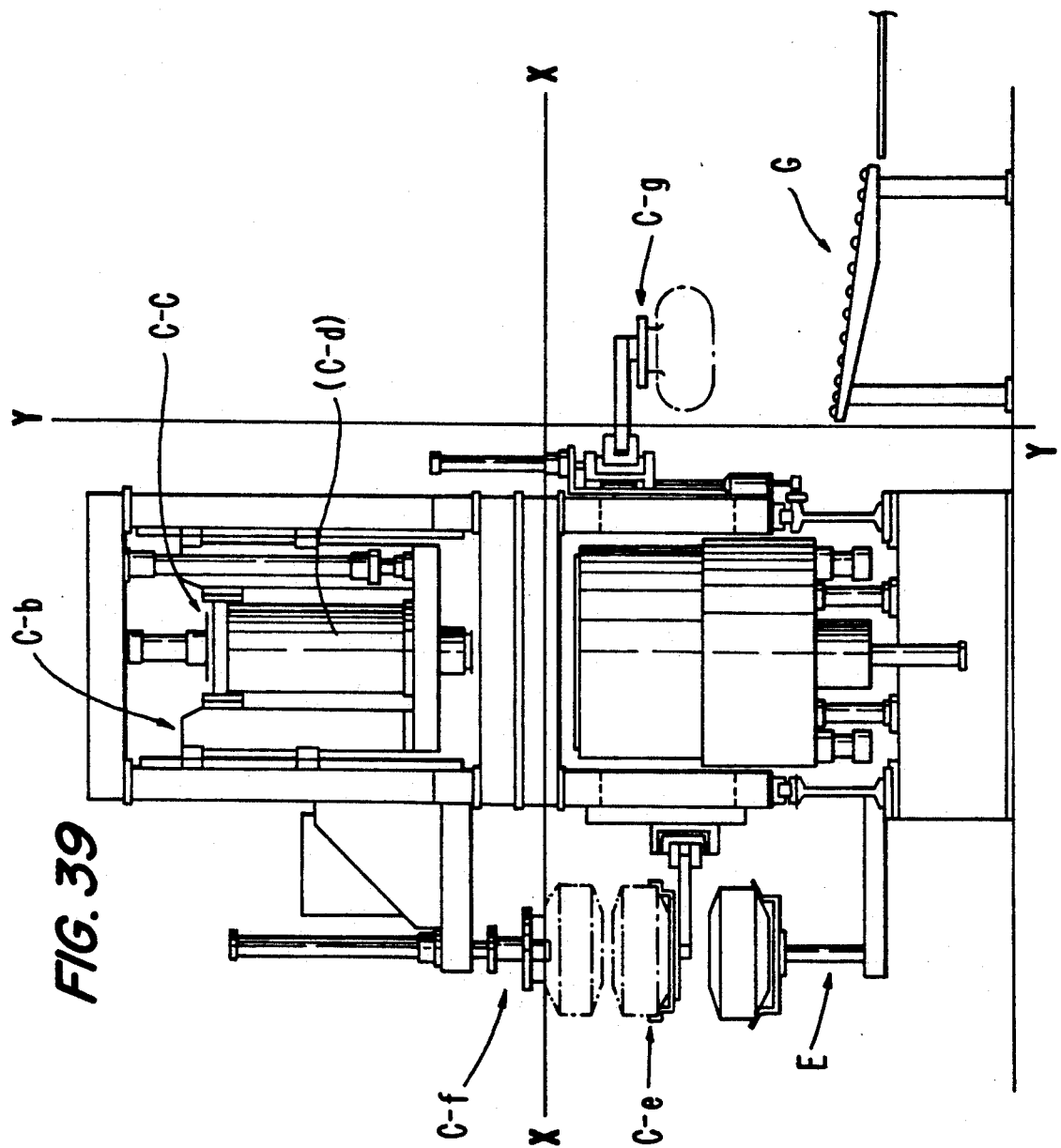
FIG. 39 is a side view of the arrangement shown in FIG. 1.

FIG. 37 shows a heating fluid supply device provided in the first mold preparing station $D_1$.

The mold preparing station is disposed at each or either of the two ends of a row of mold stations or at an intermediate position of the row in such a manner as to align with the center line of the mold stations disposed in a straight line. The mold preparing station comprises a first station $D_1$ and a second station $D_2$. The first station $D_1$ is used to heat and center a new mold which is to replace an old one, while the second station $D_2$ is used to leave a mold as it is, which is carried thereto from a mold station A by the mold open-close manipulator C for replacement. In the illustrated arrangement, the first station $D_1$ and the second station $D_2$ are disposed at an intermediate position of the row of mold stations in such a way that the first and second stations $D_1$ and $D_2$ are adjacent to each other (where to dispose the first and second stations $D_1$ and $D_2$ is decided in accordance with various circumstances at each particular factory where the production system is used). The second station $D_2$ only needs a space and a support frame which are required to allow a used mold M to stand. The support frame is comprised only of a plurality (FIG. 23) of supports $D_2$-1 of the same height which are supported on the cross beams B-1 of the common base frame B.

In FIGS. 21 to 25, the second station $D_2$ is shown in a state where a mold M is left as it is.

The first station $D_1$ comprises a bottom heating device, a top heating device, a heating fluid supply device, a loader for the top heating device, a mold centering device, a device for operating the pressure receiving plate M-12 and lifting a mold, and a positioning device for the mold open-close manipulator C.

Referring to FIGS. 26 and 27, the bottom heating device has supports 200 of the same height which are secured to the cross beams B-1 of the common base frame B in such a manner as to extend vertically. The bottom heating device comprises a bottom heating plate 203 secured to the supports 200 through a heat insulating material 201 and having therein a flow passage 202 in which a heating fluid is circulated through a known pipeline, and a heat insulating material 204 attached to the outer periphery of the bottom heating plate 203. The upper end face of the bottom heating plate 203 is at substantially the same height as that of the bottom heating plate A-7 in each mold station A. More specifically, the height of the bottom heating plate A-7 in each mold station A is varied in accordance with operating conditions, and therefore the bottom heating plate 203 in the first station $D_1$ is installed so that the height thereof is at a proper level within the range of variations of the height of the bottom heating plate A-7. Though the respective heights are different, each bottom heating plate A-7 and the upper end face of the bottom heating plate 203 are parallel to each other, as a matter of course. The top heating device comprises a top heating plate 206 having a heating fluid circulating passage 205 therein, a heat insulating material 207, and a connecting plate 208 secured to the top heating plate 206 through the heat insulating material 207. The connecting plate 208 has a block 208-a buried therein which is connected to and disconnected from a top heating device loader (described later).

Referring to FIG. 37, the top heating device is provided with heating fluid supply and discharge devices for supplying and discharging a heating fluid to and from the heating fluid passage 205 in the top heating plate 206 and the heating fluid passage M-11 in the outer ring M-2 of the mold M. The heating fluid supply and discharge devices have structures similar to those of the heating fluid supply and discharge devices in the mold stations A.

Figure 21:
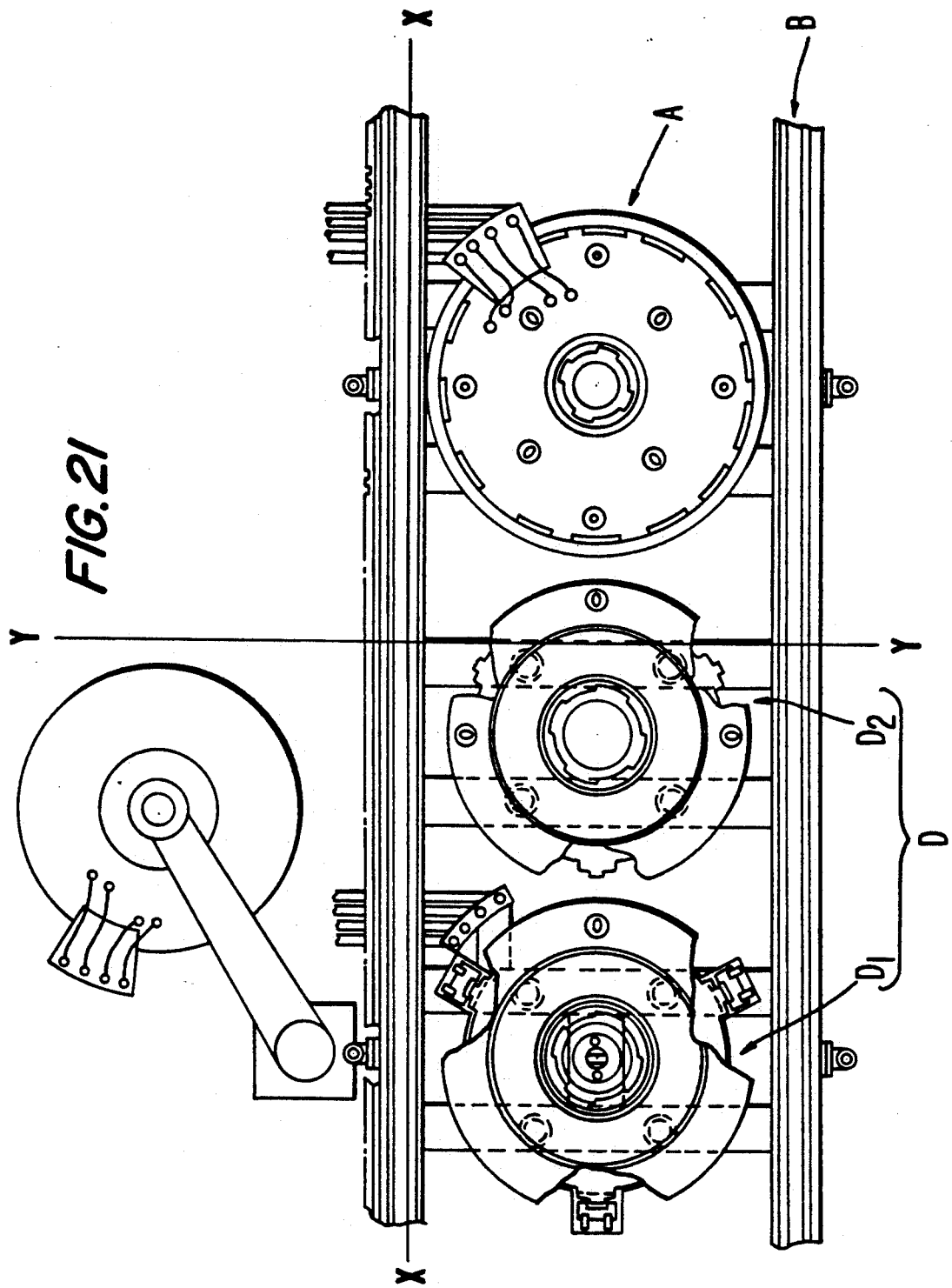
FIG. 21 is a plan view of a mold preparing station.
Figure 25:
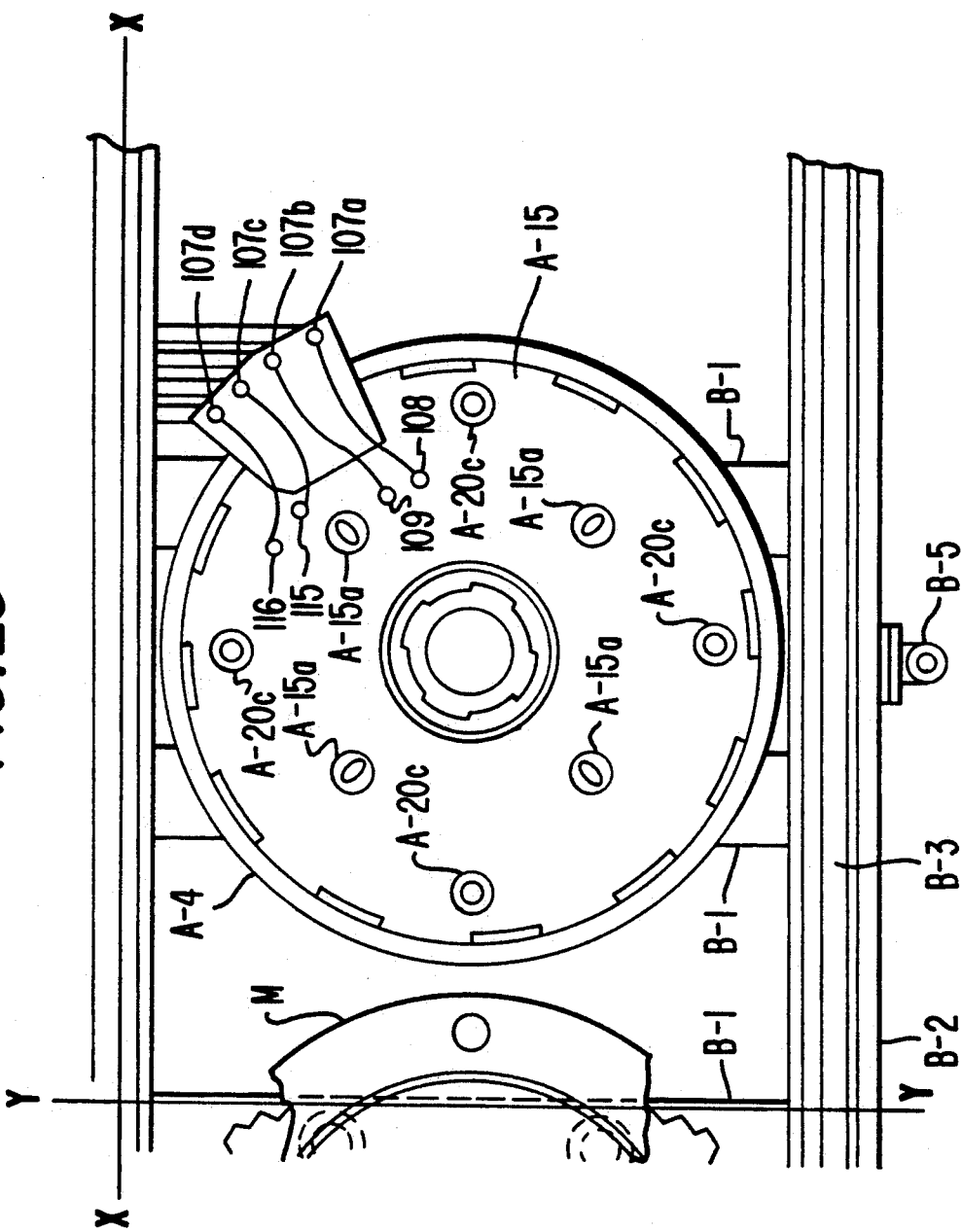
FIG. 25 shows the bottom right quarter of the arrangement shown in FIG. 21.

The coordinate positions of the contact portions of the first to fourth heating fluid supply and discharge devices in the mold station A, shown in FIGS. 21 and 25, with respect to the center of the mold station A are the same as the coordinate positions of the contact portions of the first to fourth heating fluid supply and discharge devices in the first mold preparing station $D_1$ with respect to the center of the first station $D_1$ so that when a mold M that has already been preheated and centered in the first station $D_1$ is molded to a mold station A with its centered state maintained, the heating fluid supply and discharge ports of the mold M are coincident with the corresponding ports in the mold station A. As will be clear from a comparison of FIG. 37 with FIG. 15, the arrangements of the heating fluid supply and discharge devices shown in FIG. 37 are so similar to those of the supply and discharge devices shown in FIG. 15 that no description is needed. Therefore, a detailed description thereof is omitted.

The top heating device loader is used to move the top heating device so that a mold lifting operation that is carried out with a forklift or the like can be conducted above the bottom heating device when the above-described heating devices receive a new mold which is to be preheated. The loader is also designed so as not to interfere with the movement of the mold open-close manipulator $C_1$ or $C_2$ from one mold station to another even when the top heating device is preheating a new mold from above it.

Figure 22:
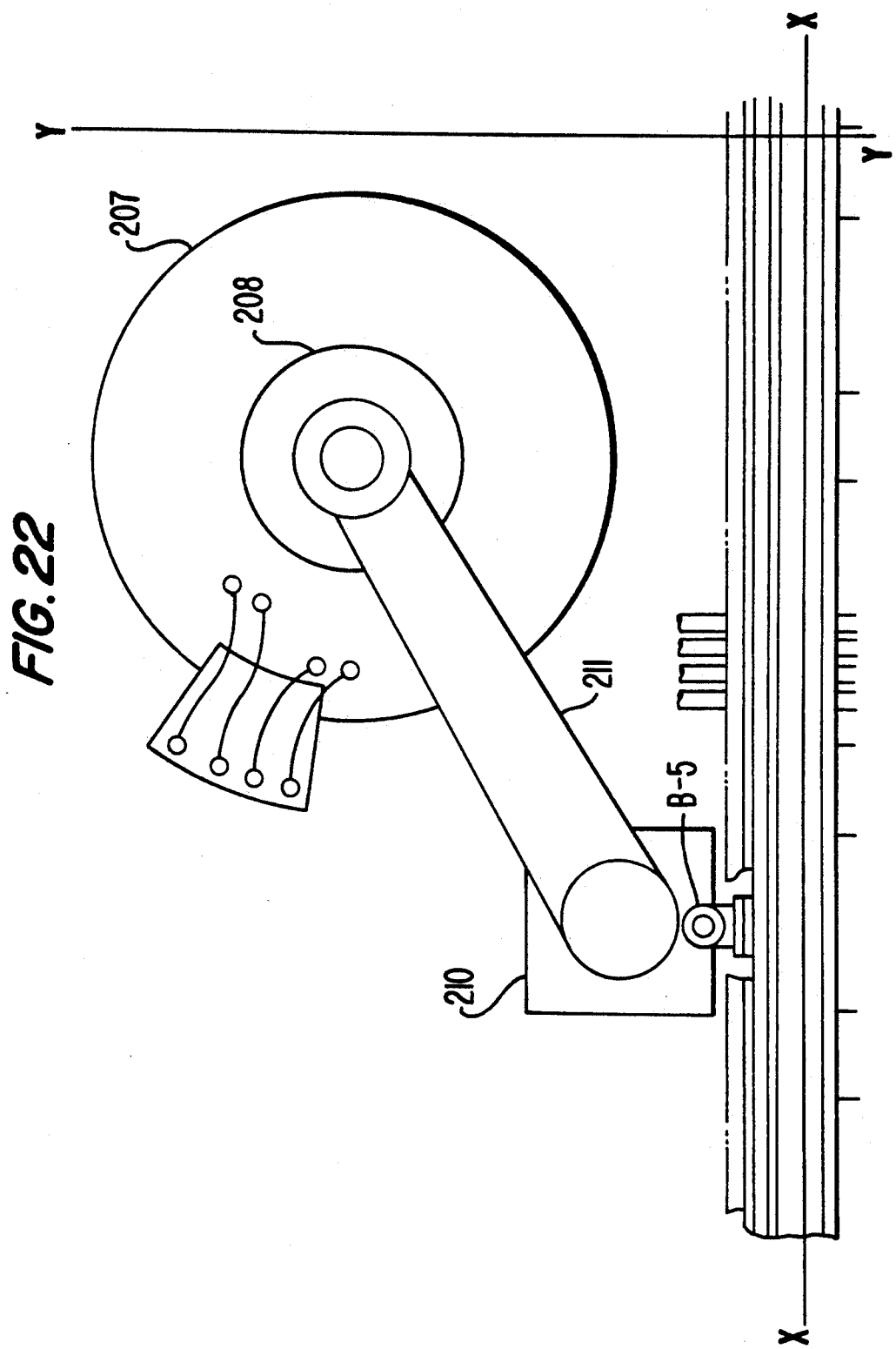
FIG. 22 shows the top left quarter of the arrangement shown in FIG. 21.

FIGS. 21 and 22 show the top heating device loader holding the top heating device in a position where it will not interfere with the movement of the mold open-close manipulator C.

FIGS. 26 and 27 show the first mold preparing station $D_1$ which is preheating a mold M and the loader which is in a position where it is disconnected from the top heating device so that the loader will not interfere with the movement of the mold open-close manipulator C.

FIG. 28 shows a state where the loader which is in connection with the top heating device is about to install it over a mold or separate therefrom.

Figure 30:
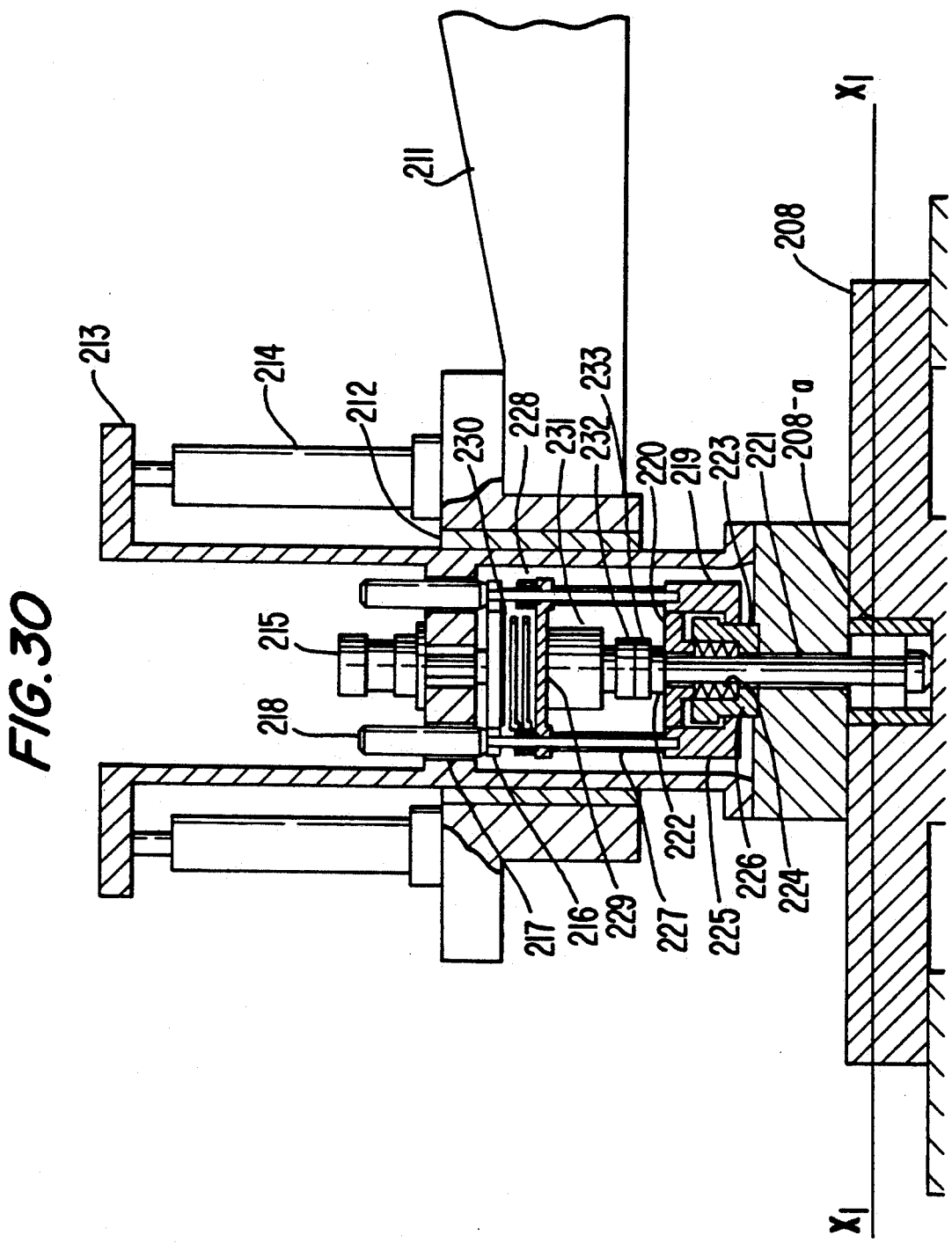
FIG. 30 shows the top portion of the arrangement shown in FIG. 29.
Figure 31:
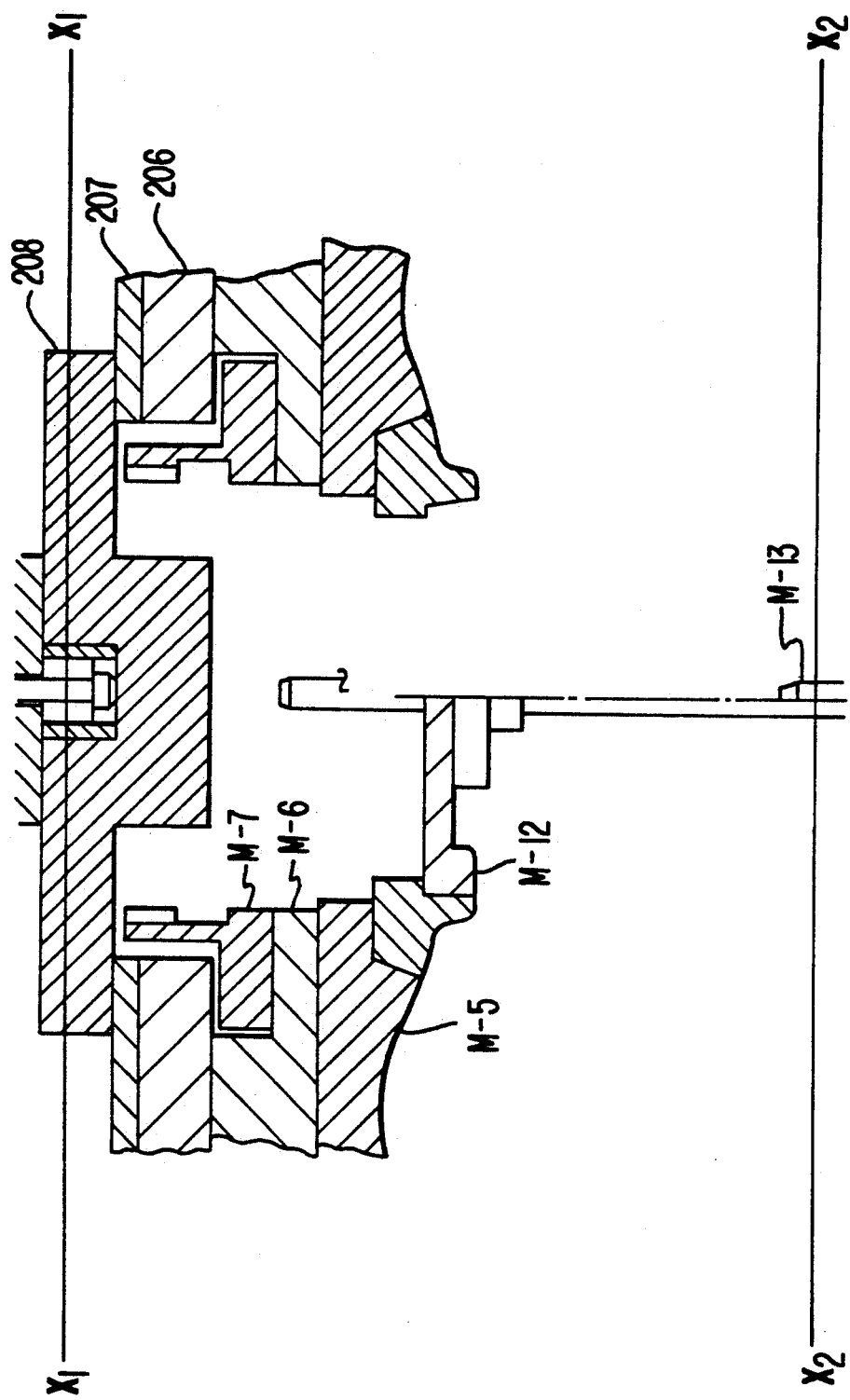
FIG. 31 shows the central portion of the arrangement shown in FIG. 29.

FIGS. 30 and 31 are detailed sectional views of a device for connecting and disconnecting the loader and the top heating device. The loader will be described below in detail.

The loader comprises a support 210 fixed upright at a proper position out of the region where the mold open-close manipulators $C_1$ and $C_2$ pass, an arm 211 provided on the upper end of the support 210 such that the arm 211 is capable of being pivoted by a known method, a known swivel driving device (not shown), and a connecting and disconnecting device provided on the distal end of the arm 211. The details of the connecting and disconnecting device are shown in FIGS. 29 to 32. A slide member 212 is attached to the distal end of the arm 211, and a tube 213, is slidably fitted in the slide member 212. The tube 213 is driven to slide by cylinders 214 extending upright at proper positions on the arm 211. A cylinder 215 is mounted at a proper position inside the tube 213. A plate 216 is attached to the rod end of the cylinder 215, and guide rods 218 are in thread engagement with the plate 216. The guide rods 218 are guided by respective slide members 217 provided in the tube 213. The other ends of the guide rods 218 are threaded into a block 219. A cover plate 220 is threaded with the block 219 and has a slide member 222 provided in its center for guiding a lock shaft 221.

A spring box 223 is disposed in the block 219, and coned disc springs 224 are accommodated in the area between the spring box 223 and the cover plate 220. The spring box 223 has a slide member 225 that enables the spring box 223 to be slidable in the block 219, and a slide member 226 provided in the center of the spring box 223 for guiding the lock shaft 221.

A stopper tube 227 is provided on the side of each guide rod 218 which is closer to the block 219. In addition, a plate 229 is slidably fitted on the guide rods 218 through slide members 228 serving as guides, and a spring 230 is incorporated inbetween the plate 216 and the plate 229.

A known crank and rocker cylinder 231 is secured to the lower side of the plate 229, and the lock shaft 221 is secured to the end of the output shaft of the cylinder 231 through flanges 232 and 233.

Figure 9:
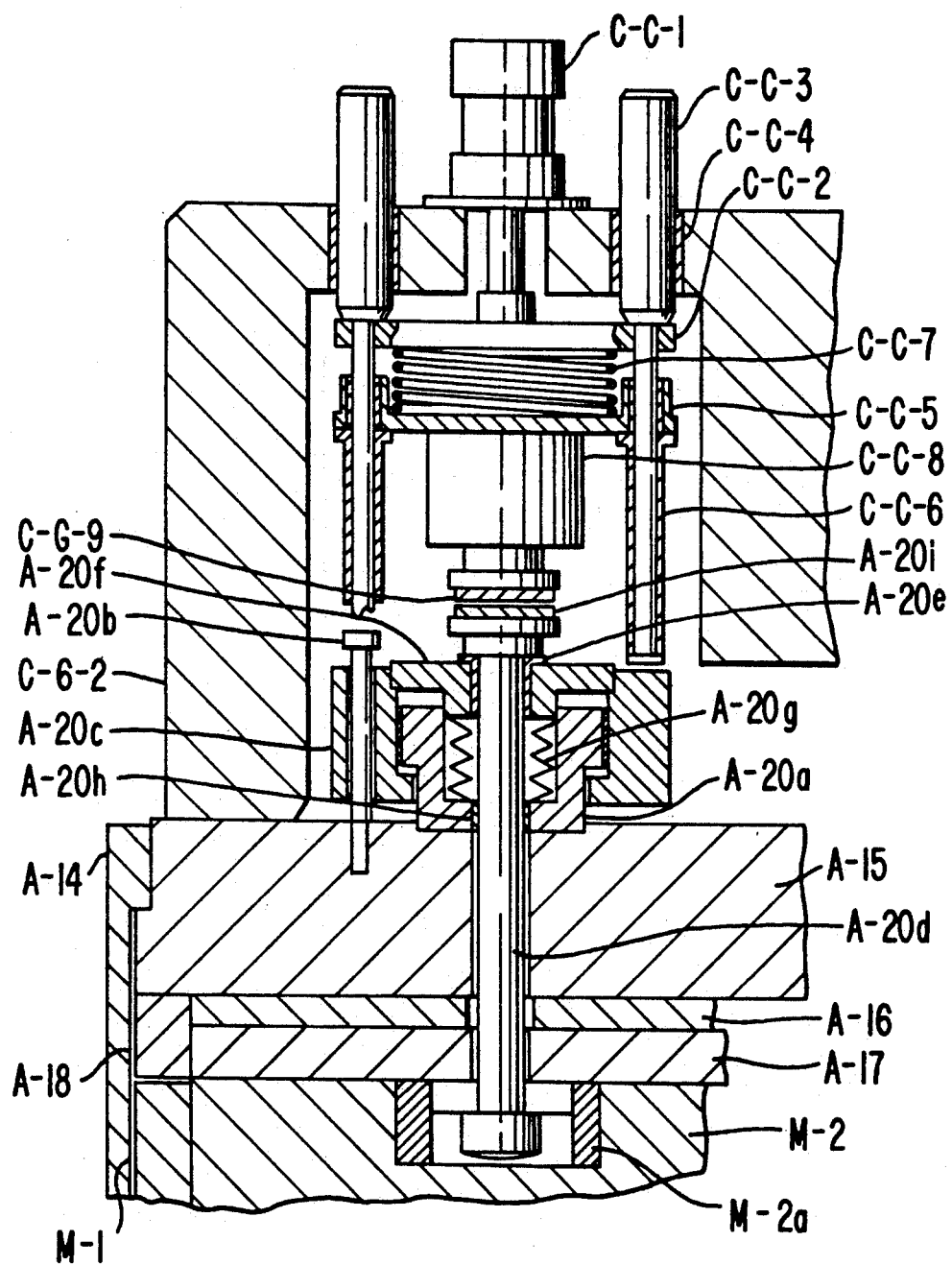
FIG. 9 is a detailed sectional view of a mold clamping device shown in FIG. 3.

The lower end portion of the lock shaft 221 is arranged in the same way as in the case of the clamp rod A-20d shown in FIG. 9 so that it can be engaged with and disengaged from a block 208-a buried in the connecting plate 208.

By virtue of the above-described structure, when the block 219 is pressed by the cylinder 215 through the plate 216 and the guide rods 218 in the state shown in FIG. 30, the coned disc springs 224, which are preloaded, can be deflected, so that the tension that has been applied by the upper step portion of the lock shaft 221 and the oval projection at the lower end thereof is relieved, thus enabling the lock shaft 221 to be readily rotated by the operation of the cylinder 231. As the cylinder 231, there is a known type that rotates 90° accurately, and it is therefore possible to bring the oval projection at the end of the lock shaft 221 into and out of engagement with the oval groove provided in the block 208-a by allowing the projection to be in and out of phase with the groove.

The spring 230, which is provided for safety, functions in such a manner that if the oval projection at the end of the lock shaft 221 approaches the oval groove in the block 208-a in an out-of-phase state, the spring 230 is deflected to thereby protect each portion from an excessive load. The spring 230 is also used to sense an abnormal movement of the plate 229 by cooperating with a limit switch or the like (not shown) to thereby stop the approaching operation effected by the cylinders 214.

According to the above-described arrangement of the loader, the loader can pivot between the central position in the first mold preparing station $D_1$ and the standby position. In addition, it is possible to disconnect the loader from the top heating device after the latter has been installed over a mold M and to move the arm 211 of the loader to the stand-by position, if necessary. It is also possible to move the top heating device from the mold M to the stand-by position by the arm 211.

Next, the mold centering device will be explained.

Figure 33:
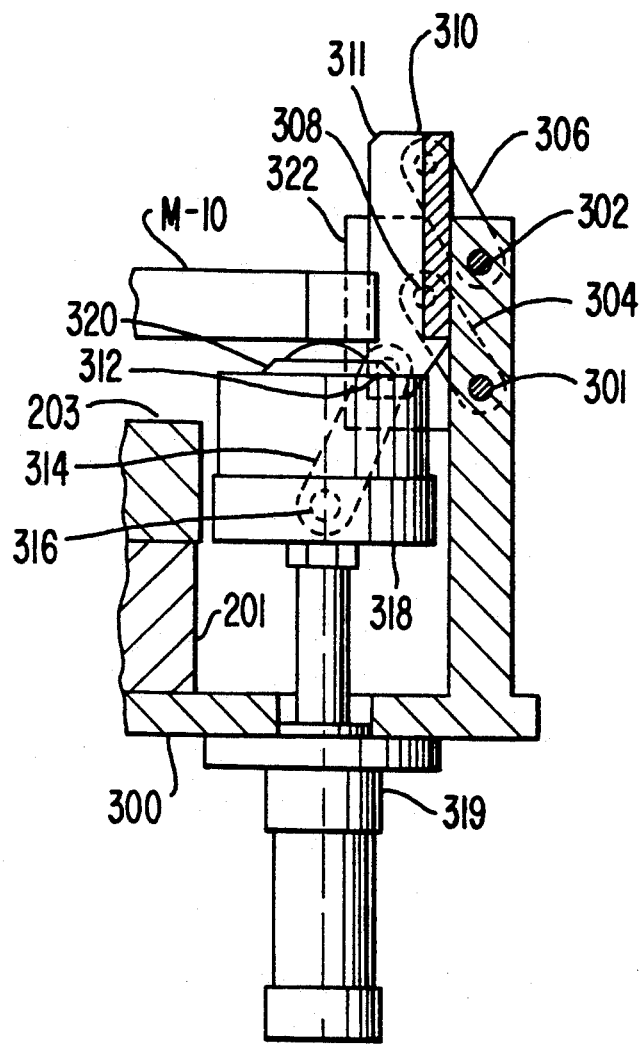
FIG. 33 is a fragmentary sectional view of a centering device provided in the mold preparing station, showing it in a mold lifting state.
Figure 34:
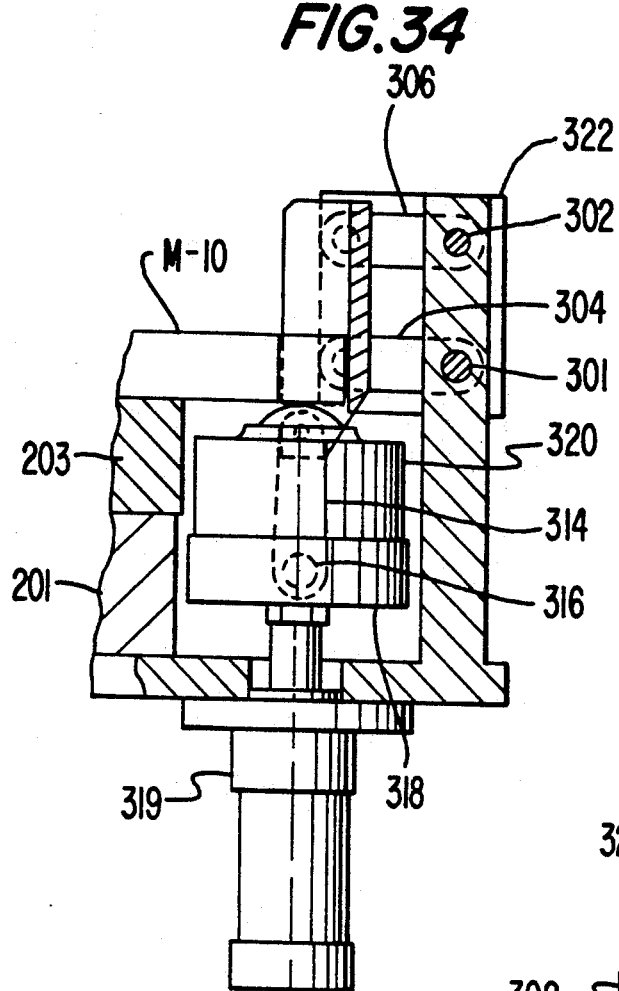
FIG. 34 is a view similar to FIG. 33, showing a state wherein centering has been completed.
Figure 35:
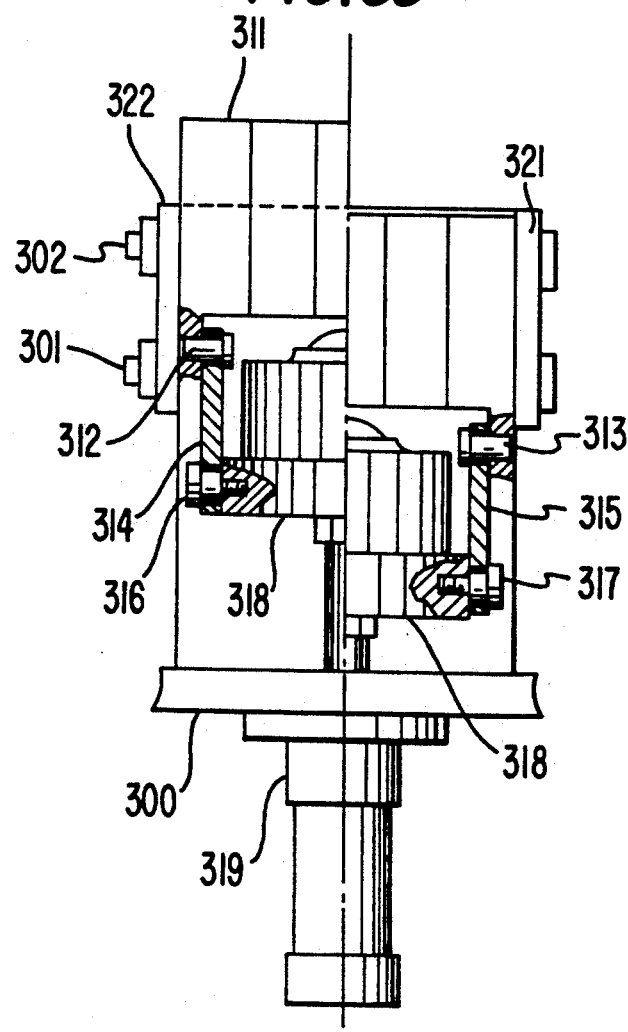
FIG. 35 is a side view, partially in section, of the centering device shown in FIGS. 33 and 34.

FIG. 33 shows the mold centering device which is in a state where a mold M is lifted by a forklift or the like. FIG. 34 shows the mold centering device which is in a state where centering has been completed. FIG. 35 is a view of the mold centering device seen from the center of the mold toward the outside. The left-hand side of FIG. 35 corresponds to FIG. 33, while the right-hand side corresponds to FIG. 34. The upper half of FIG. 36 shows the mold centering device which is in the state corresponding to FIG. 33, while the lower half of FIG. 36 shows the mold centering device which is in the state corresponding to FIG. 34.

A total of three mold centering devices are disposed as shown in FIG. 21. FIGS. 21 and 23 A bracket 300 is secured to the bottom heating plate 203 through a heat insulating material 201, and isometric links 303, 304, 305 and 306 are pivotably attached to the bracket 300 through rods 301 and 302, the links being connected to a centering block 311 by pins 307, 308, 309 and 310 such that the links and the centers of the rods define a parallelogram.

Figure 36:
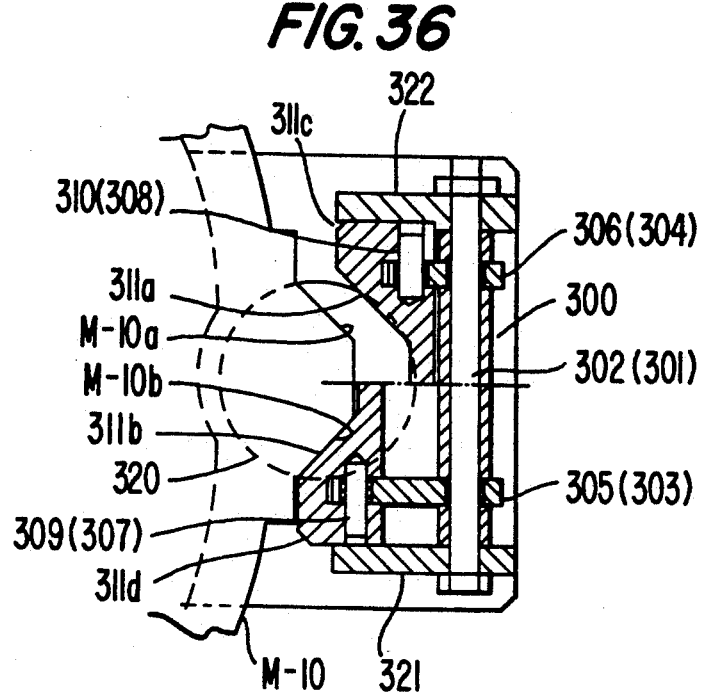
FIG. 36 is a plan view, partially in section, of the centering device shown in FIGS. 33 and 34.
Figure 42:
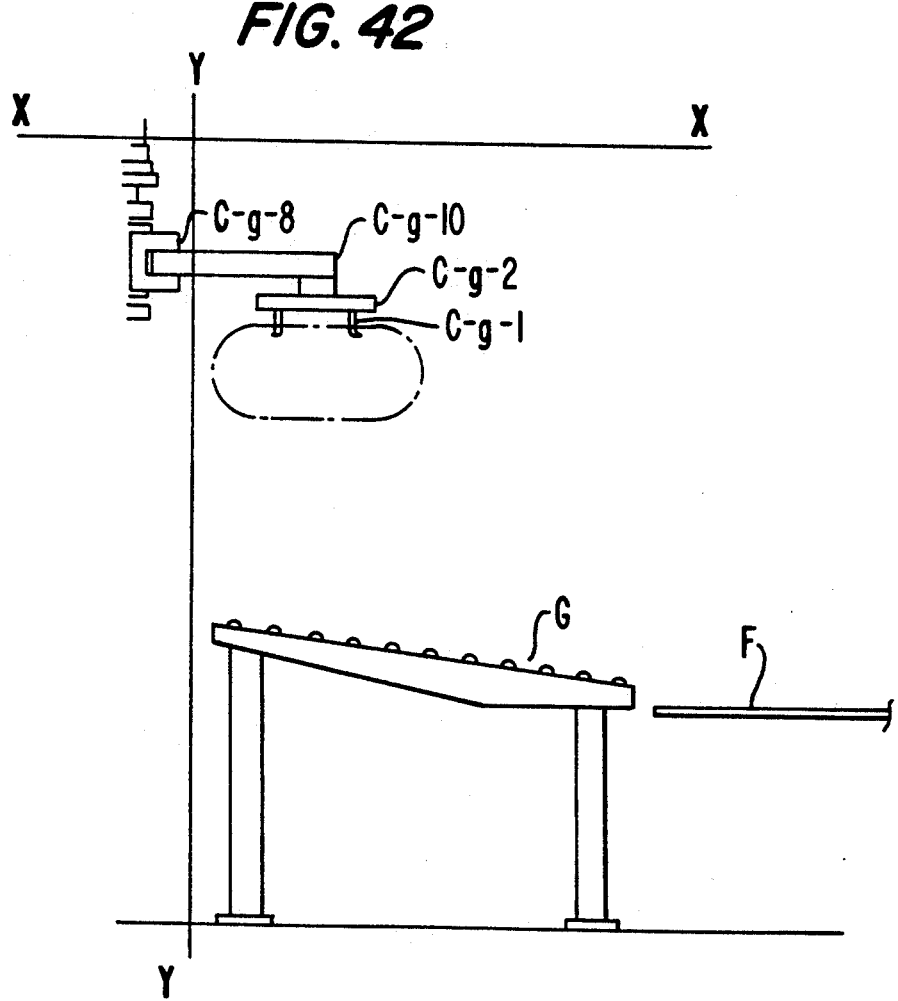
FIG. 42 shows the bottom right quarter of the arrangement shown in FIG. 39.

The centering block 311 has inclined surfaces 311a 311b on the side thereof which is closer to the center of the mold M, as shown in FIG. 36, so that the inclined surfaces 311a and 311b can engage with inclined surfaces M-10a and M-10b provided on a projecting portion of the bottom plate M-10 of the mold M (see the lower half of FIG. 36). The centering block 311 is connected to a plate 318 through pins 312 and 313 provided on the lower portion of the centering block 311 and through isometric links 314 and 315 and pins 316 and 317. The plate 318 is connected to the end of the output shaft of a cylinder 319 that is secured to the bracket 300. In addition, a non-oriented bearing 320, which is generally known as "free bearing", is secured to the upper side of the plate 318. Side portions 311c and 311d of the centering block 311 are guided by side plates 321 and 322 secured to the bracket 300 so that the centering block 311 slides accurately. With this arrangement, the bottom plate M-10 of the mold M suspended by a forklift or the like is supported by the free bearing 320 in such a manner as to be movable in any direction, as shown in FIG. 33, which illustrates the mold centering device in a state where the bearing 320 is raised above the upper end face of the bottom heating plate 203. If, in this state, the plate 318 and the bearing 320 are lowered by the cylinder 319, the centering-block 311 lowers with the inclined surfaces 311a and 311b moving into abutment against the inclined surfaces M-10a and M-10b of the bottom plate M-10, thereby centering the mold M on the bearing 320 with ease. Eventually, the inclined surfaces of the mold M abut against the corresponding inclined surfaces of the three centering devices, thus completing the mold centering operation, as shown in the lower half of FIG. 36. More specifically, since inclined surfaces of the three centering devices are set at respective positions which are equidistant from the center of the first mold preparing station $D_1$ and the center lines of the inclined surfaces are coincident with the center of the mold M, it is possible to center the mold M with high accuracy.

DEVICE FOR OPERATING PRESSURE RECEIVING PLATE AND LIFTING MOLD

This device is used in the mold preparing station D to lift and lower the pressure receiving plate M-12 (FIG. 27) in the mold M which is carried to the station D and also to raise the whole mold M to a level convenient for delivery of the mold M completely preheated at the mold preparing station D to the mold open-close manipulator C.

FIGS. 25 to 27 show a state where the upper end part of the mold clamping device is installed above the mold M and the pressure receiving plate M-12 is placed in contact with the upper side mold member M-5 which is being heated. Accordingly, the pressure receiving plate M-12 is also heated through the area of contact with the mold M.

FIG. 28 shows a state where the loader is about to install or remove the top heating device onto or from the mold M.

Figure 29:
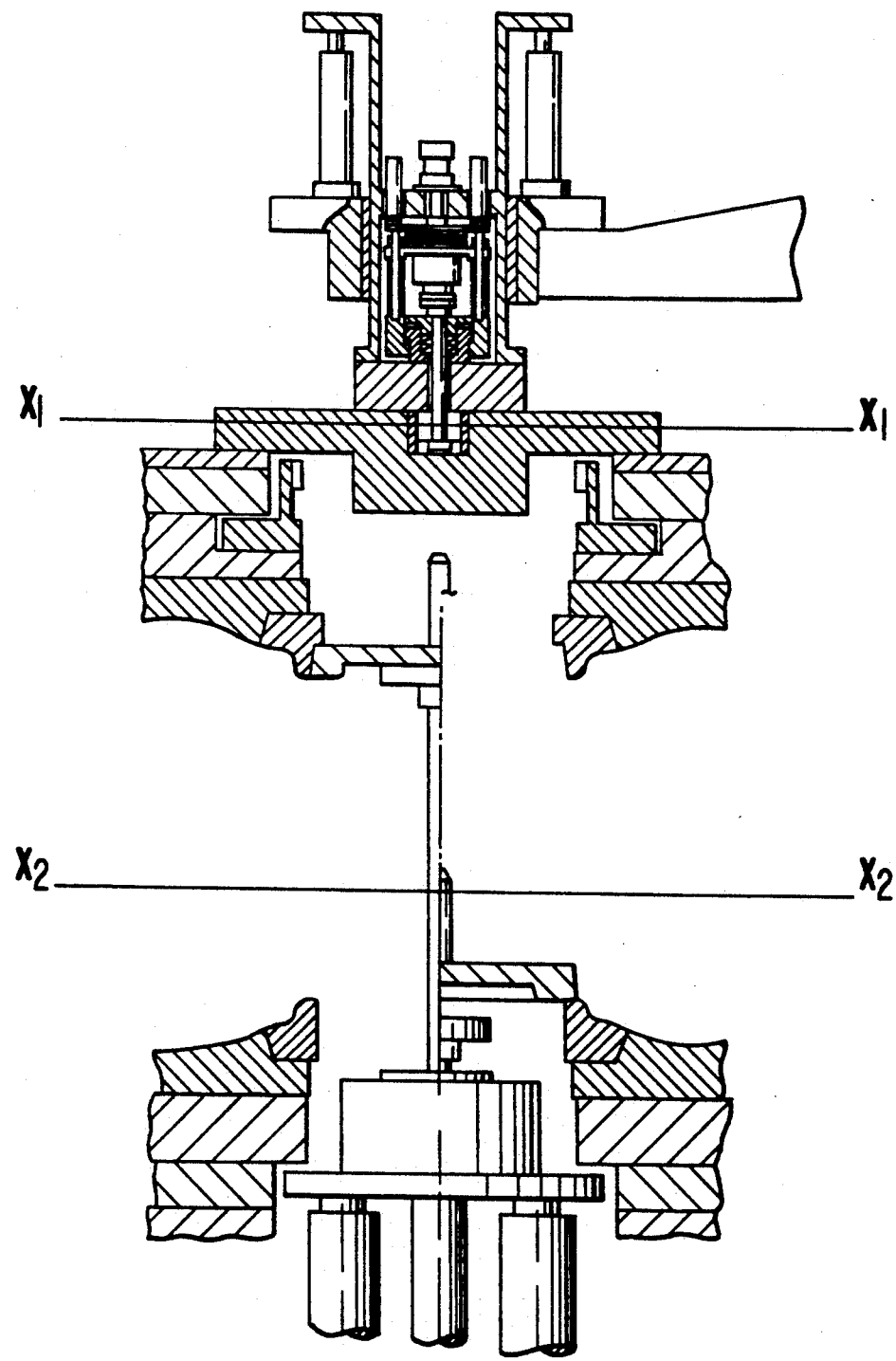
FIG. 29 is an enlarged sectional view of a loader portion of the arrangement shown in FIG. 28.
Figure 32:
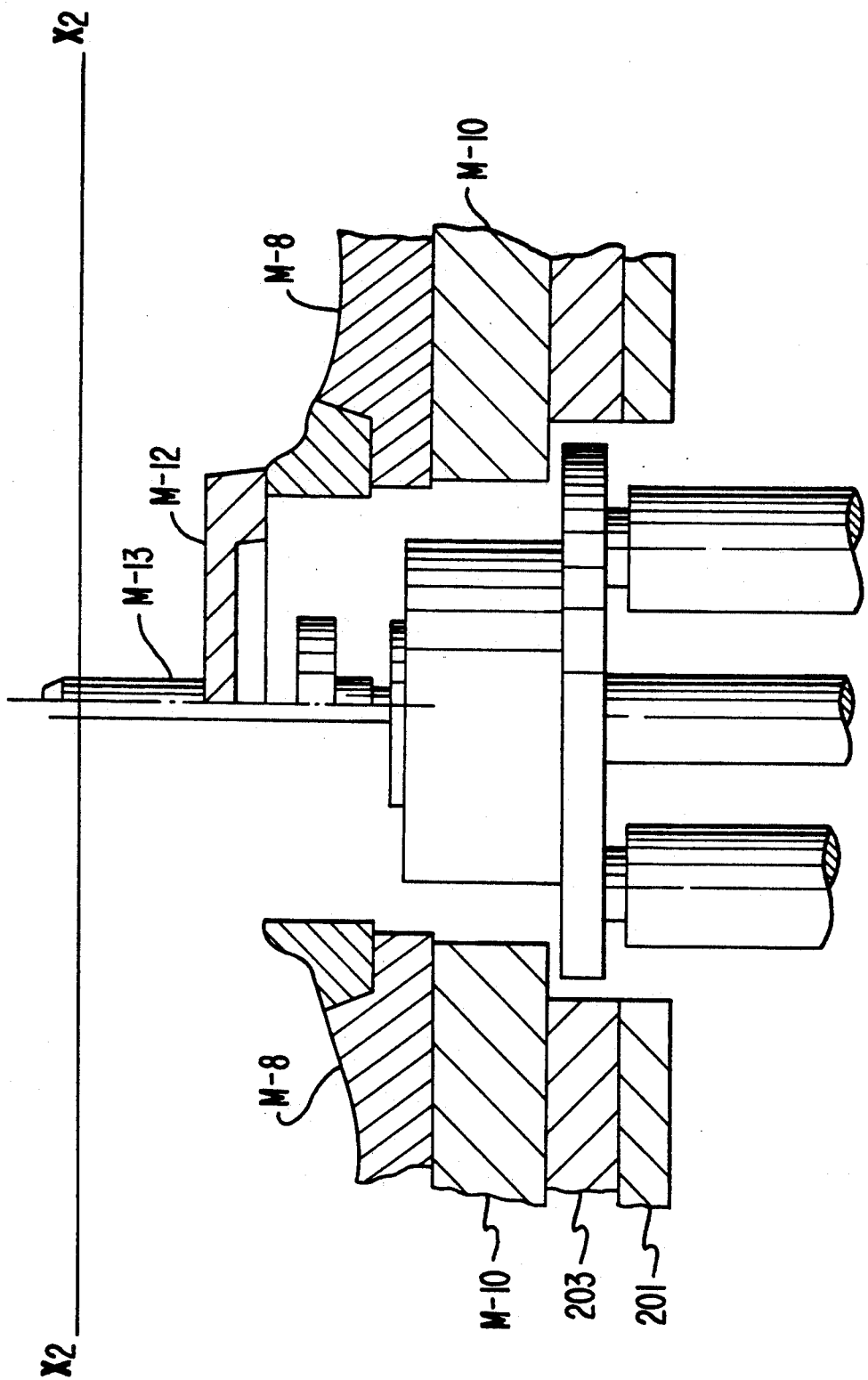
FIG. 32 shows the bottom portion of the arrangement shown in FIG. 29.

The left-hand halves of FIGS. 29, 31 and 32 show a state where the pressure receiving plate M-12 is placed in contact with the upper side mold member M-5, while the right-hand halves of these figures show a state from which the pressure receiving plate M-12 that is placed on the lower side mold member M-8 of the mold M is pushed to reach the state shown in the left-hand halves of the figures.

Referring to FIGS. 25 to 27, a portion of the common base frame B is located below the center of the first mold preparing station $D_1$. The common base frame B has a plurality of guide tubes 401 extending upright on a plate 400 secured to proper portions of the cross beams B-1, rods 402 that are guided by the guide tubes 401, and a lifting block 403 attached to the upper ends of the rods 402, the block 403 having a diameter larger than the inner diameter of the bottom plate M-10 of the mold M.

The block 403 is secured to the ends of the output shafts of a plurality of hydraulic cylinders 404 extending upright on the plate 400 such that the block 404 is movable vertically by being guided through the rods 402 and the tubes 401. A pneumatic cylinder 405 is rigidly secured to the upper side of the block 403. A flange 406 is provided on the upper end of the output shaft of the pneumatic cylinder 405 so that when the cylinder 405 extends, the flange 406 causes the pressure receiving plate M-12 to abut against the upper side mold member M-5, whereas, when the cylinder 405 retracts, the flange 406 leaves the pressure receiving plate M-12 on the lower side mold member M-8.

In the second mold preparing station $D_2$, a cylinder that is the same as the air cylinder 405 is installed on the cross beams B-1, and a flange that is similar to the flange 406 is attached to the upper end of the rod of the cylinder. Thus, when the mold open-close manipulator C installs a mold M in the second station $D_2$, the cylinder is extended to cause the flange to abut against the pressure receiving plate M-12, and thereafter, the rod M-13 of the pressure receiving plate M-12 is disconnected, and the cylinder is then lowered, thereby enabling the pressure receiving plate M-12 to be lowered onto the lower side mold member M-8.

MOLD OPEN-CLOSE MANIPULATOR C

Figure 4:
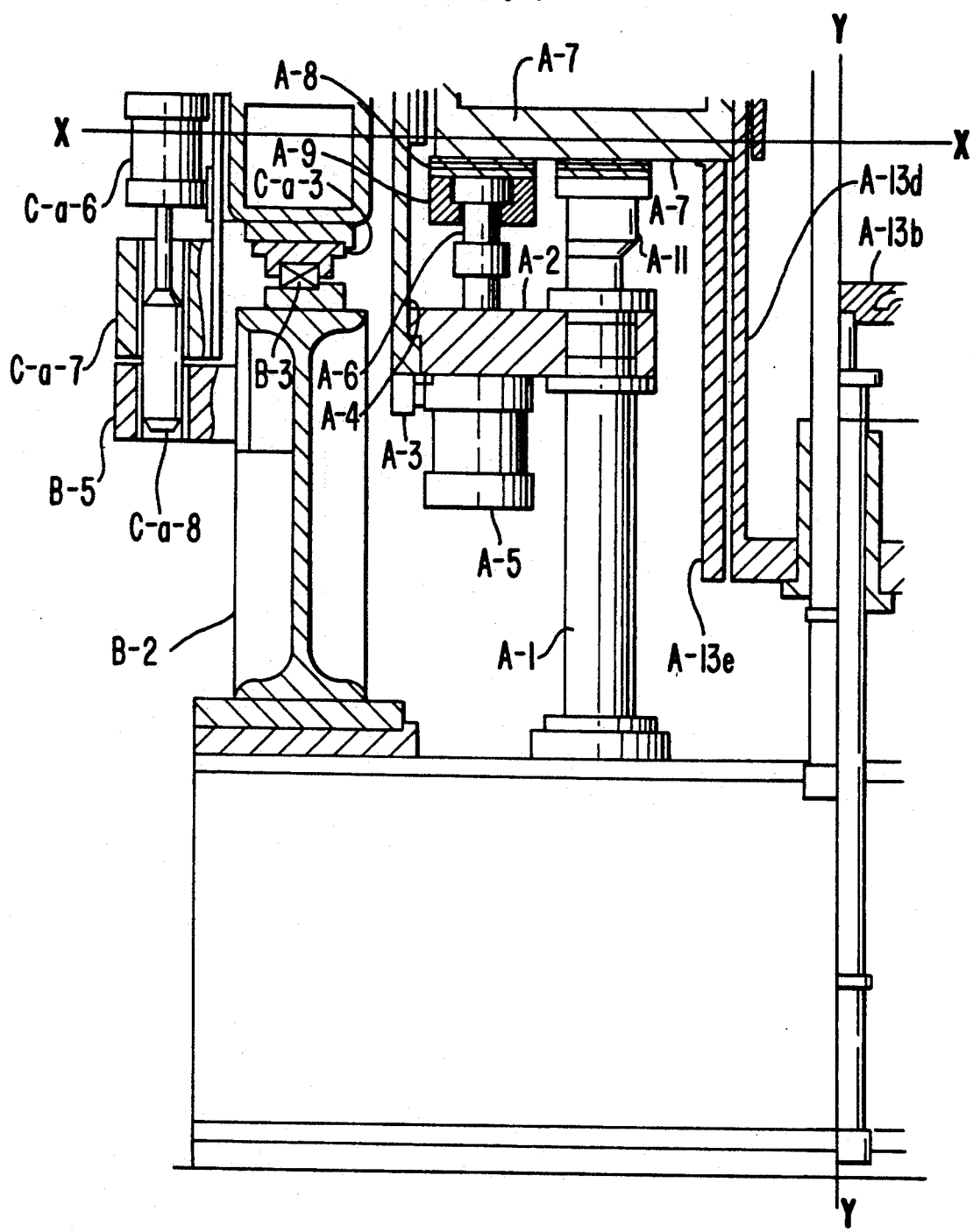
FIG. 4 shows the bottom left quarter of the arrangement shown in FIG. 2.

FIGS. 2 to 6 show a state where either the first mold open-close manipulator $C_1$ or the second mold open-close manipulator $C_2$ is disposed at any one of the mold stations $A_1$ to $A_{12}$. The left-hand half of FIG. 2 and FIGS. 3 and 4 show a state where the mold operating device provided on the manipulator C is connected to the mold M in the mold station A and the mold M is closed, while the right-hand half of FIG. 2 and FIGS. 5 and 6 show a state where the mold M is opened by the manipulator C.

FIGS. 16 to 20 are front views showing the general arrangement of the manipulator C.

FIGS. 39 to 42 show the general arrangement of the manipulator C as seen from the direction of travel thereof.

FIGS. 43 to 47 are plan views of the first manipulator $C_1$ and the second manipulator $C_2$ respectively placed at mold stations A which are adjacent to each other.

Figure 40:
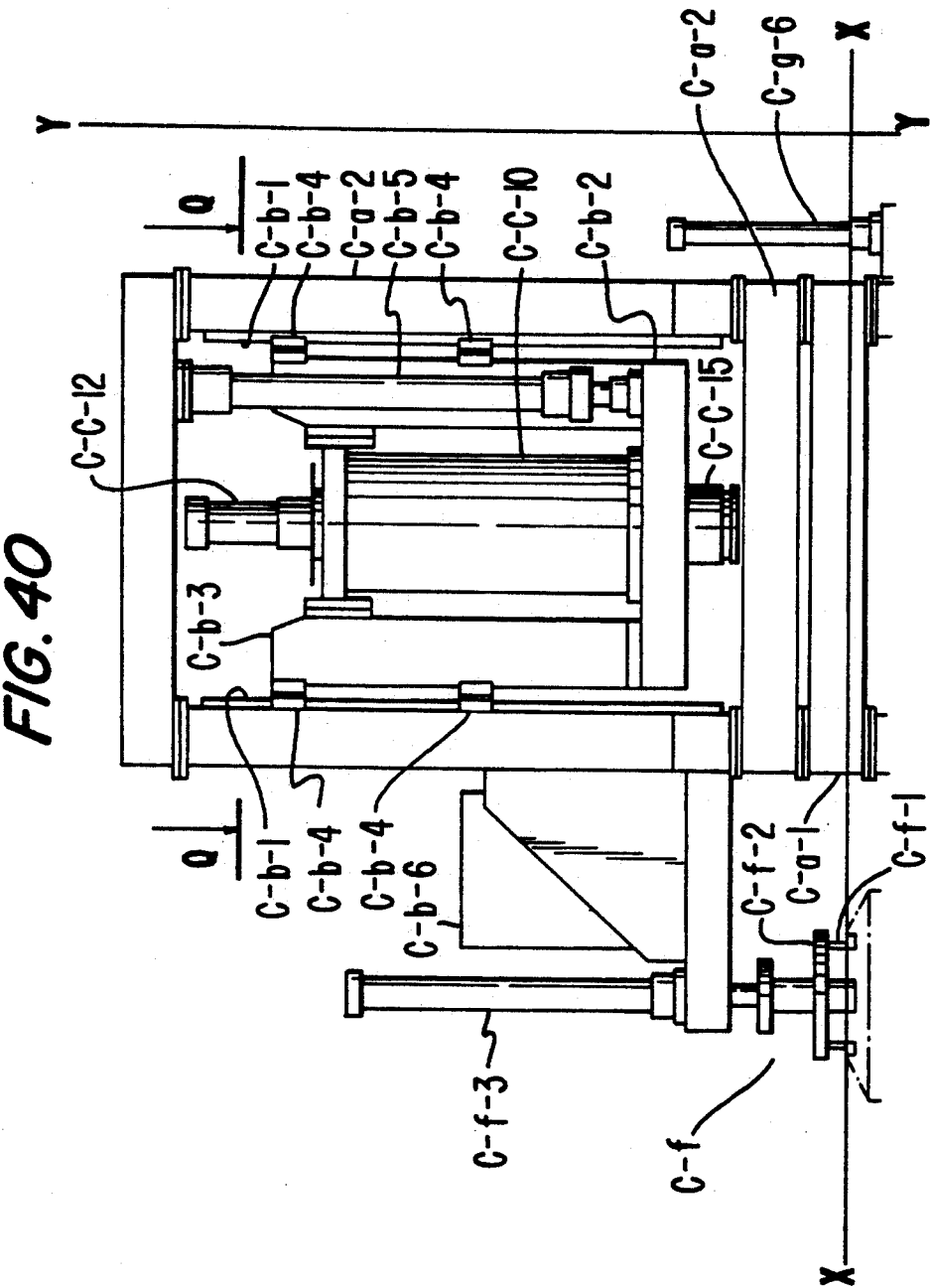
FIG. 40 shows the top left quarter of the arrangement shown in FIG. 39.

In these figures, the first manipulator $C_1$ is shown as seen from the arrow Q—Q in FIG. 40, while the second manipulator $C_2$ is shown as seen from the arrow P—P in FIG. 5. For the second manipulator $C_2$, the following four positions are shown by one-dot chain lines: the first position (the center of mold station) that is reached immediately before the completed tire is removed by the unloader; the second position where the completed tire is being discharged; the third position where the completed tire is discharged; and the fourth position, which is the stand-by position assumed by the second manipulator $C_2$ when traveling.

In addition, for the second manipulator $C_2$, the following four positions are shown by one-dot chain lines: the first position that is reached immediately before a green tire is loaded by the loader; the second position where the green tire is being loaded; the third position where the loader is in the center of the mold; and the fourth position, which is the stand-by position assumed by the second manipulator $C_2$ when traveling.

Figure 48:
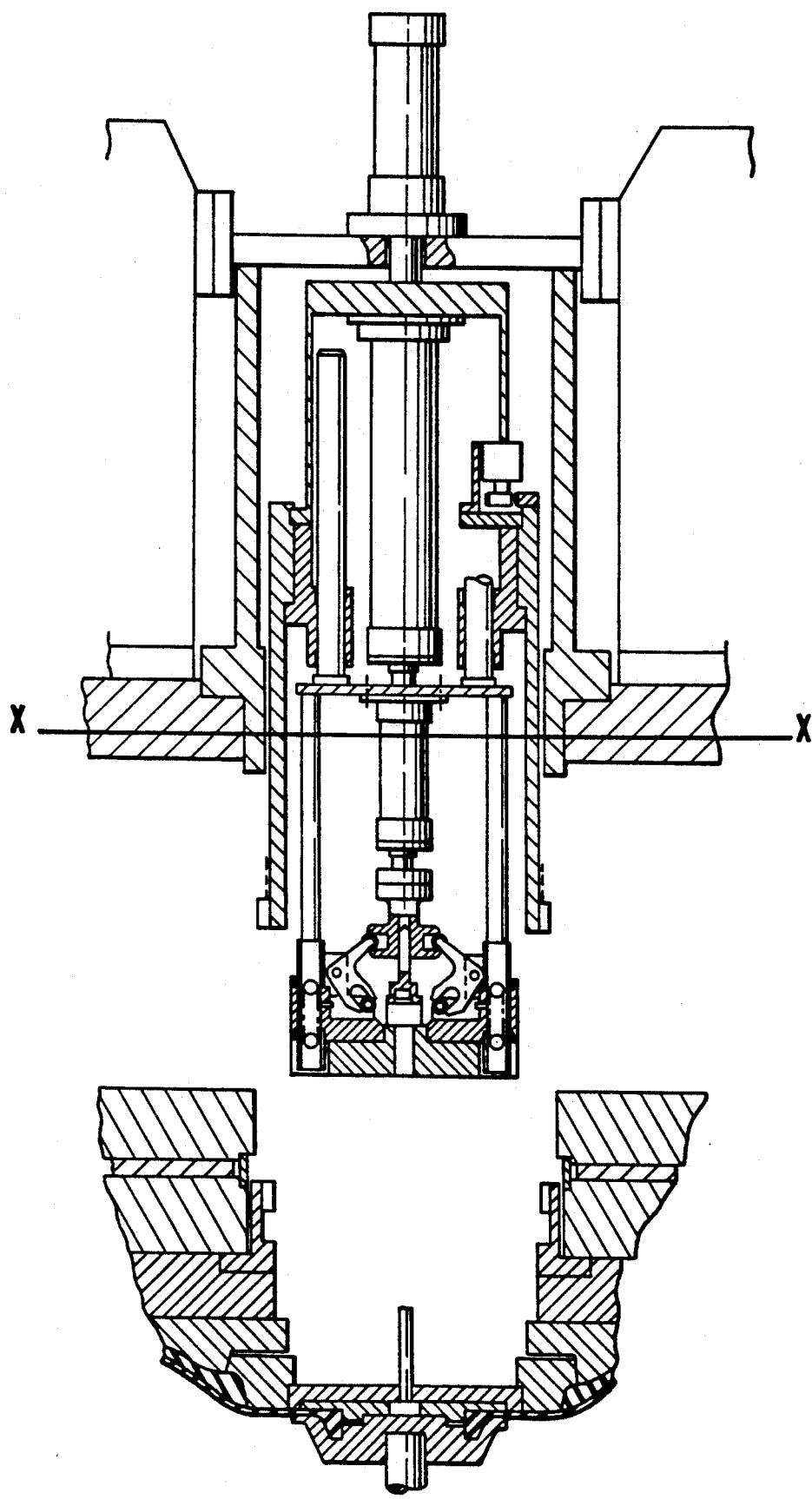
FIG. 48 is a fragmentary sectional view of movable parts of the manipulator.
Figure 49:
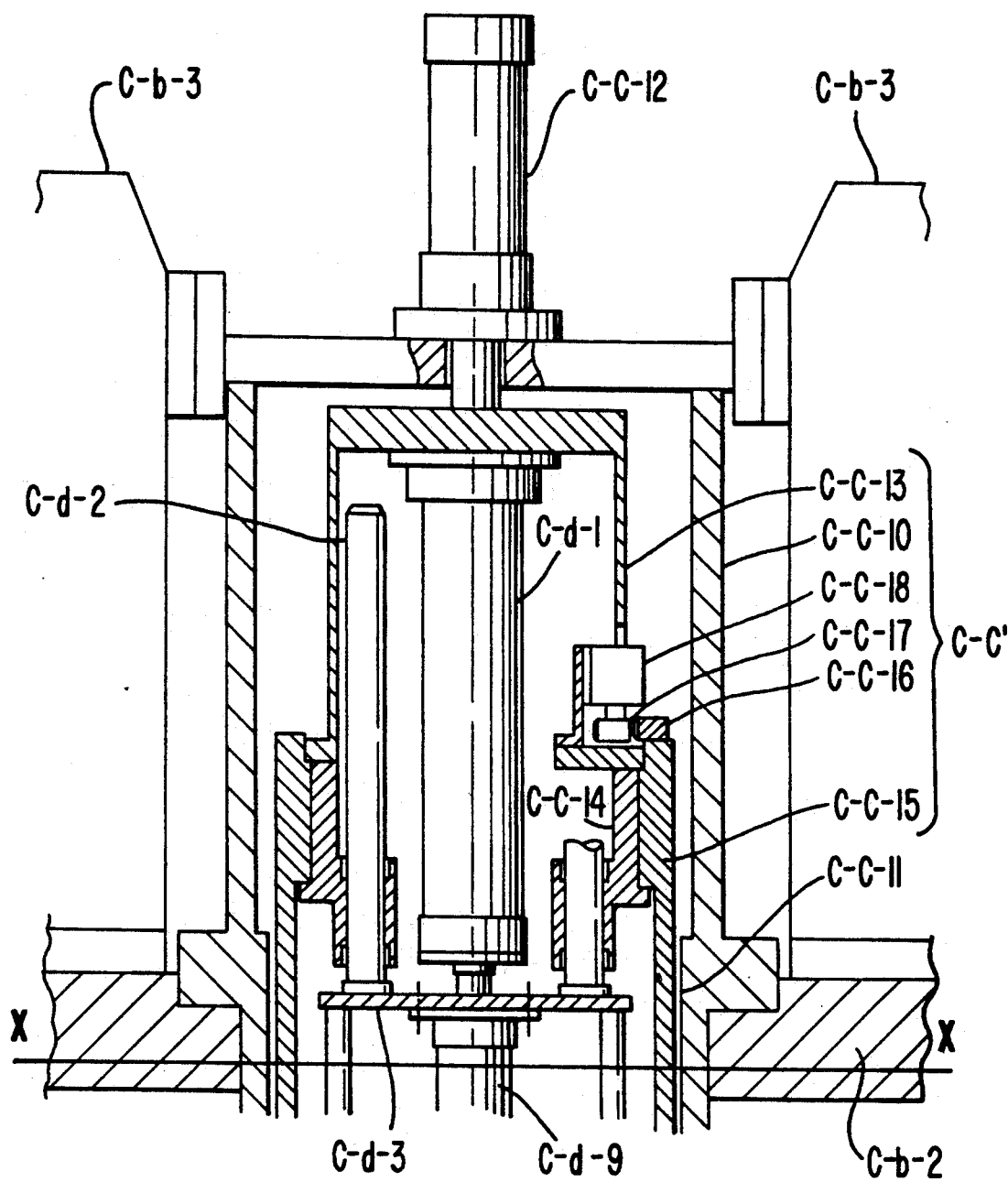
FIG. 49 shows the top half of the arrangement shown in FIG. 48.
Figure 50:
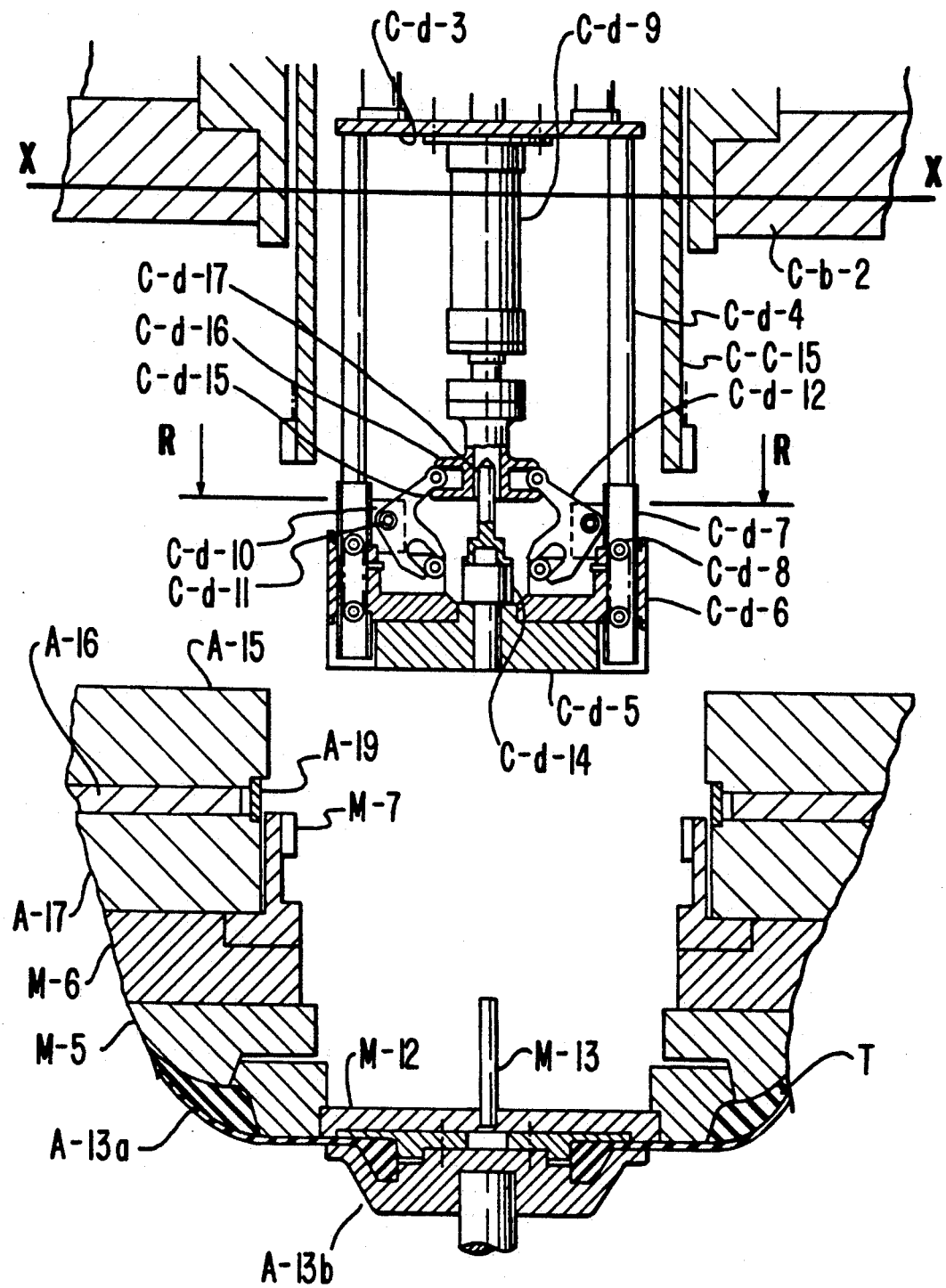
FIG. 50 shows the bottom half of the arrangement shown in FIG. 48.
Figure 51:
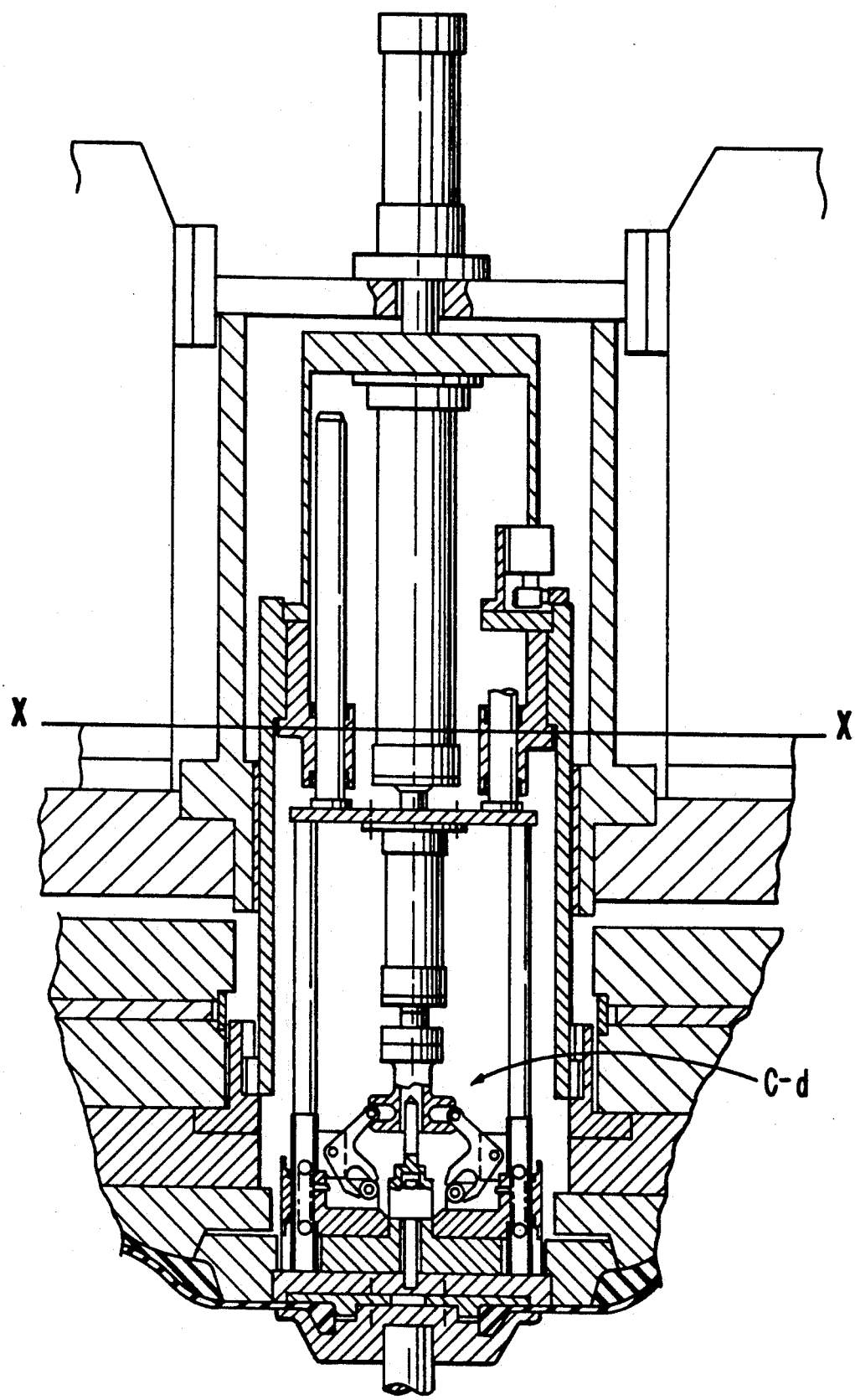
FIG. 51 is a sectional view similar to FIG. 48, showing the manipulator and the top mold half which are coupled together.
Figure 52:
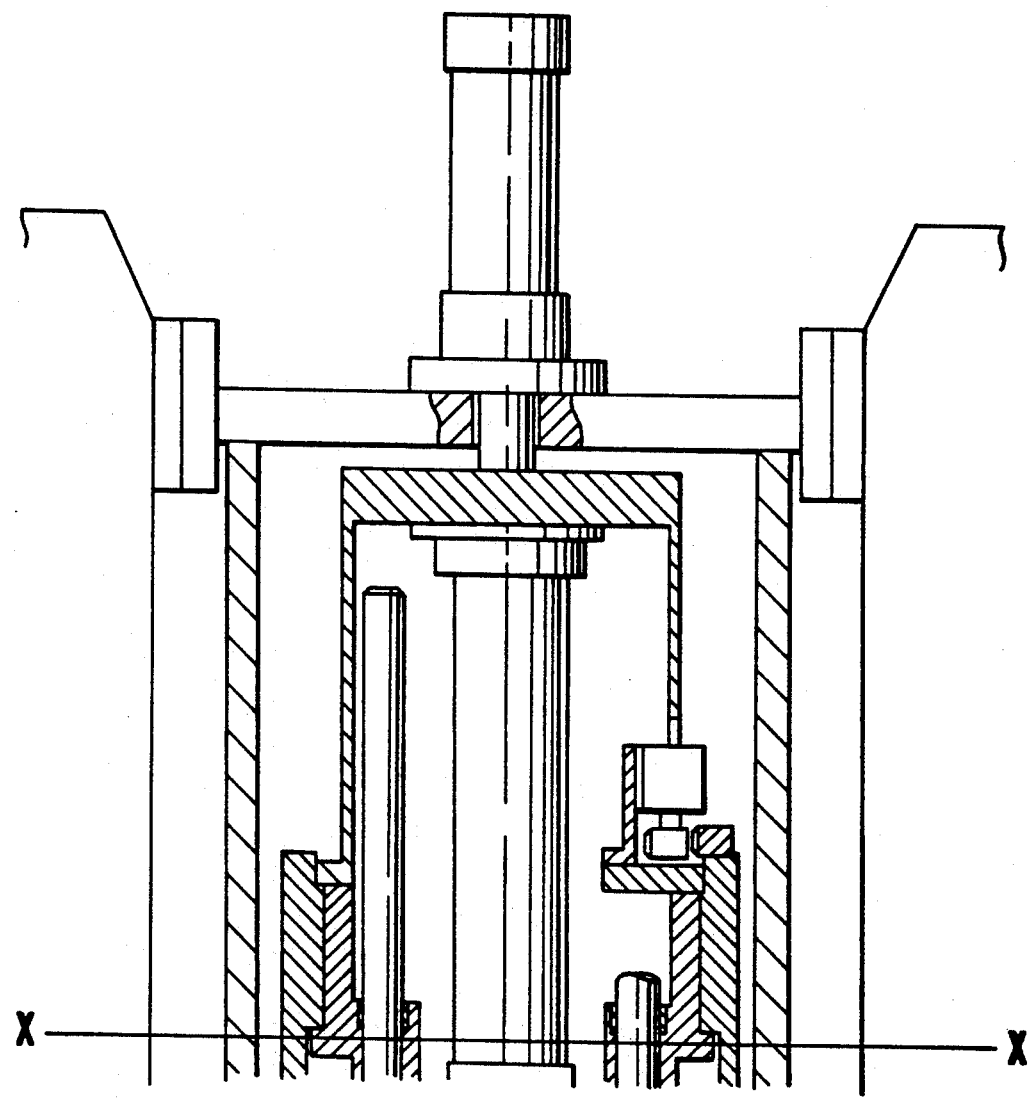
FIG. 52 shows the top half of the arrangement shown in FIG. 51.
Figure 53:
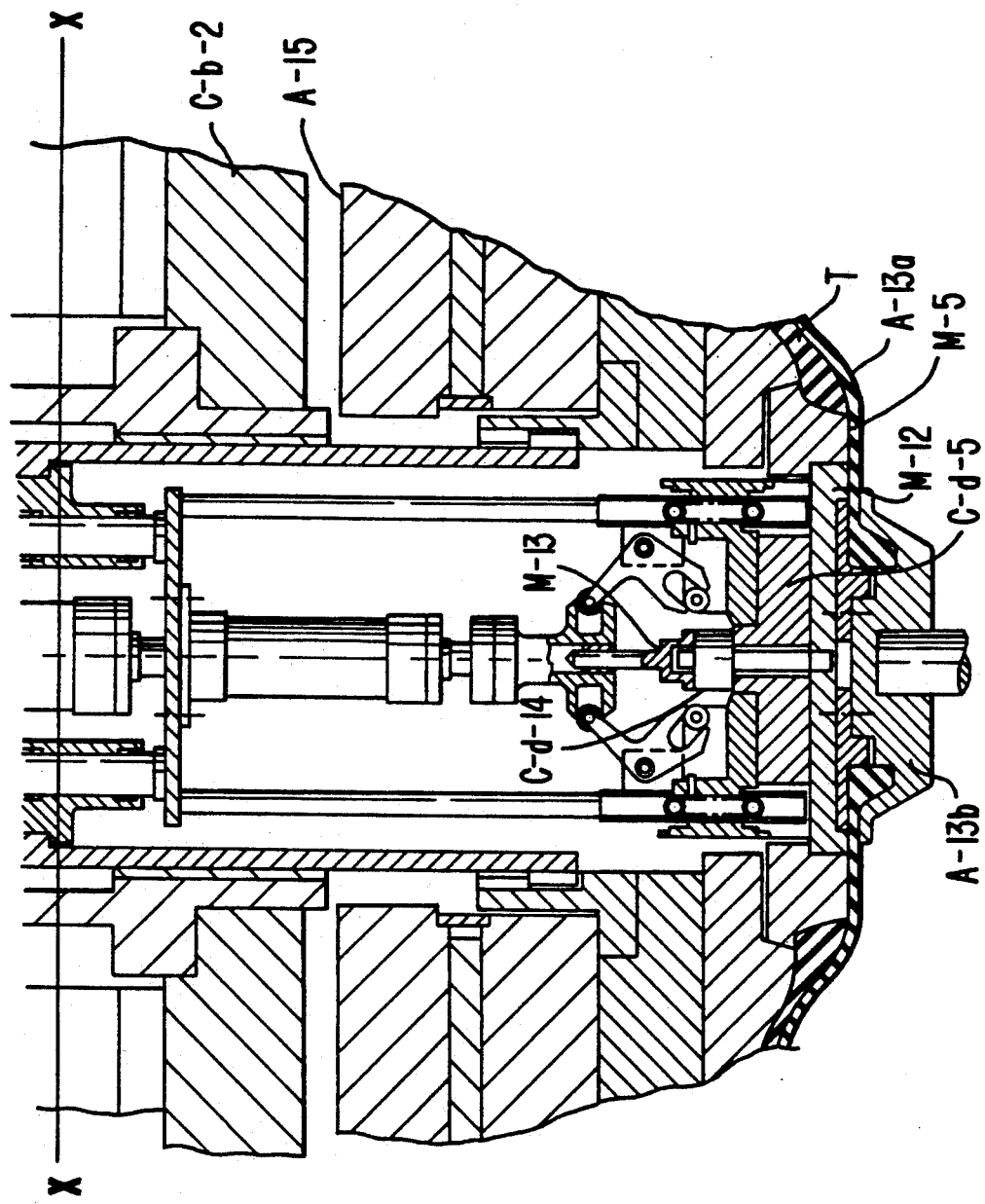
FIG. 53 shows the bottom half of the arrangement shown in FIG. 51.

FIGS. 48 to 50 show a state where movable parts of the manipulator C are disconnected from the corresponding parts of the mold station A, while FIGS. 51 to 53 show a state where the movable parts of the manipulator C are connected to the corresponding parts of the mold station A. The first manipulator $C_1$ and the second manipulator $C_2$, which constitute the mold open-close manipulator C, have the same arrangement and are controlled individually in operation. Reference symbol C-xx will be used in the following description of the arrangement of the manipulator C.

The mold open-close manipulator C (FIG. 39) comprises a frame and travel driving device C-a, a vertical movement guide and driving device C-b, a device C-c for connection with and disconnection from the vertical movable parts in each mold station A, a bead lock mechanism C-d for installing the upper bead of a green tire on the upper bead of the mold M, a green tire loader C-e that holds a green tire and delivers it to the carcass bead loader, a green tire transfer device C-f that transfers a green tire from a green tire rest to the green tire loader C-e, and a tire unloader C-g that removes the completed tire from the tire mold M and discharges it to a known conveyor.

FRAME AND TRAVEL DRIVING DEVICE C-a (SEE FIGS. 16 TO 20 AND 39 TO 42)

The frame comprises a bottom frame C-a-1 that is designed so that it can smoothly pass the upper breach lock cylinder A-14, the lower breach lock cylinder A-4, etc. in each of the mold stations $A_1$ to $A_{12}$ which are closed to effect a vulcanizing operation when the manipulator C travels by being guided by the straight track members B-3 on the common base frame B, and a top frame C-a-2 that is designed so that the vertically movable parts can be raised and lowered with high accuracy. The bottom frame C-a-1 (FIG. 41) is provided with four bearings C-a-3 engaged with the straight track members B-3, the aforementioned pinion C-a-5 secured to the output shaft of the rotational driving device C-a-4 secured to a proper portion of the bottom frame C-a-1, the pinion C-a-5 being in mesh with the rack B-4 provided on the common base frame B, and a lock pin C-a-8 (FIGS. 18 and 19) that is vertically moved by a cylinder C-a-6 and a guide block C-a-7, which are rigidly provided in a proper portion of the bottom frame C-a-1, with respect to a positioning block disposed for each mold station A.

The bottom frame C-a-1 is provided with the green tire loader C-e and the tire unloader C-g, as shown in FIGS. 39 to 47 (the green tire loader C-e and the tire unloader C-g will be detailed later). The top frame C-a-2 is provided with the green tire transfer device C-f and the vertical movement guide and driving device C-b.

The top frame C-a-2 (FIG. 40) has two parallel straight track members C-b-1 that are laid on the opposing vertical surfaces of the top frame C-a-2 in opposing relation to each other, brackets C-b-3 rigidly provided on a bolster plate C-b-2, bearings C-b-4 engaged with the track members C-b-1 and secured to the brackets C-b-3, and hydraulic cylinders C-b-5 rigidly secured at the output shaft ends thereof to the bolster plate C-b-2. The other ends of the hydraulic cylinders C-b-5 are secured to proper portions of the top frame C-a-2.

A known hydraulic pressure generating device C-b-6 is provided on a proper portion of the top frame C-a-2.

The device C-c has the above-described driving devices (elements C-c-1 to C-c-9) and a connecting and disconnecting device and C-c', which are provided on the bolster plate C-b-2.

This device C-c includes a tube C-c-10 is secured to the center of the bolster plate C-b-2 in such a manner as to extend vertically, and a slide member C-c-11 is disposed at the lower end of the tube C-c-10, as shown in FIGS. 40 and 49. The connecting and disconnecting device C-c, further has a tube C-c-13 that is connected to the end of the output shaft of a hydraulic cylinder C-c-12 provided at the upper end of the tube C-c-10, a block C-c-14 secured to the tube C-c-13, a connecting tube C-c-15 rotatably engaged with the block C-c-14 and having on the lower end thereof intermittent teeth meshed with the intermittent teeth formed on the ring M-7 of the mold M installed in the mold station A (FIG. 3), a circular gear C-c-16 provided on the upper end of the tube C-c-15, and a rotational driving device C-c-18 rigidly provided on a proper portion of the tube C-c-13 and having a pinion C-c-17 on the end of the output shaft thereof, the pinion C-c-17 being meshed with the gear C-c-16.

The respective intermittent teeth of the ring M-7 and the connecting tube C-c-15 can be connected and disconnected as desired by rotating the tube C-c-15 with the driving device C-c-18 when the bolster plate C-b-2 of the manipulator C is placed in contact with the upper bolster plate A-15 of the mold station A (see FIGS. 51 to 53). The configurations of the intermittent teeth are determined so that when these teeth are connected with each other, a force for lowering and a force for raising can be transmitted to the ring M-7 from the tube C-c-15 by the operation of the hydraulic cylinder C-c-12.

BEAD LOCK MECHANISM C-d

Japanese Patent Laid-Open (KOKAI) No. 02-200405 (1990) discloses a tire vulcanizer which is designed for the conventional vertical action type hydraulic press, whereas the present invention proposes an arrangement in which a bead lock mechanism is provided on the bolster plate C-b-2 of the mold open-close manipulator C so as to be usable in common for a plurality of mold stations.

FIGS. 48 to 50 show the bead lock mechanism that is incorporated in the tube C-c-13 and the connecting tube C-c-15 of the connecting and disconnecting device C-c'. A lifting cylinder C-d-1 is mounted in the tube C-c-13.

Guide rods C-d-2 guide vertical movement caused by the lifting cylinder C-d-1. A guide plate C-d-5 is supported by six tie rods C-d-4 attached to a plate C-d-3 that is in turn attached to the lower ends of the lifting cylinder C-d-1 and the guide rods C-d-2.

In addition, chucks C-d-6 are guided by the guide plate C-d-5. The chucks C-d-6 each having a sector C-d-7 retained thereon by a spring C-d-8 are slidable on the guide plate C-d-5. This sliding motion is effected by a chuck open-close cylinder C-d-9 through links C-d-12 to open or close the chucks C-d-6. At this time, the degree of opening of the chucks C-d-6 may be adjusted by making the chucks C-d-6 abut against the bead portion of the green tire or by adjusting the stroke of the cylinder C-d-9 by use of a known controller.

FIGS. 48 to 50 show a state where a tire vulcanizing operation is under way, in which the bladder A-13a is disposed at the inner side of the vulcanized tire T and retained by the center post A-13f of the bladder actuating mechanism M-4, and the tire mold members M-4, are disposed outside the vulcanized tire T.

Figure 54:
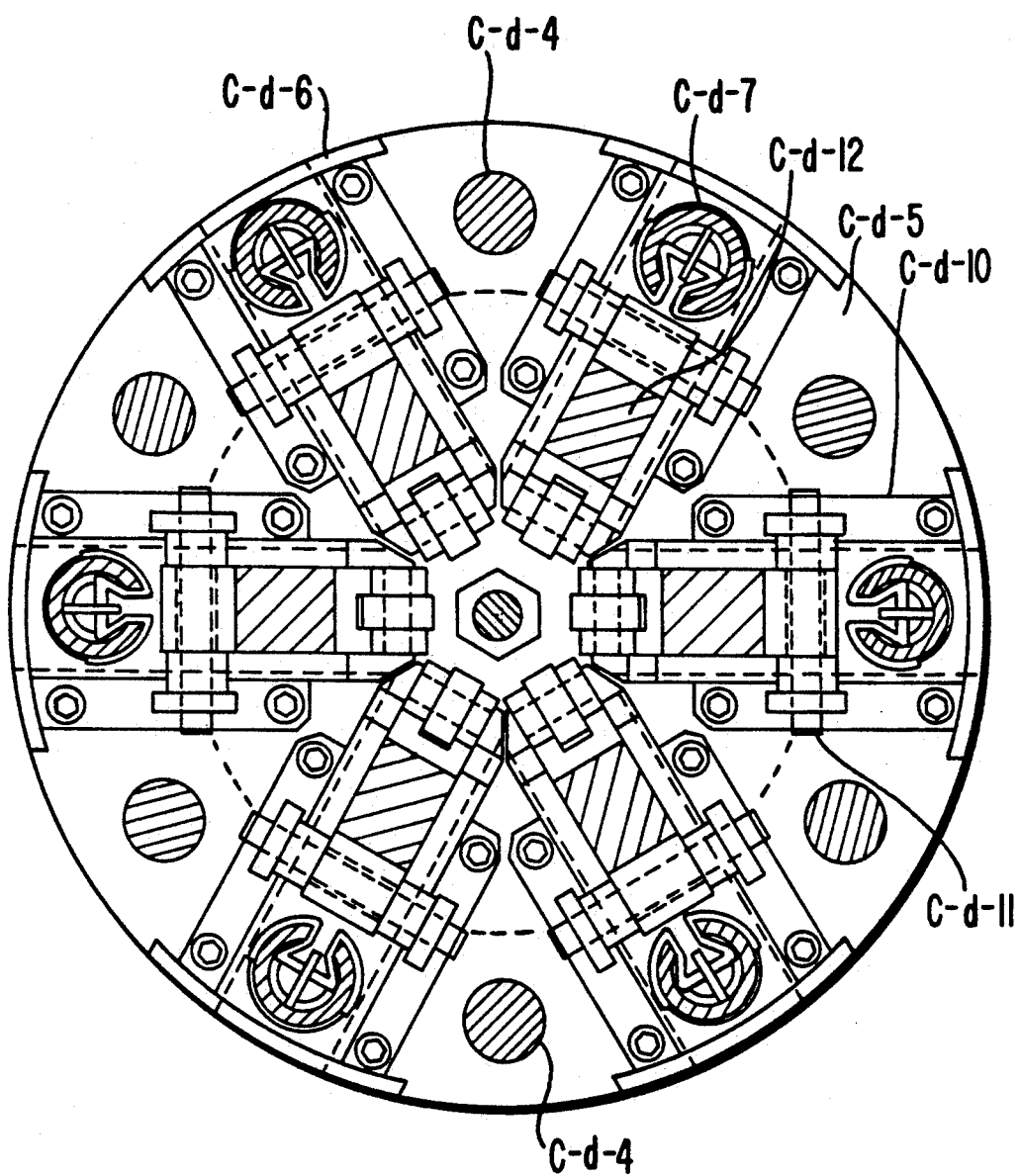
FIG. 54 is a sectional view seen from the arrow R—R in FIG. 50.

FIG. 54 is a sectional view seen from the arrow R—R in FIG. 50.

There are a total of six sets of chucks C-d-6 and sectors C-d-7 on the guide plate C-d-5. The pivotal portion of each link C-d-12 is retained by guide brackets C-d-10 through a pin C-d-11.

Figure 55:
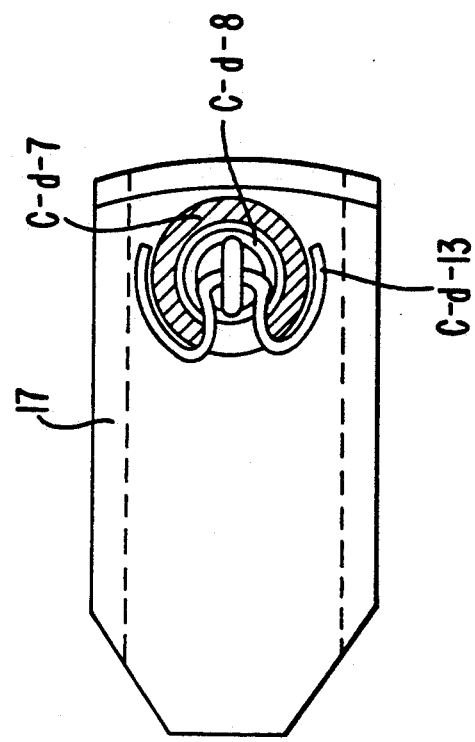
FIG. 55 is a plan view of a sector and a chuck in the arrangement shown in FIG. 54.
Figure 56:
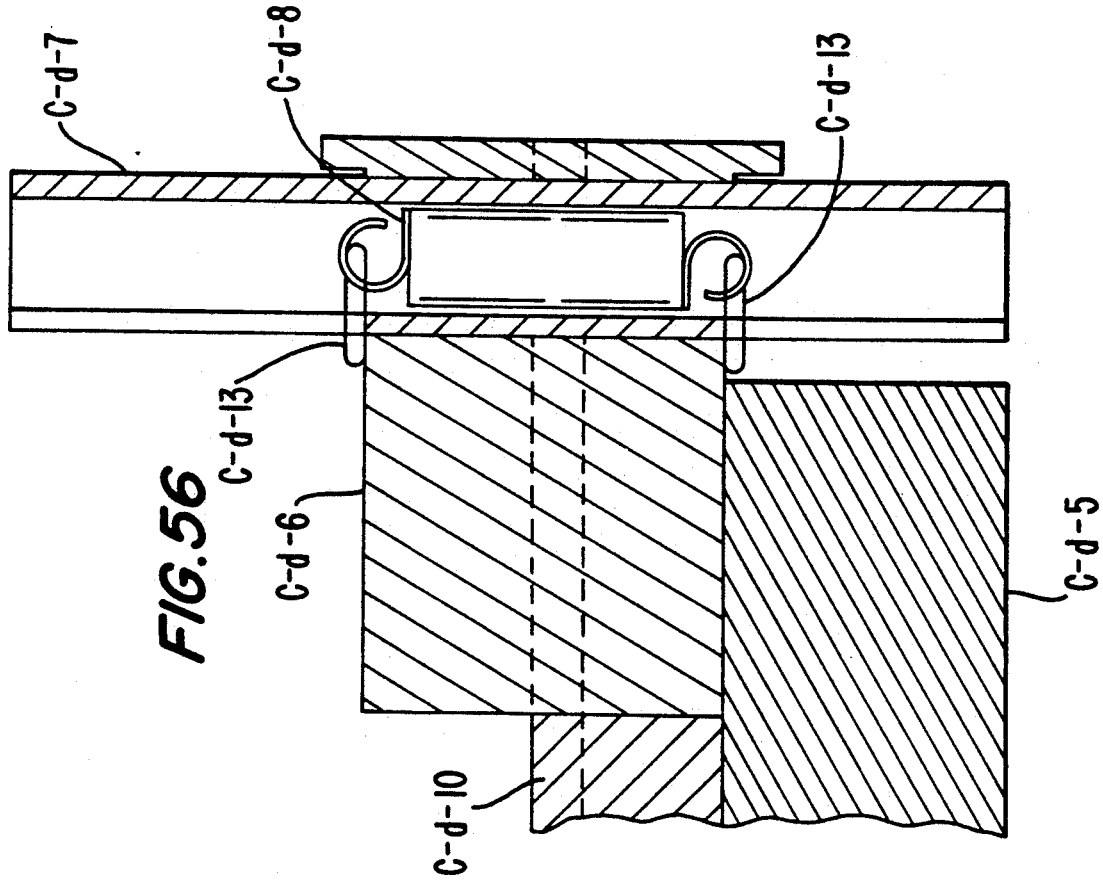
FIG. 56 is a sectional side view of the arrangement shown in FIG. 55.

FIGS. 55 and 56 show in detail a chuck C-d-6 having a sector C-d-7 retained thereon.

The sector C-d-7 is retained in a neutral position on the chuck C-d-6 by the spring C-d-8 attached to a pair of upper and lower spring retainers C-d-13.

Figure 57:
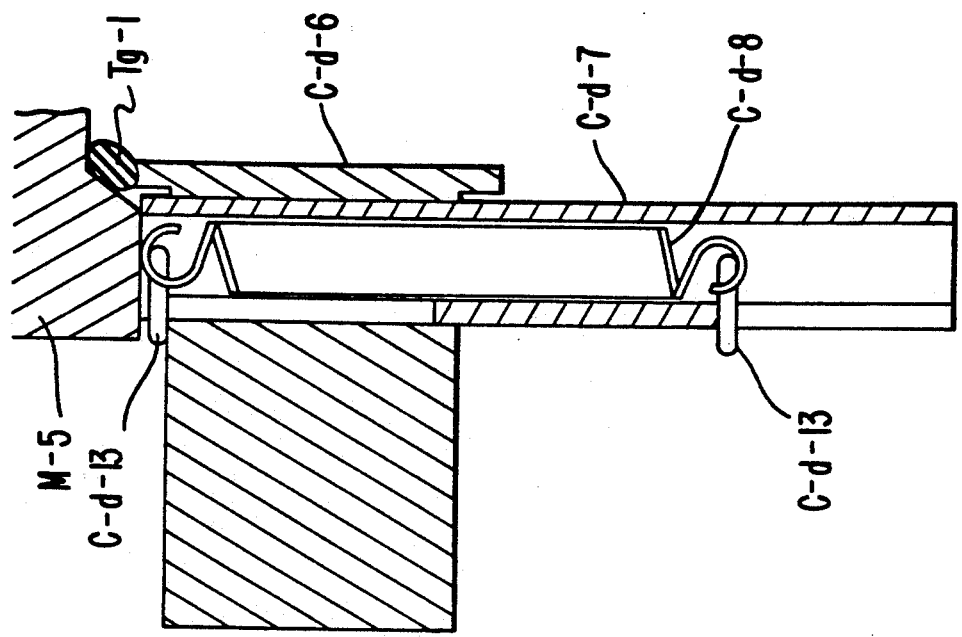
FIG. 57 is an enlarged sectional view showing an upper bead which is pushed into a top bead ring.
Figure 58:
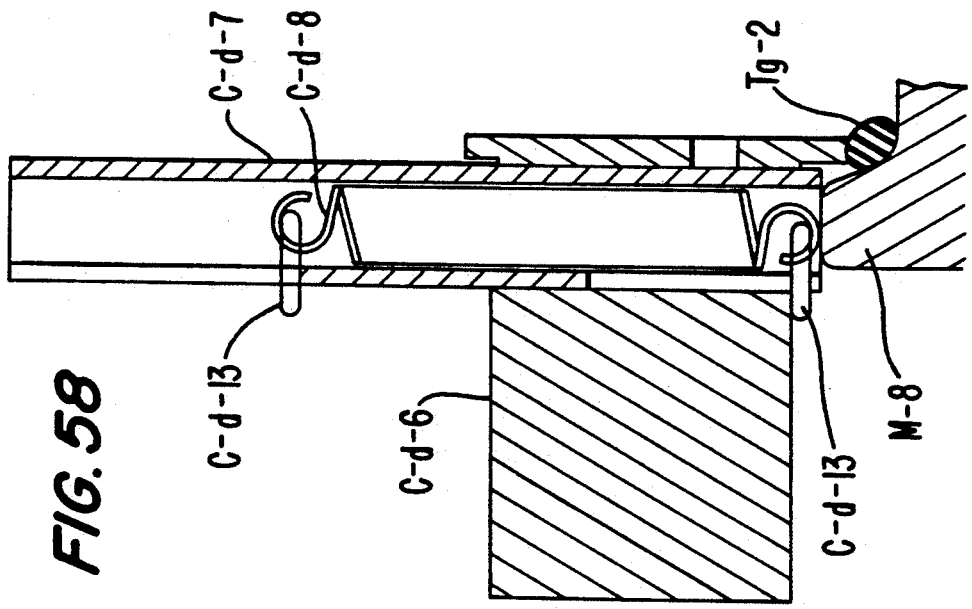
FIG. 58 is an enlarged sectional view showing a lower bead which is pushed into a bottom bead ring.

The operations of the sector C-d-7 and the spring C-d-8 will be explained with reference to FIGS. 57 and 58.

The upper bead Tg-1 of the green tire Tg that is retained by the sector C-d-7 is pushed into the top bead ring of the upper side mold member M-5 by the end of the chuck C-d-6 when pushed up by the raising force from the bead lock lifting cylinder C-d-1 with the spring C-d-8 being expanded. The lower bead Tg-2 of the green tire Tg is similarly inserted into the bottom bead ring of the lower side mold member M-8 by the lowering force from the bead lock lifting cylinder C-d-1.

A lock cylinder C-d-14 (FIG. 50), generally known as "lockup cylinder", is secured to the center of the guide plate C-d-5, and a guide pin C-d-15 is provided on the upper end of the cylinder C-d-14. The guide pin C-d-15 is engaged with a slide member C-d-17 in the center of a distal end block C-d-16 of the cylinder C-d-9, thereby guiding the distal end block C-d-16 accurately. The guide plate C-d-5 has a bore in the center thereof to allow a rod M-13 to pass therethrough which extends upright on the center of the pressure receiving plate M-12 engaged with the mold member M-5 so that when the top clamp member A-13b of the bladder actuating mechanism A-13 is pressed upwardly by the pressure inside the bladder A-13a, the mold member M-5 bears this upward force.

The rod M-13 is allowed to pass through the lock cylinder C-d-14 freely when a pressure fluid is supplied to the cylinder C-d-14. When the supply of the pressure fluid is cut off, the cylinder C-d-14 holds the rod M-13.

By virtue of the above-described arrangement, while the bladder A-13a is being supplied with a heating fluid to vulcanize the tire T, as shown in FIGS. 48 to 50, the pressure receiving plate M-12 is engaged with the tire mold member M-5 so that the force acting on the bladder clamp member A-13b owing to the pressure inside the bladder A-13a can be born by the mold member M-5.

When the manipulator C is brought to the state shown in FIGS. 48 and 50 to perform a mold opening operation at a mold station A, if the lock cylinder C-d-14 is placed in an unlock state by the pressure fluid, the rod M-13 can pass through the lock cylinder C-d-14 freely when the bolster plate C-b-2 of the manipulator C lowers to abut against the bolster plate A-15 in the mold station A, as shown in FIG. 51.

When the supply of the pressure fluid is cut off thereafter, the lock cylinder C-d-14 holds the rod M-13, so that the rod M-13 is united with the guide plate C-d-5. Even when the bladder A-13a is brought to the state shown in the right-hand half of FIG. 2 from the state shown in the left-hand half of the figure thereafter by executing a known procedure, the pressure receiving plate M-12 can be kept secured to the guide plate C-d-5. Further, when a green tire is to be loaded and installed after the completed tire has been removed by executing a predetermined procedure, the chuck assembly of the bead lock device and the pressure receiving plate M-12 can be lowered below the tire mold member M-5 (see FIG. 59).

GREEN TIRE LOADER C-e

The green tire loader C-e is mounted on the bottom frame C-a-1 of the manipulator C at the position shown in FIGS. 39 to 47. The green tire loader C-e has three shoes C-e-1 (FIG. 41) formed to support the tread shoulder portion of the green tire Tg, and a guide plate C-e-2 having known guide grooves (not shown), with which the shoes C-e-1 are engaged. The guide plate C-e-2 is provided with pneumatic cylinders and shoe open-close links (not shown) so that the shoes C-e-1 can be opened and closed by the cylinders under control so as to conform to the size of a green tire received. Thus, a known loader basket assembly is adopted in the present invention. A first arm C-e-5 (FIG. 41) is pivotably attached through a pin C-e-4 to a bracket C-e-3 that is rigidly secured on the frame C-a-1, and a second arm C-e-7 (FIG. 47) is pivotably attached to the first arm C-e-5 through a pin C-e-6. The loader basket assembly is provided on the distal end of the second arm C-e-7. A cylinder C-e-8 is used to pivot the first arm C-e-5, while a cylinder C-e-9 is used to pivot the second arm C-e-7. The control of the four positions shown in FIGS. 43 to 47 is executed by a combination of the extension and retraction of the two cylinders C-e-8 and C-e-9:

| Center of Loader Basket | Cylinder C-e-8 | Cylinder C-e-9 |
| --- | --- | --- |
| First position | Retraction | Extension |
| Second position | Extension | Extension |
| Third position | Extension | Retraction |
| Fourth position | Retraction | Contraction |

The third position is coincident with the center of the mold M in the mold station A. The first position is longitudinally aligned with the respective centers of the green tire rest E and the green tire transfer device C-f. The fourth position is assumed by the loader basket during the time when the manipulator C is moving between mold stations A and during the time when the green tire transfer device C-f (described later) receives a green tire from the green tire rest E and moves above the green tire loader C-e.

GREEN TIRE TRANSFER DEVICE C-f

The green tire transfer device C-f (FIGS. 40 and 45) is rigidly provided on a proper portion of the frame C-a-2 of the manipulator C such that when the manipulator C is at rest in a mold station A, the device C-f is longitudinally aligned with the center of the green tire rest E in the station A. The green tire transfer device C-f comprises a plurality of shoes C-f-1 each having a configuration suitable for holding the upper bead portion of the green tire Tg from the inner side thereof, a guide plate C-f-2 arranged to enable the shoes C-f-1 to expand and contract radially and synchronously, and a driving cylinders for the open-close operation, together with links, which are not shown. Thus, a known basket assembly is formed.

The basket assembly is attached to the lower end of the rod of a cylinder C-f-3 vertically provided on the frame C-a-2. Accordingly, the following operation can be effected. While the manipulator C is removing the tire from the mold M at a mold station A according to a predetermined procedure, the basket assembly of the transfer device C-f lowers with the shoes C-f-1 contracted so as to have a diameter smaller than the inner diameter of the bead portion of the green tire Tg on the green tire rest E, holds the green tire Tg and then moves upward with it. Thereafter, the basket assembly of the green tire loader C-e is moved from the fourth position to the first position, and subsequently the transfer device C-f lowers to install the green tire Tg on the shoes C-e-1 of the green tire loader basket assembly.

TIRE UNLOADER C-g

The tire unloader C-g for the completed tire Tc is mounted on the bottom frame C-a-1 of the manipulator C at the position shown in FIGS. 39 to 47. The unloader C-g is used to separate the completed tire Tc from the tire mold member M-8 by holding the upper bead portion of the tire Tc and moving upward, and it is also used to discharge the tire Tc onto a roller conveyor G that transfers the tire Tc to a belt conveyor F of the factory at a position outside the mold ,M. The unloader C-g comprises a plurality of shoes C-g-1 (FIG. 42) designed to be suitable for holding the tire bead portion from the inner side thereof, and a guide plate C-g-2 having known guide grooves (not shown), with which the shoes C-g-1 are engaged. In addition, pneumatic cylinders and shoe opening and closing links, which are not shown, are provided on the guide plate C-g-2 so that the shoes C-g-1 are opened and closed by the cylinders. Thus, a known unloader basket assembly is adopted.

The tire unloader C-g includes a straight track C-g-3 rigidly provided on the frame C-a-1, bearings C-g-4 engaged with the track C-g-3, a bracket C-g-5 attached to the bearings C-g-4, a hydraulic cylinder C-g-6 that enables the bracket C-g-5 to move vertically on the straight track C-g-3, a first arm C-g-8 pivotably attached to the bracket C-g-5 through a pin C-g-7, and a second arm C-g-10 pivotably attached to the first arm C-g-8 through a pin C-g-9. The unloader basket is secured to the distal end of the second arm C-g-10.

Although not shown, cylinders are provided for the first arm C-g-8 and the second arm C-g-10, respectively, so that these arms can be pivoted individually, in the same way as in the case of the green tire loader C-e. Thus, the tire unloader C-g is movable between the following four positions in accordance with the combination of the two cylinders: the first position which is coincident with the center of the mold M; the second position which is assumed in the middle of the tire discharging operation; the third position which is the tire discharge position; and the fourth position which is a stand-by position for the tire unloader C-g during the time when the manipulator C is moving between mold stations A. At the first and third positions, the tire unloader C-g can be moved up and down by the operation of the cylinder C-g-6.

The operation of the apparatus according to the present invention will be explained below for each of the following items:

(1) The operation for a tire production process including operations of opening and closing a mold at each mold station, loading of a green tire, unloading of the completed tire, etc.

(2) The operation of removing a mold which is to be replaced from the mold station, transferring it to the second mold preparing station and leaving it there as it is.

(3) The operation of transferring a mold which has already been preheated from the first mold preparing station to a mold station, installing it there and making preparations for a tire production operation.

(4) The operation of installing a new mold in the first mold preparing station and preheating it at the time of mold change.

(1) The operation for a tire production process at each mold station (refer generally to FIGS. 3-6):

(a) At each mold station, known vulcanization control is individually executed by a program controller. The state of progress at each mold station is reported to a centralized control board from each program controller every moment. The centralized control board executes computations in order to efficiently use two mold open-close manipulators, and issues instructions for movement accurately in response to a request for a mold open-close operation from each mold station. When an instruction concerning a mold station that needs a mold change and a timing instruction are input, these instructions are automatically incorporated into the control of use of the manipulators, thus enabling efficient use of the mold open-close manipulators.

(b) During the above-described operation, a manipulator moves at the request of a mold station and stops at this station. After it has stopped, the pin C-a-8 on the frame C-a-1 is fitted into the positioning block B-5 on the common base B, thereby allowing the center of the manipulator to align with the center of the mold station with high accuracy.

(c) Thereafter, the upper bolster plate C-b-2 of the manipulator lowers at a proper timing to come in contact with the upper bolster plate A-15 of the mold station. Thereafter, the clamping device C-ca (FIGS. 13, 14) is activated to connect together the upper bolster plate C-b-2 and the upper bolster plate A-15.

Further, the connecting tube C-c-15 and the ring M-6 in the mold station are connected together. In addition, the rod M-13 in the mold station and the lock cylinder C-d-14 are connected together (FIGS. 30, 31 and 49-53). In the meantime, the heating fluid is evacuated from the bladder A-13a, and the bladder A-13a is separated from the tire and accommodated in the accommodating tube A-13d. The pressure cylinders A-5 are evacuated of the pressure fluid to remove the mold clamping force, resulting in a slight gap between the engaged intermittent teeth of the breach lock tubes A-4 and A-14. Thereafter, the lower breach lock tube A-4 is rotated to disengage the upper and lower intermittent teeth from each other.

(d) The manipulator lowers the connecting tube C-c-15 with the cylinder C-c-12 and, while doing so, it raises the bolster plate C-b-2 with the cylinders C-b-5. As a result, the mold M is opened with the mold members M-8, M-9 and M-10 left on the bolster plate A-7 in the station, as shown in the right-hand half of FIG. 2 (no tire is shown).

(e) After the mold M has been split satisfactorily, the basket assembly of the tire unloader C-g (FIGS. 39-47) is moved to the center of the mold M and lowered to hold the bead portion of the tire with the shoes C-g-1 from the inner side thereof. Then, the tire unloader C-g moves upward to separate the tire from the mold member M-8 and moves to the discharge position, where the shoes C-g-1 are activated to release the tire onto the discharge conveyor G, thus completing the removal of the completed tire. Thereafter, the unloader is moved to the stand-by position.

(f) During the period of time elapsed from the moment the manipulator stops at the mold station until the completed tire removing operation is started, preparations for loading of a green tire have been completed in front of the press.

More specifically, after the manipulator has stopped, the basket assembly of the green tire transfer device C-f lowers and holds the upper bead portion of a green tire on the green tire rest E from the inner side thereof, and in this state, the basket assembly moves upward. Thereafter, the basket assembly of the green tire loader C-e is moved from the stand-by position to a position directly below the basket assembly of the transfer device C-f. Subsequently, the transfer device C-f lowers to transfer the green tire to the basket of the green tire loader C-e and then moves upward. Thus, the green tire loading preparations are completed.

(g) The completed tire is carried out by the tire unloader C-g, and the green tire loader C-e is moved to the mold center position at a timing wherein there is no interference with the loading of the green tire.

Figure 59:
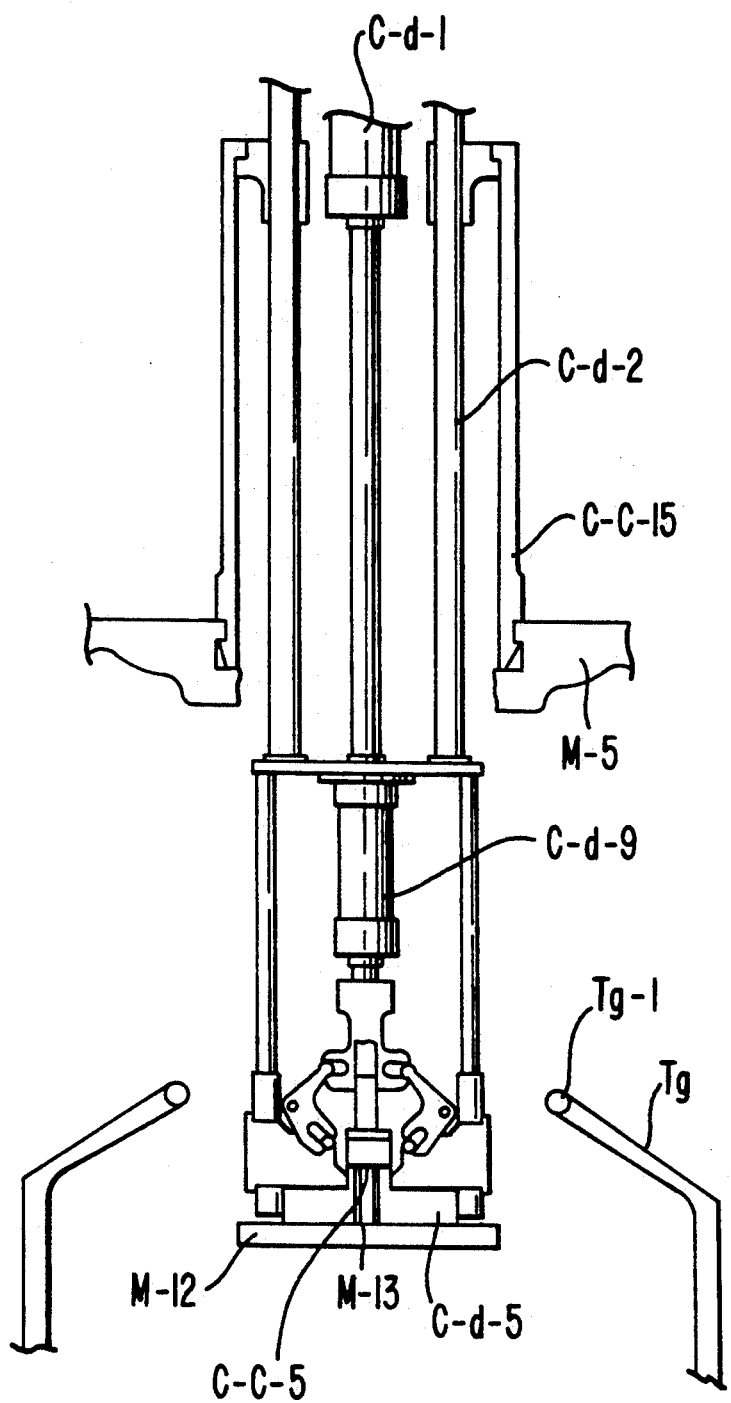
FIG. 59 illustrates the operation of a bead lock mechanism.

(h) When the green tire is brought to the mold center position, the bead lock device C-d (FIGS. 48-59) is lowered by the cylinder C-d-1 to a position which is convenient for the bead lock device C-d to receive the upper bead portion of the green tire, that is, the position shown in FIG. 59.

(i) Thereafter, the chucks C-d-6 are activated to open until the sectors C-d-7 abut against the inner periphery of the upper bead portion of the green tire, thereby centering the green tire. Thereafter, the bead lock device C-d moves upward to place the upper bead portion of the green tire in the bead ring of the upper side mold member of the tire mold. At a proper timing during this upward movement, the green tire loader is returned to the stand-by position from the tire mold center position. Upon completion of the insertion of the upper bead portion, the bead lock device C-d executes insertion of the lower bead portion.

During this operation, the manipulator lowers the bolster plate C-d-2 only for a part of the entire stroke. Since the operation that is carried out from the time when the upper bead portion is inserted until the lower bead portion is inserted is described in detail in Japanese Patent Laid-Open (KOKAI) No. 02-200405 (1990) a description thereof is herein omitted. After the completion of the insertion of the upper and lower bead portions, the bladder A-13a is supplied with the pressure fluid, and the upper and lower bladder clamp rings A-13b and A-13c are raised to insert the bladder A-13a into the green tire. At a proper timing during the operation of allowing the bladder A-13a to come out of the accommodating tube A-13d, the bead lock device C-d is retracted and accommodated such that the pressure receiving plate M-12 abuts against the upper side mold member M-5. After the bladder A-13a has been inflated completely, the bolster plate C-b-2 of the manipulator is lowered by the cylinders C-b-5 (FIGS. 17 and 19) while pressing back the cylinder C-c-12, thus closing the mold completely. Upon completion of the mold closing operation, the constituent elements are placed in the state shown in the left-hand half of FIG. 2 and FIG. 51. Since the operation that is carried out from the time when the inflation of the bladder A-13a is begun until the bead lock device C-d is accommodated is detailed in Japanese Patent Laid-Open (KOKAI) No. 02-200405 (1990) a description thereof is omitted.

(j) After the mold has been closed by the lowering of the bolster plate C-b-2, the breach lock tube A-4 is rotated so that the respective intermittent teeth of the breach lock tubes A-4 and A-14 are engaged with each other. Next, the pressure cylinders A-5 press the lower bolster plate A-7, thereby clamping the mold between the upper bolster plate A-15 and the lower bolster plate A-7.

(k) When the clamping of the mold by the bolster plate C-b-2 is completed, the heating fluid supply and discharge devices for the upper heating plate A-17 and the outer ring M-2 have been connected together, and the supply of a heating fluid is begun.

(l) At a proper timing after the mold clamping by the pressure cylinders A-5 has begun, the clamping device C-ca, , the connecting tube C-c-15 and the upper ring M-7 are disconnected, while the rod M-13 and the lock cylinder C-d-14 are disconnected, and the bolster plate C-b-2 is disconnected from the upper bolster plate A-15 for the mold M and then moves upward.

(m) Before the bolster plate C-b-2 reaches the upper limit of its travel, the positioning pin C-a-8 of the manipulator is disengaged from the block B-5.

(n) After the bolster plate C-b-2 has reached the upper limit and the pin C-a-8 has been disengaged, the manipulator moves to another mold station for the next mold open-close operation in response to instructions from the centralized control board. When stopping at the second station, the manipulator is positioned there in the same way as described above.

(o) Thereafter, similar operations are successively executed at other mold stations, thereby executing production of tires. The supply of green tires onto the green tire rest E may be carried out by a proper method.

(2) The operation of removing a mold which is to be replaced from a mold station, transferring it to the second mold preparing station and leaving it there as it is:

(a) The centralized control board is instructed about a mold station which needs a mold change and a designated time for replacement or a designated number of tires to be produced. The time at which the heating of a new mold should be started is determined by calculating backward on the basis of the designated time for replacement or the replacement time calculated from the designated number of tires to be produced. Since the time required for a mold to heat up can be determined in advance, it is calculated for each of various kinds of molds. Instructions are issued for the mold preparing section to prepare a mold in advance of the heating starting time calculated, and the mold preparing section carries, a mold to the first mold preparing station at a proper time before the heating starting time to preheat the mold until the time for replacement of the old mold.

(b) When the completed tire is discharged upon completion of the production of the final tire at a mold station where a mold change should be executed, a mold changing operation is started. No green tire is loaded any longer, and the mold that has been opened to discharge the tire is temporarily closed. When the bolster plate C-b-2 lowers to close the mold (the upper and lower breach lock tubes A-4 and A-14 are not locked), the mold clamping devices A-21 (FIGS. 11 and 12) are unlocked to disconnect the lower bolster plate A-7 and the bottom plate M-10 of the mold M. When the bolster plate C-b-2 of the manipulator moves upward with the connecting tube C-c-15 kept in the connected state and with the top plate M-6 of the mold M raised, since the mold M is closed and hooks of the segments M-3 are engaged with the bottom plate M-10 of the mold M, the mold members M-8, M-9 and M-10, which are held by the segments M-3, are separated from the lower bolster plate A-7 of the mold station and moved upward.

(c) Before the manipulator reaches the upper limit of its vertical movement, the pin C-a-8 of the frame C-a-1 is disengaged from the block B-5. Then, the manipulator is moved to and stopped at the second mold preparing station.

(d) After the manipulator has stopped, the bolster plate C-b-2 lowers until the bottom plate M-10 of the mold M abuts against the supports $D_2$-1 (FIG. 23) of the second mold preparing station.

(e) The driving devices (FIG. 9) are connected to the clamping devices A-20 on the upper bolster plate A-15, and the upper bolster plate A-15 and the outer ring M-2 of the mold M are disconnected. In the meantime, in the center of the second mold preparing station the distal end flange of the cylinder provided vertically on the cross beams B-1 is brought into contact with the pressure receiving plate M-12 of the mold M. Then, the lock cylinder C-d-14 unlocks the rod M-13 of the pressure receiving plate M-12. Subsequently, the connecting plate C-c-15 is rotated to disengage from the upper ring M-7.

(f) When the bolster plate C-b-2 moves upward after all the above-described connected members have been disconnected, the mold M is left as it is. Thus, the bolster plate C-b-2 moves upward together with the upper bolster plate A-15, the upper breach lock tube A-14 and the top heating plate A-17, which have been carried from the mold station and attached thereto.

(g) Thereafter the manipulator moves to the first mold preparing station to receive a new mold which has already been centered and preheated completely. (3) The operation of transferring a mold which has already been preheated from the first mold preparing station to a mold station, installing it there and making preparations for a tire production operation:

(a) At a proper timing during the operation in which the manipulator removes the mold from the mold station after completion of the preheating of the new mold, the loader at the first mold preparing station is moved from the stand-by position (FIG. 26) to the position directly above the mold (FIG. 28) in the first mold preparing station and connected to the top heating device installed over the mold. Then, the loader moves upward to separate the top heating device from the mold. Thereafter, the loader is moved to the stand-by position.

(b) The manipulator leaves the tire mold M in the second mold preparing station and then moves to the first mold preparing station where it is positioned to receive the mold that has already been centered and preheated completely.

(c) At the same time that the bolster plate C-b-2 of the manipulator lowers, the mold M is lifted by the mold lifting device (FIG. 33) at the first mold preparing station.

(d) The mold M is raised until the top plate M-6 and the outer ring M-2 of the mold M abut against the top heating plate A-17 connected to the manipulator. Thereafter, connection is made between the connecting tube C-c-15 and the upper ring M-7, between the mold clamping devices A-20 and the outer ring M-2, and between the lock cylinder C-d-14 and the rod M-13 of the pressure receiving plate M-12 (FIG. 53).

(e) Thereafter, as the bolster plate C-b-2 moves upward, the mold M in the first mold preparing station is raised together with it. At this time, the cylinder C-c-12 (FIG. 49) functions to raise the mold M so that the hooks of the segments M-3 of the mold M will not disengage from the engagement grooves of the bottom plate M-10, as a matter of course.

(f) Before the bolster plate C-b-2 reaches the upper limit of its travel, the positioning pin C-a-8 is disengaged from the block B-5, and after the bolster plate C-b-2 has been raised completely, the manipulator moves to the mold station and it is positioned there.

(g) After the manipulator has been positioned, the bolster plate C-b-2 lowers until the bottom plate M-10 of the mold M abuts against the lower bolster plate A-7 of the mold station. After the lowering of the bolster plate C-b-2 has stopped, the mold clamping devices A-21 (FIG. 11) on the lower bolster plate A-7 operate to connect together the lower bolster plate A-7 and the bottom plate M-10.

(h) After the connection has been made, the bolster plate C-b-2 moves upward again. At this time, the connecting tube C-c-15 is subjected to downward force from the cylinder C-c-12. Thus, the segments M-3 of the mold M slide on the plate M-9 while moving radially. When the segments M-3 reach the limit of the movement thereof relative to the outer ring M-2, the segments M-3 then move upward together with the outer ring M-2.

The engagement between the hooks of the segments M-3 and the engagement grooves of the bottom plate M-10, which functions effectively during the transfer of the mold, is released in the middle of the radially outward sliding movement of the segments M-3. Accordingly, upon the completion of the radial movement of the segments M-3, the mold members M-8, M-9 and M-10 of the mold M can be left on the lower bolster plate A-7.

(i) When the bolster plate C-b-2 reaches the upper limit of its travel to establish the state shown in the right-hand half of FIG. 2, the above-described operations carried out from the step of loading a green tire to the step of clamping the mold are executed. Thus, the operation is automatically switched over from the mold changing operation to the tire production operation, thereby allowing the production of tires to be continued.

Although in the foregoing the manipulator that has been used for the production of the final tire is continuously used to remove and transfer the mold from the mold station, two manipulators may be used in such a manner that one manipulator that has been engaged in the production of the final tire at a mold station is used to close the mold and is then disconnected from the mold station to move to another mold station demanding a mold open-close operation, while another manipulator moves to the mold station that needs a mold change to continue the mold changing operation, in accordance with the position of the mold station needing a mold change relative to the mold preparing station and in accordance with the positional relationship between the mold station needing a mold change and a mold station that demands a mold open-close operation during the mold changing operation.

(4) The operation of installing a new mold in the first mold preparing station and preheating it at the time of a mold change:

(a) When the time at which a mold change should be executed is designated on the basis of a production plan, a mold is carried to the first mold preparing station before the time that is determined by taking into consideration the time required for the mold to be preheated completely. The mold is transported by a forklift, for example.

(b) The mold is transported with the pressure receiving plate M-12 laid on the bead ring of the lower side mold member M-8. The relationship between the pressure receiving plate M-12 and the lower side mold member M-8 is shown in the right-hand halves of FIGS. 31 and 32.

(c) The mold is suspended from a conventional hoisting accessory suspended from the end of the arm of the forklift by using wire or the like. The mold is suspended at the top plate M-6 or the ring M-7. By so doing, the mold is transported in a state where the hooks provided on the lower ends of the segments M-3 are engaged with the engagement grooves of the bottom plate M-10 so that the lower side mold member M-8, the slide member M-9 and the bottom plate M-10 are connected to the top half of the mold.

(d) When there is no mold heated in the first mold preparing station, the heating device loader that holds the top heating device is placed in the stand-by position. The conditions of the loader at this time are shown in FIGS. 21 to 24.

(e) While the top heating device is placed in the stand-by position as described above, the mold is carried above the first mold preparing station by the forklift. The mold centering device at the first mold preparing station is placed in the state shown in FIG. 33, so that the mold is lowered to abut against the bearings 320.

(f) When the mold abutting against the bearings 320 is further lowered by the forklift, the weight of the mold acts on the bearings 320, pushing down the cylinders 319. In consequence, the mold lowers with the centering blocks 311 engaged with the projecting portions of the bottom plate M-10 by the action of the links. Since the mold is suspended by the forklift and the bottom plate M-10 is in contact with the bearings 320, the bottom plate M-10 is smoothly centered by the centering blocks 311. The state where the centering is completed is shown in FIG. 34.

(g) After the mold has been centered and installed on the bottom heating plate of the first mold preparing station, the mold is disconnected from the hoisting accessory of the forklift.

(h) Thereafter, the top heating device is installed over the mold by the loader, and the connecting device is disconnected. Then, the arm of the loader is moved to the stand-by position again. At the same time as the top heating device is installed over the mold, the heating fluid supply and discharge devices for the heating device are also connected.

(i) Then, the pressure receiving plate M-12 is raised by the cylinder and pressed against the, bead ring of the upper side wall mold member M-5 of the mold.

The pressure receiving plate is continuously pressed against the bead ring during the heating process, and it is also kept pressed until the pressure receiving plate is connected to the manipulator that comes to receive the mold.

(j) When the heating device is set, the heating fluid is supplied to circulate through the top heating plate and the mold outer ring via the heating fluid supply and discharge devices (FIG. 37). The supply of the heating fluid to the bottom heating plate is effected through a conventional fluid pipeline provided on the stationary member.

(k) When a predetermined temperature is reached and the manipulator begins a mold removing operation at the mold station, the arm of the loader is moved from the stand-by position to the mold position to receive the top heating device. Thereafter, the arm of the loader is moved to the stand-by position.

(l) Thereafter, the process (b) in the above-described operation (3) is executed.

Thus, the present invention provides a mold changing apparatus for use in a tire vulcanizer including a mold station having tire molds disposed in a row, a movable mold open-close manipulator, and a mold preparing station provided at a proper position in the row of tire molds for centering and preheating a tire mold, wherein the mold open-close manipulator is arranged to receive a tire mold from the mold station, to transfer it to the mold preparing station, to release it there, to receive a new mold which has already been centered and preheated at the mold preparing station, to transfer the new mold to the mold station and to install it there.

With the conventional mold changing method, it is necessary to assign personnel to transport a mold in accordance with the time at which the production of the final tire by a mold that should be removed from the press is completed. However, according to the present invention, the mold may be transported when it is convenient for the mold transporting personnel. Thus, the mold changing operation can be executed extremely efficiently without being restricted by time.

Although the prior art needs an assistant to the operator of a forklift or a crane, the present invention enables a mold to be installed in the mold preparing station only by the forklift or crane operator. Further, it is possible to lower by a large margin the costs of equipment related to loading and unloading in the tire vulcanizer and hence it is possible to reduce the overall cost of equipment of the tire vulcanizer.

Although the present invention has been described through specific terms, it should be noted here that the described embodiments are not exclusive and that various changes and modifications may be imparted thereto without departing from the scope of the invention which is limited solely by the appended claims.

What is claimed is:

1. Tire production apparatus comprising:
a plurality of mold stations disposed in a row, each of said mold stations including a split mold having separable top and bottom halves, a lower bolster plate, a clamping device fixed to said lower bolster plate and capable of detachably securing the bottom half of a said split mold to said lower bolster plate, an upper bolster plate, a clamping device fixed to said upper bolster plate and capable of detachably securing the top half of the split mold to said upper bolster plate, heating equipment including a fluid supply device and a fluid discharge device and which allows heating fluid to be supplied to a location in the mold station where the heating fluid will heat the top half of the mold and to be discharged therefrom, an upper breach lock tube integral with said upper bolster plate, a lower breach lock tube fixable to said upper breach lock tube upon relative rotation therebetween, a base plate rotatably supported in the mold station, said lower breach lock tube being fixedly mounted to said base plate, and means for moving said lower bolster plate and said base plate relative to one another so as to cause said upper and lower bolster plates to generate a mold clamping force acting therebetween when said upper and lower breach lock tubes are fixed to one another;
a mold preparing station aligned with the row of mold stations, said mold preparing station including a centering mechanism which centers a said split mold in the mold preparing station, and heating equipment which preheats a said split mold that is in the mold preparing station; and
at least one open-close manipulator including a frame, a travel driving device operatively connected to said frame and operative to move said frame along the row of mold stations and to said mold preparing station, and clamping equipment supported by said frame, the clamping equipment of said at least one manipulator capable of detachably securing respective ones of the split molds to said frame so that the split molds are transportable by said at least one open-close manipulator between the respective ones of said mold stations and said mold preparing station.

2. Tire production apparatus as claimed in claim 1, and further comprising a mold thickness adjusting device which maintains a minimum spacing between said lower bolster plate and said base plate, said mold thickness adjusting device being adjustable to vary said minimum spacing and thus allow the amount by which said lower bolster plate is moveable relative to said base plate to be varied.

3. Tire production apparatus comprising:
a plurality of mold stations disposed in a row, said mold stations including tire molds each including mold members having upper and lower bead rings;
a mold preparing station aligned with the row of mold stations, said mold preparing station including a centering mechanism which centers a said tire mold in the mold preparing station, and heating equipment which preheats a said tire mold that is in the mold preparing station; and
at least one open-close manipulator including a frame, a travel driving device operatively connected to said frame and operative to move said frame along the row of mold stations and to said mold preparing station, clamping equipment supported by said frame, the clamping equipment of said at least one manipulator capable of detachably securing respective ones of the tire molds to said frame so that the tire molds are transportable by said at least one open-close manipulator between the respective ones of said mold stations and said mold preparing station, a green tire loading device having a basket configured to hold a green tire and an arm on which said basket is mounted, said arm being mounted to said frame so as to be movable between first and second positions at which the basket is disposed outwardly of said frame and within said frame, respectively, a green tire transfer device having a basket configured to support a green tire and an arm supporting the basket of the transfer device and mounted to said frame so as to be movable to a position at which a green tire held by the basket of the transfer device is transferable to the basket of said green tire loading device when the arm of the loading device is in said first position, a bead lock device disposed within and supported by said frame, said bead lock device including a plurality of chucks capable of holding a green tire, and a driving device on which said chucks are supported and which is actuatable to move the chucks vertically in the manipulator so as to bring said chucks into a position at which the chucks can receive a green tire supported by said green tire loading device when the arm thereof is at said second position and so as to move the green tire into a position at which a bead thereof is inserted into a said bead ring of a respective one of said tire molds, and a connecting and disconnecting device supported by said frame and vertically movable in the manipulator, said connecting and disconnecting device being detachably securable to the mold members of the respective said tire molds so as to be capable of raising and lowering said mold members.

4. Tire production apparatus comprising:
a plurality of mold stations disposed in a row, each of said mold stations including a tire mold having mold members including an upper side mold member having a bead ring;
a mold preparing station aligned with the row of mold stations, said mold preparing station including a centering mechanism which centers a said tire mold in the mold preparing station, and heating equipment which preheats a said tire mold that is in the mold preparing station;
at least one open-close manipulator including a frame, a travel driving device operatively connected to said frame and operative to move said frame along the row of mold stations and to said mold preparing station, clamping equipment supported by said frame, the clamping equipment of said at least one manipulator capable of detachably securing respective ones of the tire molds to said frame so that the tire molds are transportable by said at least one open-close manipulator between the respective ones of said mold stations and said mold preparing station, a bead lock device having a plurality of chucks capable of holding a green tire, a driving device on which said chucks are supported and which is actuatable to move the chucks vertically to a position at which an upper bead of the green tire held thereby is inserted into the bead ring of a respective one of the tire molds; and a pressure receiving plate which is detachably securable to the lock cylinder of said bead lock device, said pressure receiving plate having an outer diameter that is greater than an inner diameter of said upper side mold member of the tire mold whereby said bead lock device can support said pressure receiving plate in a position within the tire mold as bearing against the upper side mold member of the tire mold.

5. Tire production apparatus comprising:
a plurality of mold stations disposed in a row, each of said mold stations including a tire mold having mold members including upper side and lower side mold members, and a pressure receiving plate located within said mold members and freely moveable between said lower and said upper side mold members, said pressure receiving plate having an outer diameter greater than inner diameters of each said upper and said lower side mold members so as to be engageable therewith;
a mold preparing station aligned with the row of mold stations, said mold preparing station including a centering mechanism which centers a said tire mold in the mold preparing station, heating equipment which preheats a said tire mold that is in the mold preparing station, the heating equipment including a bottom heating device so disposed as to heat the bottom of a respective one of said tire molds that is in said mold preparing station, a top heating device so disposed as to heat the top of a respective one of said tire molds that is in said mold preparing station, a mold lifting device capable of elevating a said tire mold disposed in the mold preparing station, and cylinder means for elevating the pressure receiving plate of a said tire mold that is disposed in the mold preparing station;
a loading and unloading device operatable to load and unload the top heating device into and from its operative position in the mold preparing station; and
at least one open-close manipulator including a frame, a travel driving device operatively connected to said frame and operative to move said frame along the row of mold stations and to said mold preparing station, and clamping equipment supported by said frame, the clamping equipment of said at least one manipulator capable of detachably securing respective ones of the tire molds of the production apparatus to said frame so that the tire molds of the production apparatus are transportable by said at least one open-close manipulator between the respective ones of said mold stations and said mold preparing station.

6. Tire production apparatus as claimed in claim 1, wherein the split molds each include an outer ring, the clamping device fixed to the upper bolster plate of each of said mold stations is capable of clamping the outer ring to the upper bolster plate, when actuated and to release said outer ring and said upper bolster plate from one another when deactuated, and said at least one manipulator includes a connection and disconnection driving device cooperable with the clamping device fixed to the upper bolster plate of each of said mold stations to actuate and deactuate the clamping device fixed to the upper bolster plate.

7. Tire production apparatus as claimed in claim 3, wherein the tire molds each include an outer ring, each of said mold stations include an upper bolster plate and a clamping device capable of clamping the outer ring of a said tire mold to the upper bolster plate, when actuated and to release said outer ring and said upper bolster plate from one another when deactuated, and said at least one manipulator includes a connection and disconnection driving device cooperable with the clamping device of each of said mold stations to actuate and deactuate the clamping device.

8. Tire production apparatus as claimed in claim 4, wherein the tire molds each include an outer ring, each of said mold stations include an upper bolster plate and a clamping device capable of clamping the outer ring of a said tire mold to the upper bolster plate, when actuated and to release said outer ring and said upper bolster plate from one another when deactuated, and said at least one manipulator includes a connection and disconnection driving device cooperable with the clamping device of each of said mold stations to actuate and deactuate the clamping device.

9. Tire production apparatus as claimed in claim 5, wherein the tire molds each include an outer ring, each of said mold stations include an upper bolster plate and a clamping device capable of clamping the outer ring of a said tire mold to the upper bolster plate, when actuated and to release said outer ring and said upper bolster plate from one another when deactuated, and said at least one manipulator includes a connection and disconnection driving device cooperable with the clamping device of each of said mold stations to actuate and deactuate the clamping device.

* * * * *